United States Patent
Mini Townson et al.

(10) Patent No.: US 9,750,297 B1
(45) Date of Patent: Sep. 5, 2017

(54) LEVER-ACTIVATED SHOCK ABATEMENT SYSTEM AND METHOD

(71) Applicant: TITON CORP., Guatemala (GT)

(72) Inventors: Juan Francisco Javier Mini Townson, Guatemala (GT); José Rodrigo Aragón Cabrera, Santa Catarina Pinula (GT); Juan Pablo Alfaro Samayoa, Guatemala (GT)

(73) Assignee: Titon Corp., Guatemala (GT)

( * ) Notice: Subject to any disclaimer, the term of this patent is extended or adjusted under 35 U.S.C. 154(b) by 0 days.

(21) Appl. No.: 15/380,967

(22) Filed: Dec. 15, 2016

Related U.S. Application Data

(60) Provisional application No. 62/375,240, filed on Aug. 15, 2016.

(51) Int. Cl.
   *A42B 3/14* (2006.01)
   *F16F 13/00* (2006.01)
   *A42B 3/12* (2006.01)
   *A42B 3/06* (2006.01)

(52) U.S. Cl.
   CPC ........... *A42B 3/14* (2013.01); *A42B 3/063* (2013.01); *A42B 3/121* (2013.01); *A42B 3/125* (2013.01); *F16F 13/005* (2013.01)

(58) Field of Classification Search
   CPC ......... A42B 3/147; A42B 3/063; A42B 3/125; A42B 3/121; A42B 3/00; A42B 3/064; F16F 13/005
   USPC ............. 2/411, 410, 44, 414, 417, 418, 421
   See application file for complete search history.

(56) References Cited

U.S. PATENT DOCUMENTS

| | | | | |
|---|---|---|---|---|
| 2,295,855 A | * | 9/1942 | Ludwell | A42B 3/06 2/416 |
| 2,753,562 A | * | 7/1956 | McDonald | A42B 3/14 2/8.1 |
| 2,870,445 A | | 1/1959 | Fisher et al. | |
| 2,879,513 A | | 3/1959 | Fisher et al. | |
| 2,921,318 A | | 1/1960 | Theodore et al. | |
| 3,054,111 A | | 9/1962 | Austin et al. | |
| 3,790,150 A | | 2/1974 | Lippert | |

(Continued)

OTHER PUBLICATIONS

Foster, Tom, "The Helmet That Can Save Football", Popular Science, Dec. 18, 2012, 10 pages.

*Primary Examiner* — Shaun R Hurley
*Assistant Examiner* — Bao-Thieu L Nguyen
(74) *Attorney, Agent, or Firm* — Guntin & Gust, PLC; Ralph Trementozzi

(57) ABSTRACT

Aspects of the subject disclosure may include, for example, a protective shell having an exterior surface and an interior surface and a lever assembly positioned between the interior surface of the protective shell and a portion of a body. The lever assembly includes a lever having an elongated member extending between a first end and a second end and a pivot location. A fulcrum pivotally engages the pivot location of the lever, wherein the lever rotates about the fulcrum in response to an impact force applied along a first direction to the exterior surface of the protective shell. The lever assembly further includes a spring engaging the lever, wherein a rotation of the lever deforms the spring in a second direction to absorb a portion of a kinetic energy of the collision to redirect and reduce a transfer of a portion of force to the body. Other embodiments are disclosed.

20 Claims, 36 Drawing Sheets

(56) References Cited

U.S. PATENT DOCUMENTS

| | | | |
|---|---|---|---|
| 4,012,794 A * | 3/1977 | Nomiyama | A42B 3/064 2/411 |
| 4,032,127 A * | 6/1977 | Lipfert | A42B 3/12 2/420 |
| 4,033,567 A | 7/1977 | Lipfert et al. | |
| 4,283,864 A | 8/1981 | Lipfert et al. | |
| 4,290,149 A | 9/1981 | Aileo et al. | |
| 4,347,840 A | 9/1982 | Adams et al. | |
| 4,407,021 A * | 10/1983 | Kralik | A42B 3/14 2/416 |
| 4,535,553 A | 8/1985 | Derderian et al. | |
| 4,625,487 A | 12/1986 | Blakeway et al. | |
| 4,665,569 A * | 5/1987 | Santini | A42B 3/32 2/410 |
| 4,942,628 A | 7/1990 | Freund et al. | |
| 4,972,527 A | 11/1990 | Wallace et al. | |
| 5,319,808 A * | 6/1994 | Bishop | A42B 3/14 2/181.2 |
| 5,581,816 A | 12/1996 | Davis et al. | |
| 5,742,937 A * | 4/1998 | Baudou | A42B 3/042 2/411 |
| 6,798,392 B2 | 9/2004 | Hartwell | |
| 7,370,842 B2 | 5/2008 | Fritz et al. | |
| 7,603,725 B2 * | 10/2009 | Harris | A42B 3/121 2/410 |
| 8,316,512 B2 * | 11/2012 | Halldin | A42B 3/064 2/411 |
| 8,615,817 B2 * | 12/2013 | Phillips | A42B 3/064 2/2.5 |
| 8,691,370 B2 | 4/2014 | Brill et al. | |
| 8,881,315 B2 * | 11/2014 | Desjardins | A42B 3/122 2/410 |
| 8,955,169 B2 * | 2/2015 | Weber | A42B 3/125 2/410 |
| 9,179,727 B2 * | 11/2015 | Grant | A42B 3/125 |
| 9,314,063 B2 | 4/2016 | Ide et al. | |
| 9,316,282 B1 | 4/2016 | Harris | |
| 2002/0000004 A1 | 1/2002 | Wise et al. | |
| 2005/0268383 A1 * | 12/2005 | Harris | A42B 3/121 2/413 |
| 2006/0191403 A1 | 8/2006 | Hawkins et al. | |
| 2008/0028501 A1 | 2/2008 | Schimpf et al. | |
| 2008/0250547 A1 * | 10/2008 | Frank | A42B 1/061 2/411 |
| 2009/0260133 A1 | 10/2009 | Del Rosario et al. | |
| 2010/0229287 A1 | 9/2010 | Mothaffar et al. | |
| 2011/0185481 A1 | 8/2011 | Nagely et al. | |
| 2012/0198604 A1 * | 8/2012 | Weber | A42B 3/125 2/414 |
| 2013/0031706 A1 | 2/2013 | Cooksey et al. | |
| 2013/0212783 A1 * | 8/2013 | Bonin | A41D 13/065 2/411 |
| 2014/0096311 A1 * | 4/2014 | Halldin | A42B 3/064 2/411 |
| 2014/0101828 A1 * | 4/2014 | Sugerman | A42B 3/085 2/411 |
| 2014/0109299 A1 | 4/2014 | Kwan et al. | |
| 2014/0173810 A1 * | 6/2014 | Suddaby | A42B 3/124 2/413 |
| 2014/0215694 A1 * | 8/2014 | Grice | A42B 3/06 2/411 |
| 2014/0223644 A1 * | 8/2014 | Bologna | A42B 3/20 2/414 |
| 2014/0223646 A1 | 8/2014 | Bologna et al. | |
| 2015/0021213 A1 | 1/2015 | Rapoport | |
| 2015/0047109 A1 * | 2/2015 | Grant | A42B 3/064 2/414 |
| 2015/0143617 A1 * | 5/2015 | Suddaby | A42B 3/124 2/414 |
| 2015/0157080 A1 | 6/2015 | Camarillo et al. | |
| 2015/0223543 A1 | 8/2015 | Hernandez et al. | |
| 2015/0285697 A1 * | 10/2015 | O'Bier, II | F41H 1/02 2/411 |
| 2015/0313305 A1 * | 11/2015 | Daetwyler | A42B 3/121 2/414 |
| 2015/0359285 A1 * | 12/2015 | Rennaker, II | A42B 3/064 2/414 |
| 2016/0073723 A1 * | 3/2016 | Halldin | A42B 3/06 2/411 |
| 2016/0113347 A1 | 4/2016 | Halldin | |
| 2016/0228758 A1 | 8/2016 | Bologna et al. | |
| 2017/0006952 A1 * | 1/2017 | Staton | F16F 13/005 |
| 2017/0013907 A1 * | 1/2017 | Salmini | A42B 3/127 |

\* cited by examiner

200

300

400

400

400

400

500

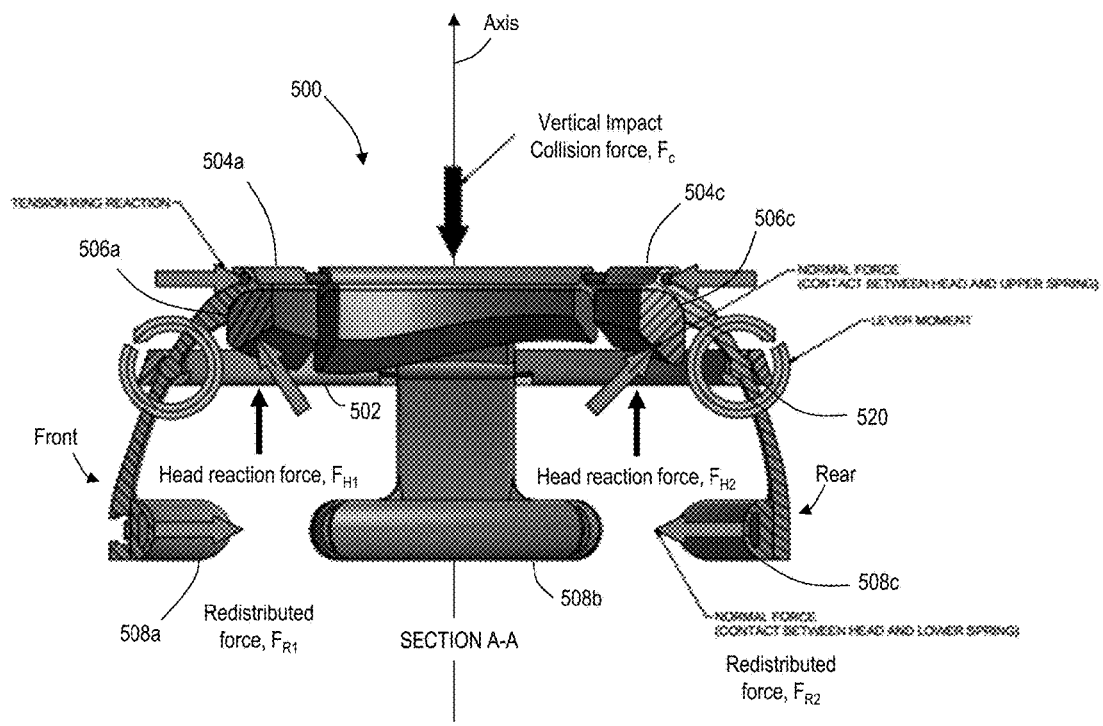
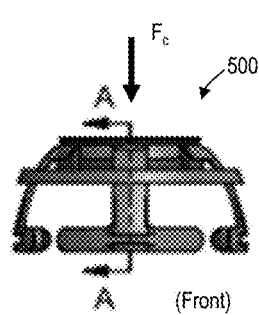
FIG. 8A
FIG. 8B
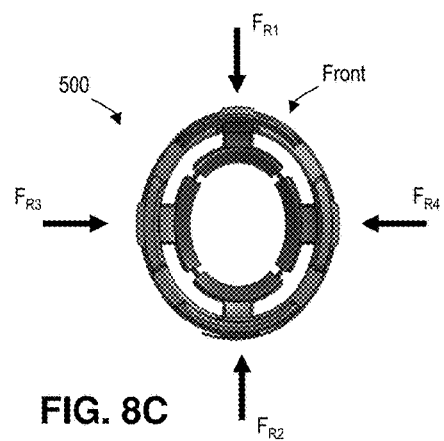
FIG. 8C

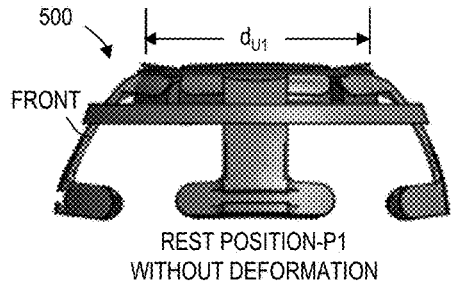
FIG. 9A REST POSITION-P1 WITHOUT DEFORMATION
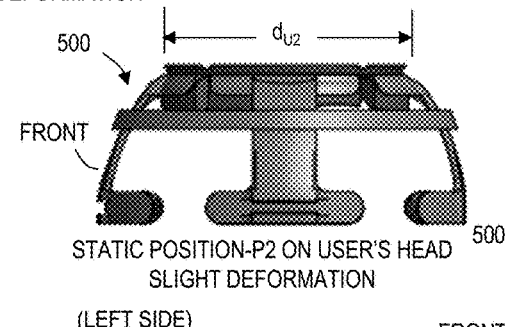
FIG. 9B STATIC POSITION-P2 ON USER'S HEAD SLIGHT DEFORMATION (LEFT SIDE)
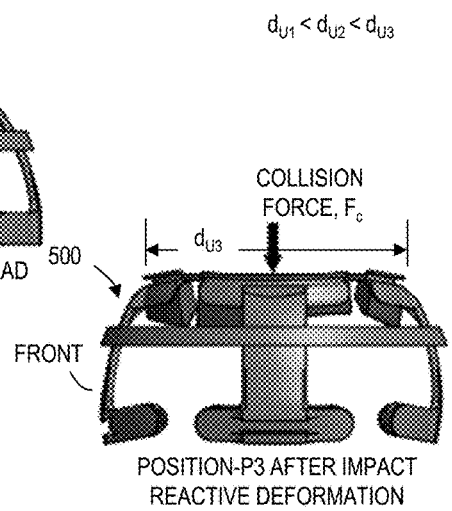
FIG. 9C POSITION-P3 AFTER IMPACT REACTIVE DEFORMATION
$d_{U1} < d_{U2} < d_{U3}$
COLLISION FORCE, $F_c$
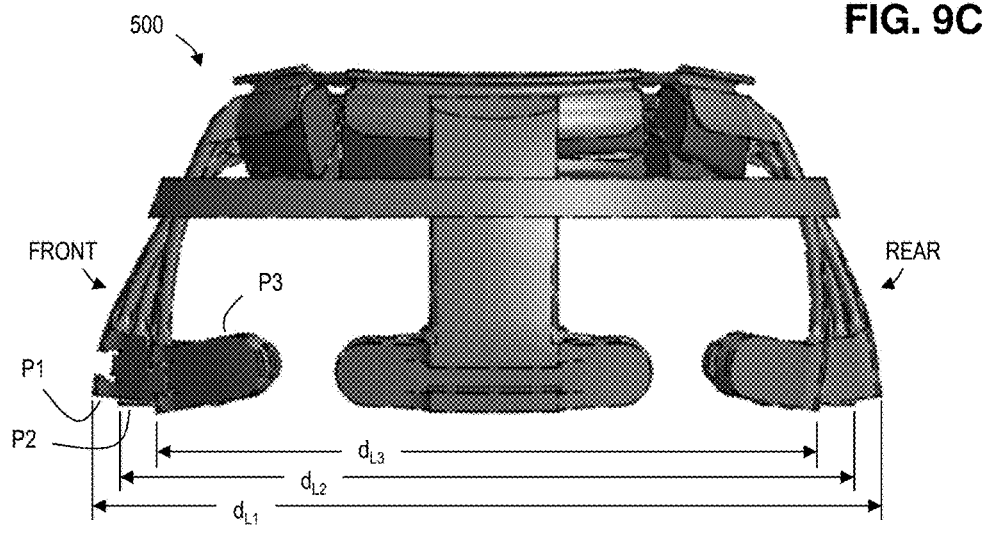
FIG. 9D (LEFT SIDE)
$d_{L1} > d_{L2} > d_{L3}$

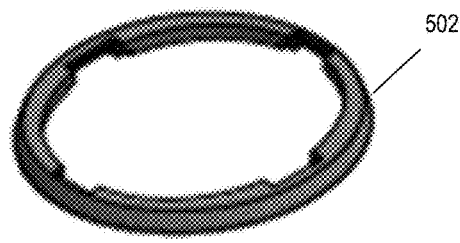
FIG. 10A
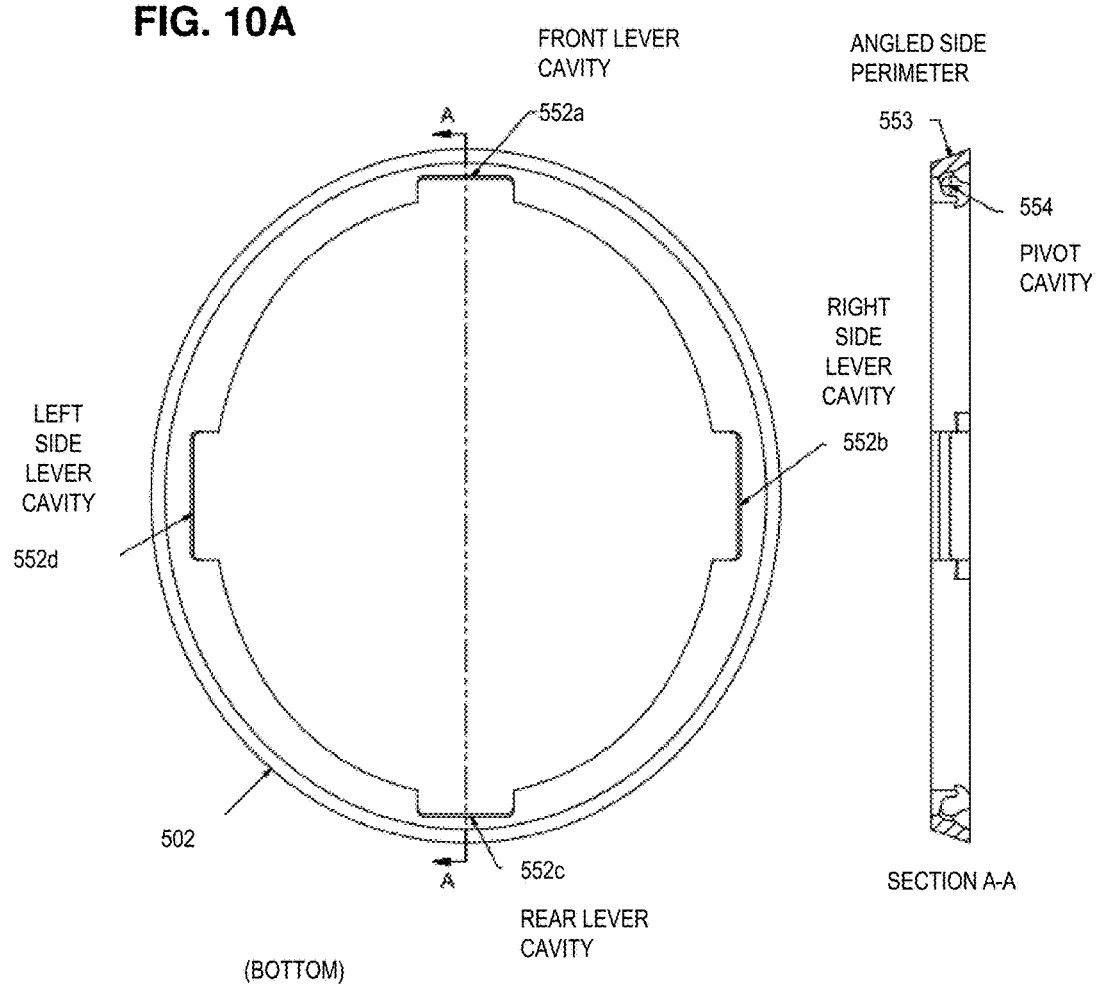
FIG. 10B　　　FIG. 10C

(FRONT)

(LEFT SIDE)

(BOTTOM)

SECTION D-D

SECTION F-F

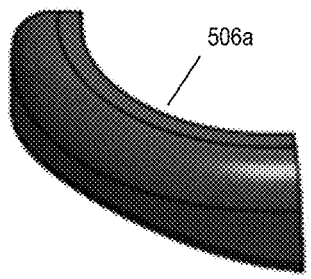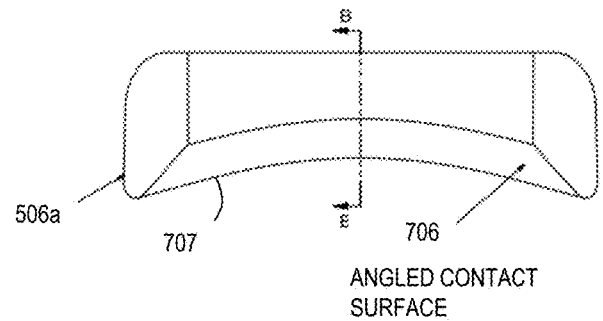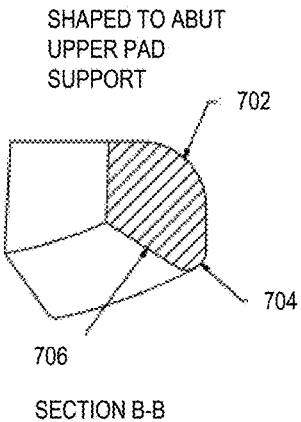
FIG. 15A
FIG. 15B
FIG. 15C
FIG. 15D

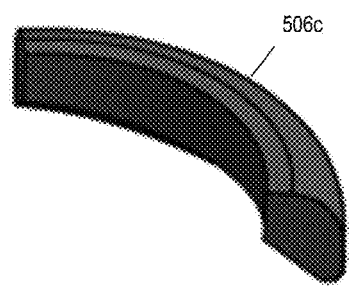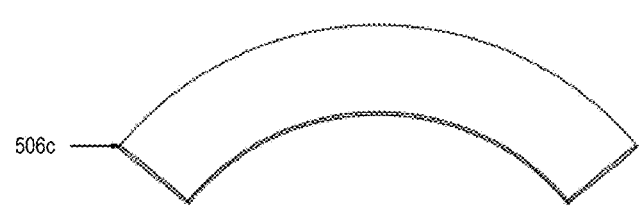
FIG. 17A        FIG. 17B
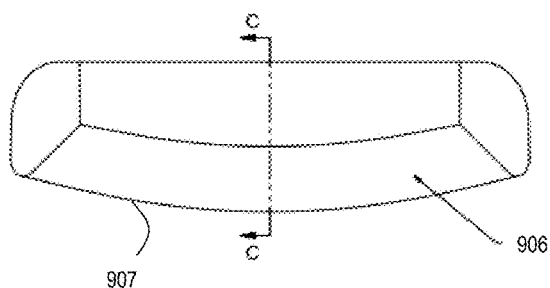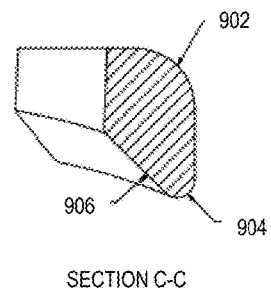
FIG. 17C        FIG. 17D

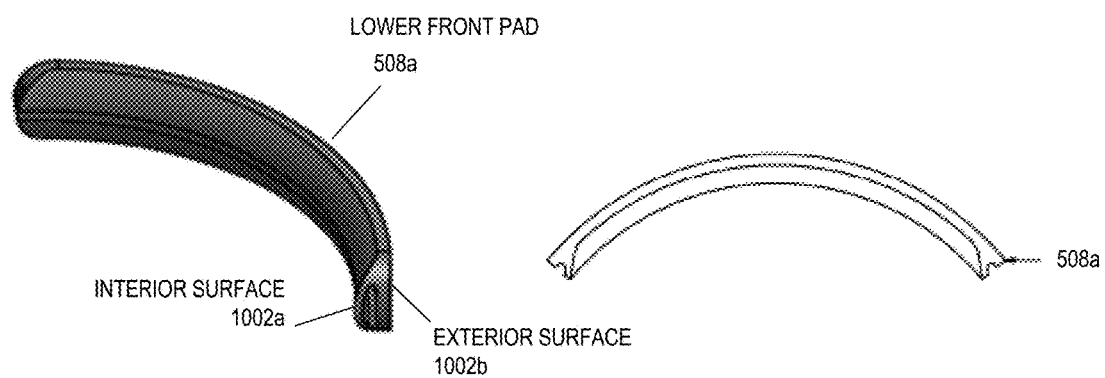
FIG. 19A  FIG. 19B
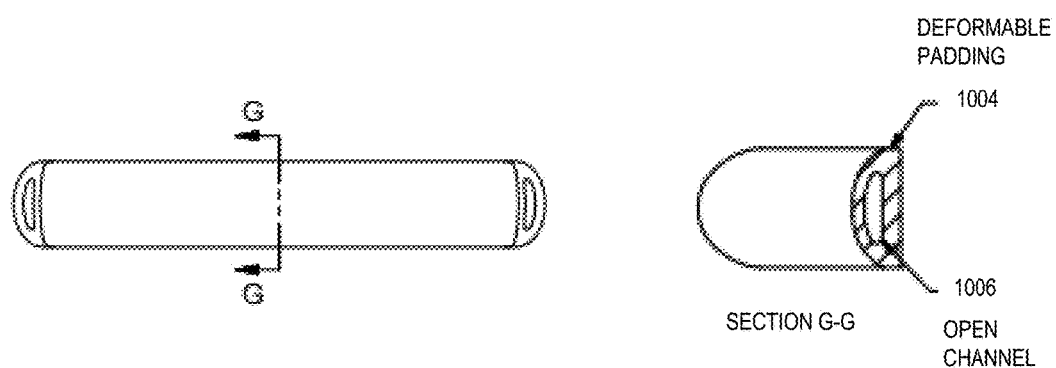
FIG. 19C  FIG. 19D

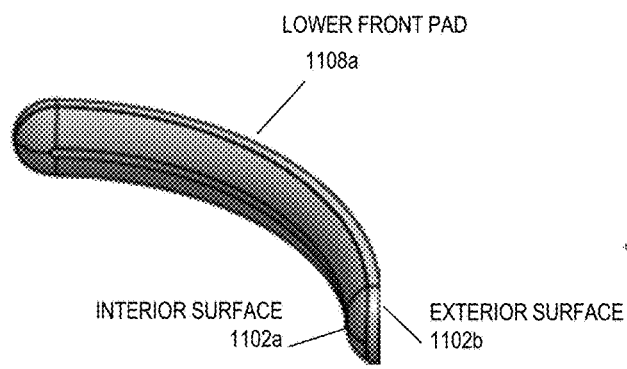
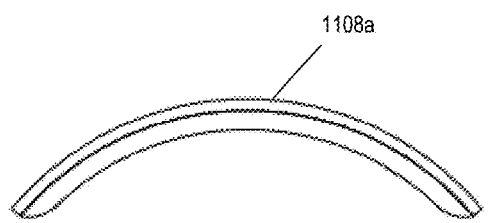
FIG. 20A
FIG. 20B
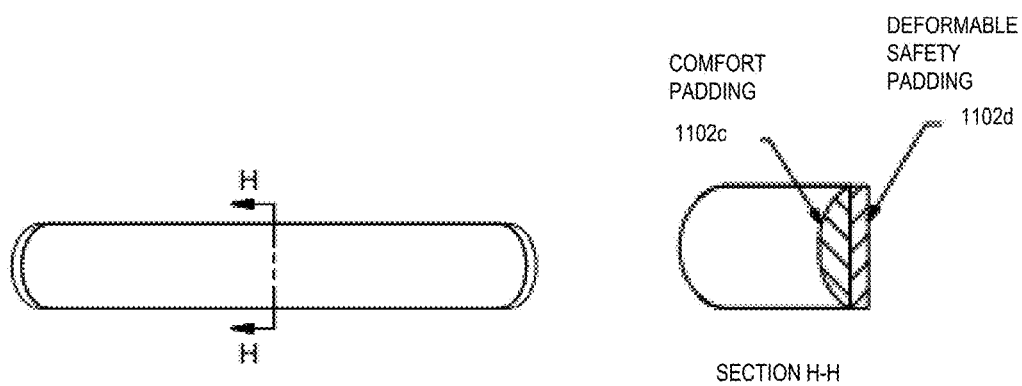
FIG. 20C
FIG. 20D

2010

2020

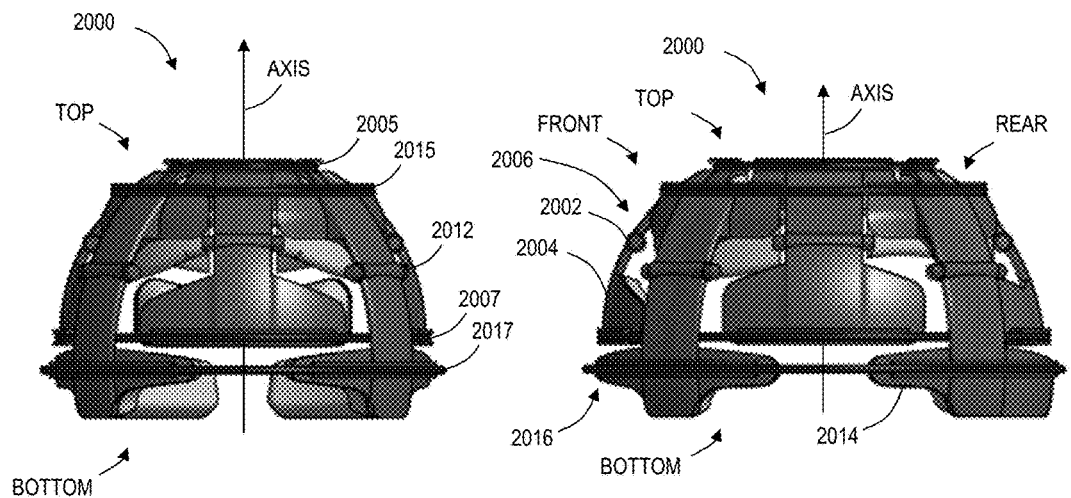
FIG. 24A    FIG. 24B
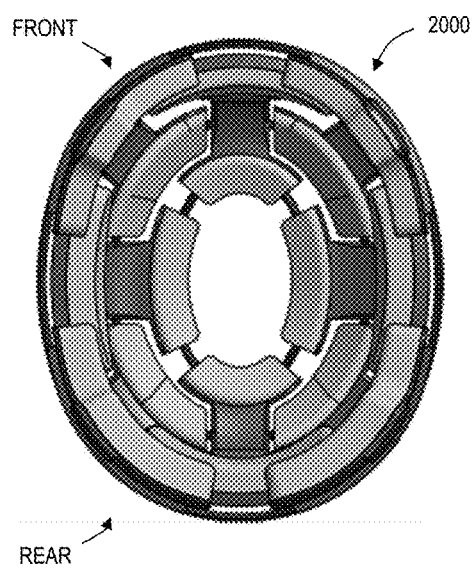    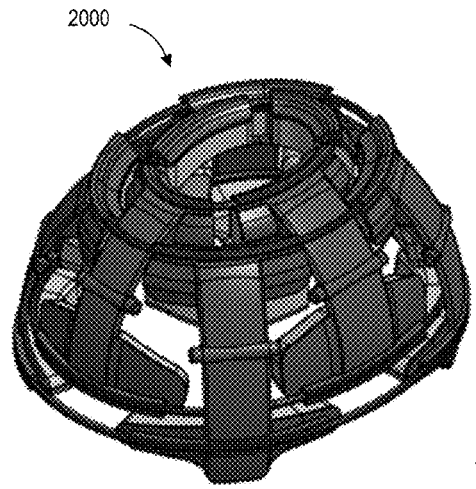
FIG. 24C    FIG. 24D (FRONT)

(SIDE)

(FRONT)

(SIDE)

(FRONT)

(SIDE)

SECTION M-M
(SIDE)

SECTION N-N
(FRONT)

(LEFT SIDE)

(RIGHT SIDE)

SECTION P-P

SECTION R-R (FRONT) 3100

(SIDE) 3100

(BOTTOM) 3100

3100

MECHANICAL SYSTEM

3200

- $k_1, k_2, k_3, k_4$ UPPER SPRINGS.
- $k_5, k_6, k_7, k_8$ LOWER SPRINGS.

ELECTRICAL SYSTEM

3300

3240

3340

3260

(SIDE)

3500

(PERSPECTIVE)

3500

(SIDE)

(PERSPECTIVE)

LEVER-ACTIVATED SHOCK ABATEMENT SYSTEM AND METHOD

CROSS-REFERENCE TO RELATED APPLICATIONS

This application claims priority to U.S. Provisional Patent Application No. 62/375,240, filed Aug. 15, 2016, which is incorporated herein by reference in its entirety.

FIELD OF THE DISCLOSURE

The subject disclosure relates to lever-activated shock abatement system and method.

BACKGROUND

Safety helmets generally reduce effects of impacts to top and/or side of a user's head. Protective headgear often relies upon a hard outer casing with an impact-energy absorbing padding or a strap based suspension placed between the outer casing and the user's head. If a user wearing such hard shell helmet suffers a hard blow to the helmet, the impact of the hard shell meeting a hard surface generates a shockwave and a high impact force, that can be absorbed (to a limited extent) by the inner shock-absorbing material, or the straps in a typical suspension inside the hard casing and in contact with the user's head.

Various mechanisms responsible for brain injuries are understood to include focal type injuries that generally result from a direct impact to the head, sometimes resulting in cranial fracture. Other mechanisms include coup injuries that result from impacts to the same side of the head, whereas, contrecoup injuries result from impacts to an opposite side of the head. At least some injuries result from a displacement, e.g., a linear translation, of the brain within the skull. Still other injuries, including Diffuse Axonal Injuries (DAI), result from a rotational acceleration of the head and/or severe acceleration and/or deceleration that causes traumatic shearing forces, e.g., tissue sliding over tissue. DAI is believed to be one of the most common and devastating types of traumatic brain injury.

Some have disclosed protective helmets including a hard shell and an internal suspensions that include flexible cradle systems. For example, U.S. Pat. No. 2,870,445, to Fisher, discloses protective headgear and lining suspensions that include cradle straps joined together along an upper portion by an adjustment strap offering a flexible internal surface free of rigid projecting blow transmitting elements to cushion a head of a wearer. U.S. Pat. No. 3,054,111, to Hornickel et al., discloses a shock absorbing helmet that includes a head-receiving cradle formed from straps that may cross each other or be joined at their upper ends by a lace that makes the cradle adjustable. U.S. Pat. No. 2,921,318, to Voss et al. discloses a helmet lining that includes several flexible cradle straps extending up into a crown of a protective helmet from circumferentially spaced points around a lower portion. Each strap includes a strip of woven material that necks down as it stretches in reaction to a blow against the helmet. Other web-like support systems that include strips of flexible material that cross each other are disclosed in U.S. Pat. App. Pub. No. 2002/0000004 to Wise et al.

Others have disclosed protective helmets including a hard shell and external features to reduce head injury risk. For example, U.S. Pub. Pat. App. No. 2015/0157080, to Camarillo et al., U.S. Pub. Pat. App. No. 2011/0185481, to Nagely et al., and U.S. Pat. No. 5,581,816, to Davis, disclose wearable devices having force redirecting units connected between an outer surface of a helmet and a shoulder brace for redirecting head impact forces from a wearer's head to another body part. U.S. Pub. Pat. App. No. 2010/0229287, to Mothaffar, discloses an arrangement of straps extending from a helmet to other parts of a body to limit a range of motion of a wearer's head and flexure of their neck.

Still others have disclosed energy absorbing structures for placement along an interior surface of a helmet. For example, U.S. Pat. No. 9,316,282, to Harris, discloses energy absorbing, collapsible disk structures that have collapsible arms around a perimeter of two disks sandwiching that cause an elastic material to stretch, storing kinetic energy from a vertical direction as potential energy in a horizontal direction. U.S. Pat. No. 2,879,513, to Hornickel et al., discloses a crushable block of energy absorbing material disposed in each loop between a lace and an inner end of suspension cradle straps. Energy absorbed in crushing the blocks reduces the shock of an impact against a wearer's head. U.S. Pat. App. Pub. No. 2009/0260133, to Del Rosario, discloses an impact absorbing frame and multi-layered structure that includes inner opposite-facing inner panels that undergo elastic deformation and compress and expand to dissipate impact energy. U.S. Pat. No. 9,314,063, to Bologna et al., discloses a protective football helmet having a one-piece molded shell with an impact attenuation member formed by removing material from a front portion of the shell to form a cantilevered segment.

Although these and other conventional helmet liners have worked well, they have failed to provide protection against both high and low degrees of impact imparted on a helmet over the extended life of the helmet. The impact force is often so great that the user's helmet may even initially bounce back upon impact, thrusting the user's head away from the blow, subjecting the head and neck regions to additional injury causing forces. If the impact is severe enough, it may lead to a concussion (striking of the brain matter to the skull with moderate force) or worse. In some instances, a user can experience a, so called, focal type of injury, e.g., resulting from a lateral movement of head when shell impacted, alone or in combination with a rotation of the head, in which the head experiences a rapid acceleration and/or deceleration.

BRIEF DESCRIPTION OF THE DRAWINGS

FIG. 8B depicts a sagittal plane cross-section of the elements system depicted in FIGS. 4A-4D 8A and 8C;

FIGS. 9A-9D depict a front view of the helmet system depicted in FIGS. 4A-4D in various stages of deformation when exposed to a vertical impact force;

FIG. 10A-10C depict top perspective, top and side section views, respectively, of an illustrative embodiment of a pivot ring portion of the helmet system depicted in FIGS. 4A-4D;

FIGS. 15A-15D depict top perspective, front, top and cross-sectional views of a front pad of the upper pad assembly depicted in FIGS. 14A-14D;

FIGS. 17A-17D depict top perspective, top, front, and side cross-sectional views of a rear pad of the upper pad assembly depicted in FIGS. 14A-14D;

FIGS. 19A-19D depict top perspective, bottom, front and cross-sectional views of one embodiment of a lower pad of the lower pad assembly depicted in FIGS. 18A-18D;

FIGS. 20A-20D depict top perspective, bottom, front and cross-sectional views of another embodiment of a lower pad of the lower pad assembly depicted in FIGS. 18A-18D;

FIGS. 24A-24D depicts front, side, bottom and top perspective views of the alternative helmet system depicted in FIG. 23A;

DETAILED DESCRIPTION

Figure 1A:
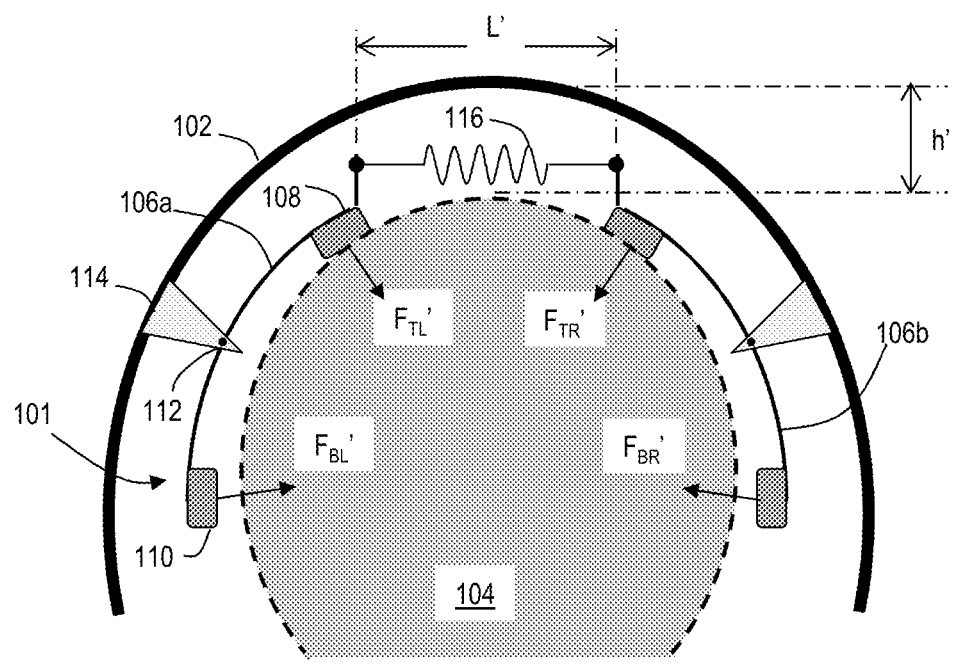
FIGS. 1A-1B depict schematic diagrams of a vertical cross-section of a helmet shock abatement system.

The subject disclosure describes, among other things, illustrative embodiments of devices and processes that abate impact shocks by enacting a machine that redirects at least a portion of an impact force imposed along one trajectory to a reaction force distributed along another trajectory. Other embodiments are described in the subject disclosure.

One or more aspects of the subject disclosure include a device, that includes a helmet defining an open ended cavity that receives a portion of a human body and a shock abatement assembly disposed at least partially within the open ended cavity. The shock abatement assembly includes a number of levers, wherein each lever of the number of levers comprises an elongated member extending between a first end and a second end. A number of fulcra pivotally engage the number of levers wherein a fulcrum of the number of fulcra engages a lever of the number of levers between the first end and the second end, wherein at least one lever of the number of levers rotate about the number of fulcra in response to an impact force of a collision between the helmet and a foreign object to obtain a lever response, wherein the impact force is applied along a first direction to an exterior surface of the helmet. The shock abatement assembly further includes a deformable member engaging at least one lever of the number of levers, wherein a deformation of the deformable member based on the lever response occurs in a second direction different from the first direction, and wherein the deformation absorbs a non-trivial portion of a kinetic energy of the collision.

One or more aspects of the subject disclosure include a lever assembly, wherein the lever assembly is configured to be work upon a head portion, a neck portion, or both, of a human body. The lever assembly includes a lever having an elongated member extending between a first end and a second end and a pivot location. A fulcrum pivotally engages the pivot location of the lever, wherein the lever rotates about the fulcrum, to obtain a lever action in response to an impact force applied along a first direction to an exterior surface of the helmet system, and wherein the impact force is based on a collision between the helmet system and another object. The lever assembly further includes a spring engaging the lever, wherein a deformation of the spring based on the lever action, absorbs a non-trivial portion of a kinetic energy of the collision. The deformation of the spring occurs in a second direction different from the first direction, and the lever action redirects a portion of the impact force to the portion of the human body.

One or more aspects of the subject disclosure include a process that includes providing a helmet system including a number of levers rotatable about a plurality of fulcra, wherein at least one lever of the number of levers rotates about a respective fulcrum of the plurality of fulcra in response to an impact force received along a first direction at an external surface of the helmet system resulting from a collision between the external surface of the helmet system and another object. A deformable member of the helmet system engaging at least one lever of the plurality of levers deforms in response to a rotating of at least one lever of the number of levers. The deforming of the deformable member occurs along a second direction, wherein the deforming of the deformable member absorbs non-trivial portion of a kinetic energy of the collision. A portion of the applied force directed toward a body is redirected in response to the rotating of the plurality of levers.

As used herein the term machine generally refers to one or more devices that use and/or apply mechanical energy and/or power to perform a particular task. A machine can include one or more parts, each with a definite function, that cooperate together and/or with other structures to perform the particular task. In general, machines can transmit and/or modify force and/or motion. The particular tasks can include, without limitation, a redistribution of a collision force, a redistribution of energy or both. The term machine includes one or more elementary mechanisms, such as a lever, a wheel and axle, a pulley, a screw, a wedge, and an inclined plane, generally referred to as simple machines. In at least some applications, the term machine can include complex machines, e.g., including a combination of one or more simple machines.

Machines can include, without limitation, devices that can be actuated, e.g., by applied energy and/or power. Actuation of the machine can set one or more parts or components of the machine into motion. The motion can include a controlled movement that can be controlled at least in part in a predetermined manner according to a structure of the machine. For example, controlled movement can allow parts to move in one direction while preventing the parts to move in another direction. Motion can include linear motion, rotational motion, and any combination thereof. In at least some embodiments, machines can include one or more elements that result in an irreversible transformation of at least a portion of energy applied to the machine.

A collision generally refers to a short-duration interaction between two or more bodies, resulting in a change in motion of the bodies involved due to internal forces acting between them. Collisions can be elastic, inelastic or some combination of both. All collisions conserve momentum. Elastic collisions conserve both momentum and kinetic energy; whereas, inelastic collisions conserve momentum, but not kinetic energy. A coefficient of restitution, e.g., ranging between 0 and 1, provides a measure of a degree to which a collision is elastic, "1", or inelastic "0".

A line of impact can be defined as a line drawn between centers of mass of two colliding bodies that passes through a contact point between the bodies. Collisions can be "head on" in which a velocity of each body just before impact is along the line of impact. Alternatively, collisions can be non-head on, also referred to as oblique collisions, e.g., glancing blows, in which the velocity of each body before the impact is not along the line of impact.

A magnitude of a relative velocity between two colliding bodies at a time of impact can be referred to as a closing speed. In a collision between two bodies, a change in motion of one of the bodies resulting from a collision with another one of the bodies depends on how the bodies collided, how long it took the bodies to stop or slow, across what distance the collision occurred, and a degree of deformity of one or both of the bodies.

Collisions also involve forces related to changes in velocities of the different colliding bodies. Namely, each body involved in a collision experiences a respective impact force. The collision causes a change in acceleration of each body resulting from the collision that occurs over a time interval of the collision. The impact force can be estimated or otherwise approximated as a product of the body's mass and the acceleration, e.g., a change in velocity with respect to time, resulting from the collision. In some instances the impact force can be represented as an average value, e.g., $F=ma$, in which the acceleration, a, is an average acceleration based on the collision. In general, it is understood that the acceleration can include one of a linear acceleration, a rotational acceleration, or both. Accelerations can be positive or negative. For example, a body at rest hit by another body will experience an acceleration, whereas, a body moving that hits another body at rest will experience a deceleration.

Figure 1B:
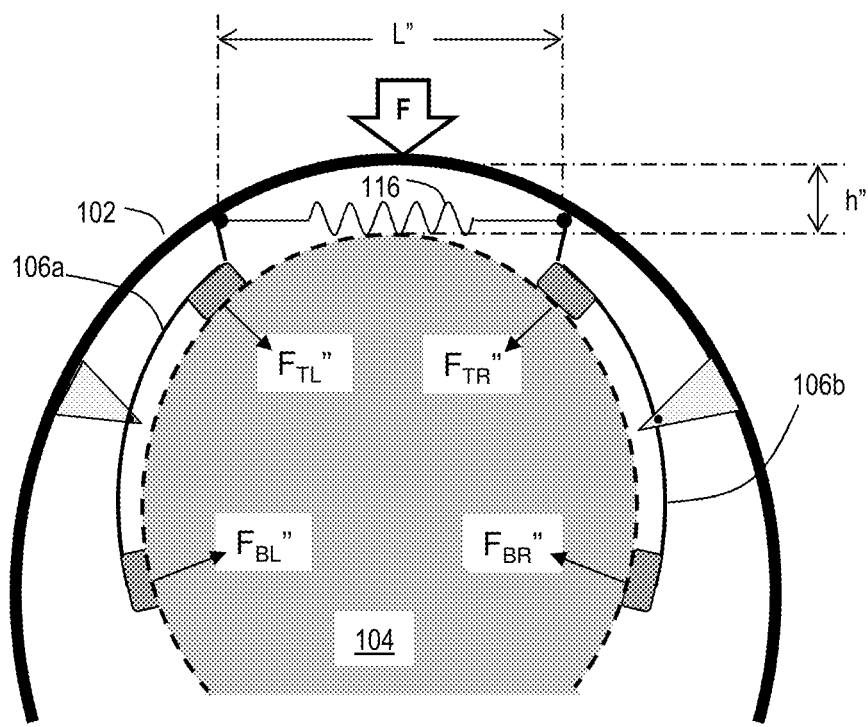

FIGS. 1A-1B depict schematic diagrams of a vertical cross-section of a protective system 100 in the form of a helmet system adapted for shock abatement. The example system 100 includes a protective shell 102 in the form of a helmet. The helmet 102 is worn upon a user's head 104 to protect the user's head 104 from trauma and/or injury associated with a collision or impact of the helmet 102 with a foreign object.

Generally speaking, a foreign object includes any object capable of colliding with the protective system 100. Examples of foreign objects include, without limitation, any movable object, such as a vehicle, a body, a portion of a body, an article, goods, materials, merchandise, and the like, including other protective systems 100. Alternatively or in addition, the foreign object can include immovable or substantially immovable objects, such as a building, a portion of a building, a wall, a floor, the ground, a tree, a guardrail, and the like. In some scenarios, one of the protective system 100 or the foreign object is stationary just prior to a collision, whereas, the other one is moving. In other scenarios both the protective system 100 and the object are moving, e.g., towards each other, away from each other, according to virtually any relative position, direction, speed, and/or acceleration that results in a collision between the protective system and the foreign object.

The example protective system 100 includes a machine 101 that is actuated in response to a collision. The machine 101 can redistribute an impact force of the collision, e.g., to one or more directions that differ from a line of impact of the collision. Alternatively or in addition, the machine 101 can expend at least a portion of kinetic energy associated with the impact to reduce a portion of collision energy transferred to the user's head. In at least some embodiments, the machine 101 introduces a delay between an instant of the collision and a time at which energy and/or force is transferred to the user's head. Such expenditures of energy and/or delays in response generally contribute to a reduction in acceleration and/or deceleration experienced by the user's head in response to the collision.

The example machine includes a first lever 106a and a second lever 106b, generally 106. Each lever 106 includes an elongated support arm, e.g., a strut, extending between a first, e.g., top, end 108 and a second, e.g., bottom 110 end. Each lever 106 is pivotally engages a respective fulcrum 114 at a position between opposing ends of the lever 106, such that each lever 106 rotates about its fulcrum.

The example system 100 also includes at least one resilient component 116. The example resilient component includes a spring 116 extending between the first lever 106a and the second lever 106b. The spring 116 is illustrated as being coupled between top ends 108 of the two levers 106.

Referring to FIG. 1A, the protective system 100 is in a use mode or configuration, sometimes referred to as a static use mode. Namely, the helmet 102 is worn upon the user's head 104, without being subject to any substantial external forces, such as impulsive forces as might be experienced when the helmet 102 collides against another structure. The top and bottom ends 108, 110 of the lever 106 can include deformable members, such as pads or similar features to provide comfort to the user's head 104 during use. It is understood that the pads can include compressible elements, compressible materials including resilient materials, such as foams, springs and the like to facilitate comfort during static use and/or shock abatement during periods of dynamic use, e.g., during a collision.

It is understood that one or more of the top pads and/or one or more of the bottom pads can be in contact with the user's head 104 during static use periods. In the illustrative example, only the top pads are in contact with the user's head 104. An example separation between top ends of the levers 106 is L', and a corresponding height or separation distance between a top of the user's head 104 and a facing interior surface of the helmet 102 is h'.

A first portion of the impact force and/or kinetic energy of the collision is redistributed based on the actuating of the machine 101. Redistribution can include a change in direction. For example, a collision force received along a line of action can produce a change in motion of the collision receiving body, such as a movement of at least the outer portion of the helmet system. A resulting impact force, and/or a relative motion between the outer portion of the helmet system, e.g., resulting from a transfer of energy, can squeeze the machine 101 along a first direction, e.g., generally towards the protected object along the line of action, e.g., along the direction of the collision force F. Actuation of the machine 101, however, causes movement of one or more portions of the machine 101 that introduces forces upon one or more of the shell 102 and the user's head 104.

In at least some embodiments, resulting forces act on the user's head 104 in directions that are orthogonal to the line of action and/or the impact force F acting upon the force processing mechanism. In at least some embodiments, the redistributions or redirection can introduce opposing forces acting upon the user's head 104 that can reduce and/or prevent motion of the object based on a balancing effect of the forces. It is understood that the user's head 104 can experience a resulting compression, e.g., without a corresponding translation and/or rotation. In at least some embodiments, the resulting forces act on the user's head 104 in directions that are substantially opposite to the line of action and/or the impact force acting upon the force processing mechanism. Once again, such opposing forces can reduce and/or prevent motion of the user's head 104.

In at least some embodiments, a second portion of the impact force and/or kinetic energy of the collision that would otherwise be transferred toward the user's head 104 is expended, absorbed, and/or otherwise reduced. This expenditure can include one or more of absorbing and/or dissipating energy associated with the collision. The absorbing and/or dissipating energy can occur, at least in part, along a direction other than the line of action. Alternatively or in addition, a reduction of at least a portion of the impact force can include an elastic and/or plastic behavior of materials to transform at least a portion of impact kinetic energy. Namely, impact energy can be absorbed by a break or fracture, a dent, a deformation or other temporary and/or permanent alteration of a protective system component. For example, some protection systems, such as motorcycle and/or bicycle helmets that are designed to break, fracture and/or otherwise deform in response to a collision. In at least some embodiments, energy absorption can be accomplished by distortion of a resilient and/or compliant member. Examples include, without limitation, storing kinetic energy of the collision in mechanical energy, e.g., potential energy of a distorted spring, a compressed resilient pad, and the like.

Referring next to FIG. 1B, the system 100 is shown in a dynamic response mode or configuration. Namely, the helmet 102 worn upon the user's head 104 is subjected to an external force, F, shown for illustrative purposes as a vertically downward force. The external force F, e.g., resulting from a collision of the helmet 102 with another object, is applied to an exterior surface of the helmet 102 as shown. The force F pushes the helmet 102 downward with respect to the user's head 104. The fulcra 114 securely engage the interior surface of the helmet 102 and move downward in a corresponding manner with respect to the user's head 104. A relative movement of the helmet 102, the fulcra 114 and the user's head 104 decreases the separation distance between the top of the user's head 104 and the facing portion of the interior surface of the helmet to a distance h", where h"<h'. The relative movement forces the top ends 108 of the levers 106 into adjacent regions of the user's head 104. The user's head 104 provides a reaction force that results in a rotation of the levers 106 about the respective fulcra 114, as shown. In the example embodiment, the resulting rotation causes bottom portions 110 of the levers to move inward towards the user's head 104.

Additionally, the rotation of the levers results in a separation of the top ends 108 of the levers 106, resulting in an increased separation distance L", where L">L'. The expansion in the separation distance applies a tension to the spring 116 causing a distortion of the spring, e.g., and elongation. The elongation of the spring 116 results in a conversion of at least a portion of kinetic energy resulting from the collision into potential energy in the form of the distorted spring.

Beneficially, rotation of the levers provides several advantages that facilitate an abatement of the collision force acting upon the user's head 104 and/or other parts of the body, such as the neck, spine and the like. For example, rotations of the levers 106 reconfigured at least a portion of the downward or vertical force F into a different direction, e.g., a horizontal direction, pushing inward on side portions of the user's head 104. Thus, at least a portion of the downward force F that would otherwise tend to compress a user's neck and/or spine is converted to opposing lateral forces that tend to compress the user's head 104, without necessarily moving and/or compressing the spine.

Moreover, that portion of the kinetic energy that is converted to potential energy in the spring is absorbed or otherwise prevented from acting upon the user's head 104 or body. In the illustrative example, removal of the force F, e.g., after a collision, can result in a subsequent transfer of the potential energy of the spring 116 into kinetic energy of the levers 106 to rotate the levers back towards their original static use positions. Such backward rotation can result in a relative movement of the helmet 102 and the user's head 104, e.g., to increase the separation distance from h" back to h'. It is anticipated that such releases of potential energy will not result in forces that would otherwise injure the user 104.

Figure 2:
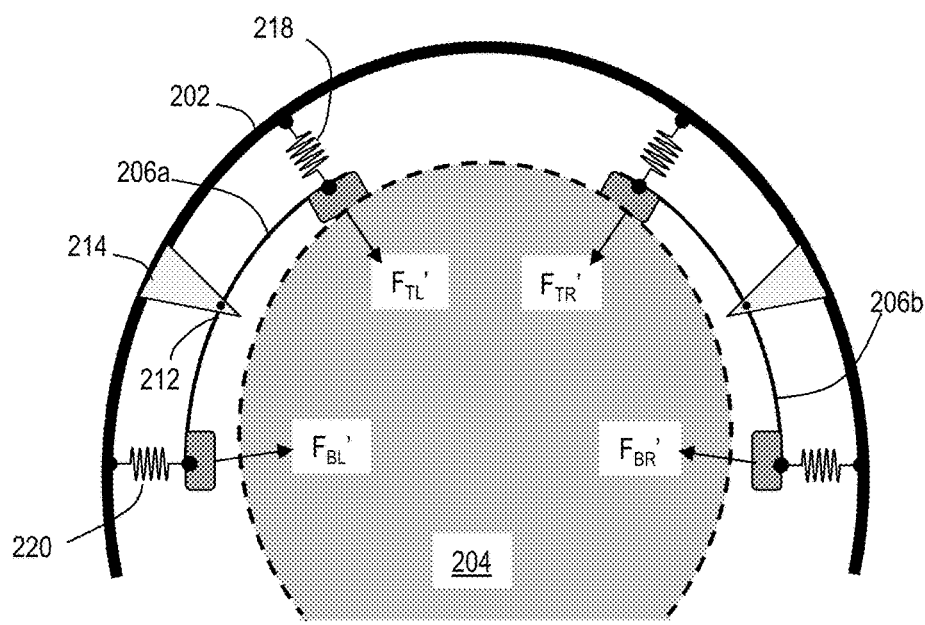
FIG. 2 depicts a schematic diagram of a vertical cross-section of another embodiment of a helmet shock abatement system.

FIG. 2 depicts a schematic diagram of a vertical cross-section of another embodiment of a protective system 200. The system 200 includes levers 206*a*, 206*b*, generally 206 that pivot about respective fulcra 214. Each lever includes a first spring 218 coupled between a top end of the lever 206 and an interior surface of a helmet 202. Each lever 206 can include a second spring 220 coupled between a bottom end of the lever 206 and the helmet 202 as shown. It is understood that the levers can include other configurations of springs, e.g., including one or more springs coupled between top and/or bottom ends of the levers 206.

Figure 3:
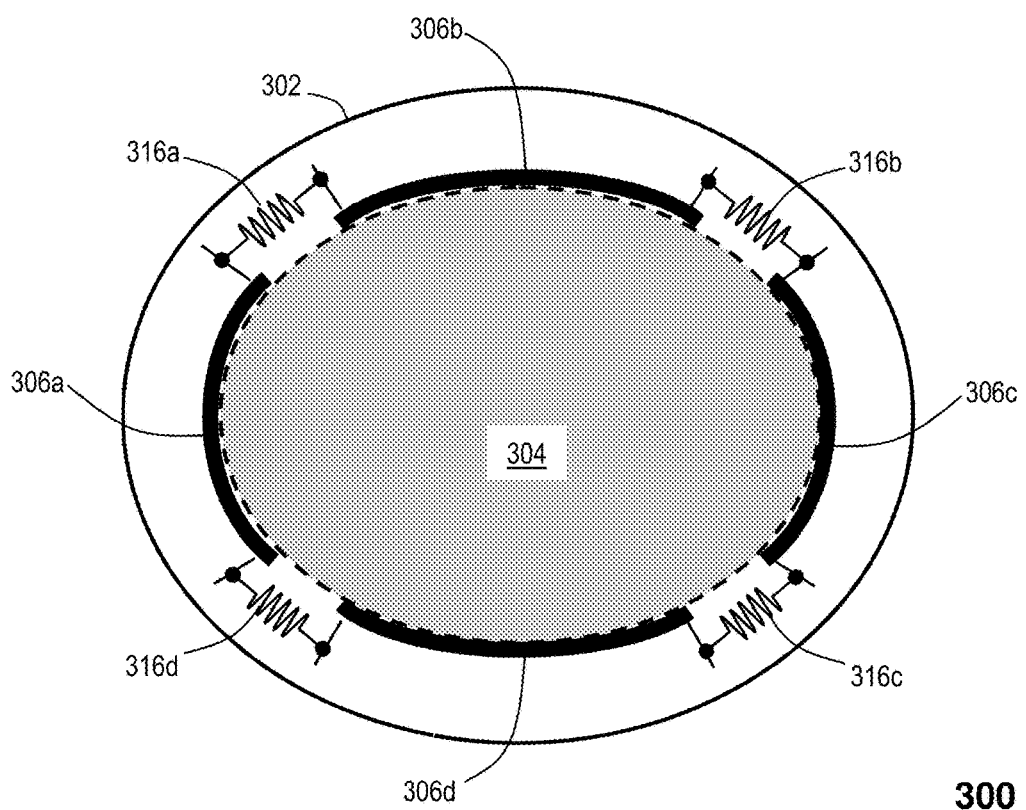
FIG. 3 depicts a schematic diagram of a horizontal cross-section of yet another embodiment of a helmet shock abatement system.
Figure 4A:
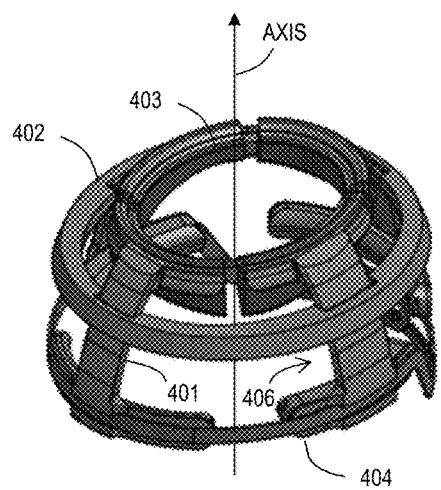
FIGS. 4A-4D depict top perspective, bottom, front and side views, respectively, of an illustrative embodiment of a helmet impact shock abatement system.
Figure 4B:
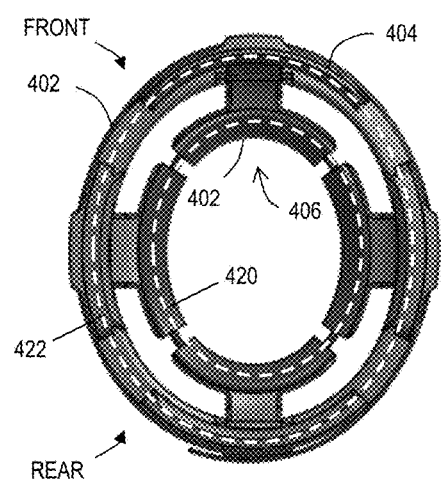
Figure 4C:
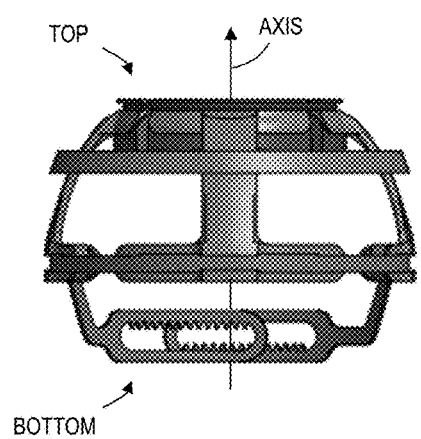
Figure 4D:
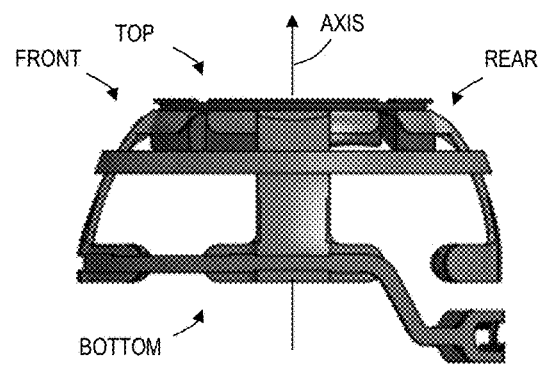

FIG. 3 depicts a schematic diagram of a horizontal cross-section of yet another embodiment of a protective system 300. The system 300 includes four lever extensions 306*a*, 306*b*, 306*c*, 306*d*, generally 306 that include arcuate surfaces configured to surround at least a portion of a perimeter of a user's head 304. For example, the lever extensions 306 can be positioned at top and/or bottom ends of levers, such as the aforementioned example levers 206 (FIG. 2).

The illustrative example includes deformable members that include springs 316*a*, 316*b*, 316*c*, 316*d*, generally 316, coupled between adjacent pairs of the lever extensions 306. An external force F is applied to a side of the helmet 302 results in a relative displacement between the helmet 302 and the user's head 304. One or more of the springs 316 can be deformed in response to a relative movement of the helmet 203, the user's head 304 and/or one or more of the levers 306.

In some embodiments, one or more of the levers can be configured to twist. For example, the twisting can be in response to a force applied to one or more elongated extensions at either or both ends of a lever assembly. In some embodiments, twisting is permitted by one or more of a mechanical configuration or a choice of material. Twisting of one or more of the levers can contribute to deformation of one or more deformable members, or springs, e.g., to convert a kinetic energy to a potential energy based on the twisting. In at least some embodiments, twisting includes a rotational displacement of one end of a lever with respect to an opposing end of the lever.

In at least some embodiments, one or more of the elongated portion of the lever and the extension are substantially rigid and joined by way of a linkage that facilitates a twisting. Alternatively or in addition, a twisting can be facilitated by a pivot about which the lever rotates. For example, the pivot can be flexibly mounted to one of a mounting frame and/or an interior surface of a protective shell or helmet. It is understood that one or more of the levers can include one or more joints, such as ball and socket joints.

FIGS. 4A-4D depict top perspective, bottom, front and side views, respectively, of an illustrative embodiment of a lever assembly 400. The lever assembly 400 can be referred to as a shock abatement system and/or a helmet suspension system that can be used in combination with a protective helmet wearable upon a portion of a human head, a neck or both. The illustrative helmet lever assembly 400 can be used alone or in combination with a protective helmet shell. For example, the protective helmet shell can be molded or otherwise formed from a material, such as a polymer, a composite, e.g., including a resin and a fibrous matrix, a metal, e.g., as used in armor, or any combinations thereof. In at least some embodiments, the helmet shell can be rigid. It is understood that the protective shell, e.g., the helmet, without limitation, can include a single layer of material or multiple layers of material and provides an external surface that is configured to receive a collision force. The multiple layers of material can be of the same or similar materials or different materials. For example, materials with a structural orientation, such as materials including fibers, e.g., woven materials, can be layered having different orientations.

The direction, number, and/or magnitude of an applied, e.g., collision, force depends upon an intended application for the helmet. In some instances, it is possible to generally categorize protective gear into at least four general categories, including those intended for: (i) single impact, single direction; (ii) single impact, multiple directions; (iii) multiple impacts, single direction, and (iv) multiple impacts, multiple directions. It should be understood that the shock abatement systems and protective techniques disclosed herein can be applied to one or more of these categories.

The lever assembly 400 includes a mechanism that facilitates mitigation of impact forces upon a user. For example, the mechanism can include a force-redirecting mechanism that, when placed between the protective shell and the human body, facilitates redirection of a portion of the collision force transferred to the human body.

The illustrative example helmet lever assembly 400 includes four levers 406 disposed about a central axis, corresponding to a vertical axis of an upright, or standing, human body. Each of the levers 406, respectively, extends between a upper end 403 and lower end 404. The levers 406 are pivotally attached to a pivot ring 402 providing a plurality of fulcra pivotally attached to the plurality of levers 406 at locations between their respective upper and lower ends 403, 404. When used with a protective shell, such as a helmet, the lever assembly 400 reacts to an applied force by pivoting one or more of the levers 406 about its respective fulcrum. It is believed that the pivoting action of the levers in reaction to in impulsive or impact force mitigate injuries to a human head, neck and/or back, when it is fully assembled. A vertical axis corresponding to a longitudinal axis of an upright human body or head is illustrated for reference. A vertical blow is primarily directed downward from above substantially along the vertical axis. Such impacts can result from falling objects, e.g., in a construction site and/or impacts resulting from the helmet being driven into another object, such as a beam, a mine shaft, and the like as might be caused by movement of objects and/or movement of a user.

In some embodiments, the lever assembly 400 can be assembled as a self-contained, wearable unit. In the illustrative example, the lever assembly 400 can be assembled into a free-standing assembly that can be worn with or without a protective shell. It should be understood that the shock abatement systems disclosed herein can be assembled into free-standing assemblies and used without protective shells. Such free-standing assemblies can be pre-assembled and inserted into or otherwise combined with protective shells. Alternatively or in addition the shock abatement systems can be combined with one or more protective shells and/or assembled in combination with such shells. In some embodiments, one or more components, e.g., the fulcra, can be attached to and/or integrally formed with the protective shell. It is envisioned that in at least some embodiments, one or more cantilevered segments can be formed by removing material from a portion of a shell. At least one of the one or more cantilevered segments can be operatively coupled to one or more of the example levers and/or lever assemblies disclosed herein to redistribute a non-trivial portion of a collision energy that absorbs and/or dissipates energy in directions other than a line of impact of the collision.

Figure 5:
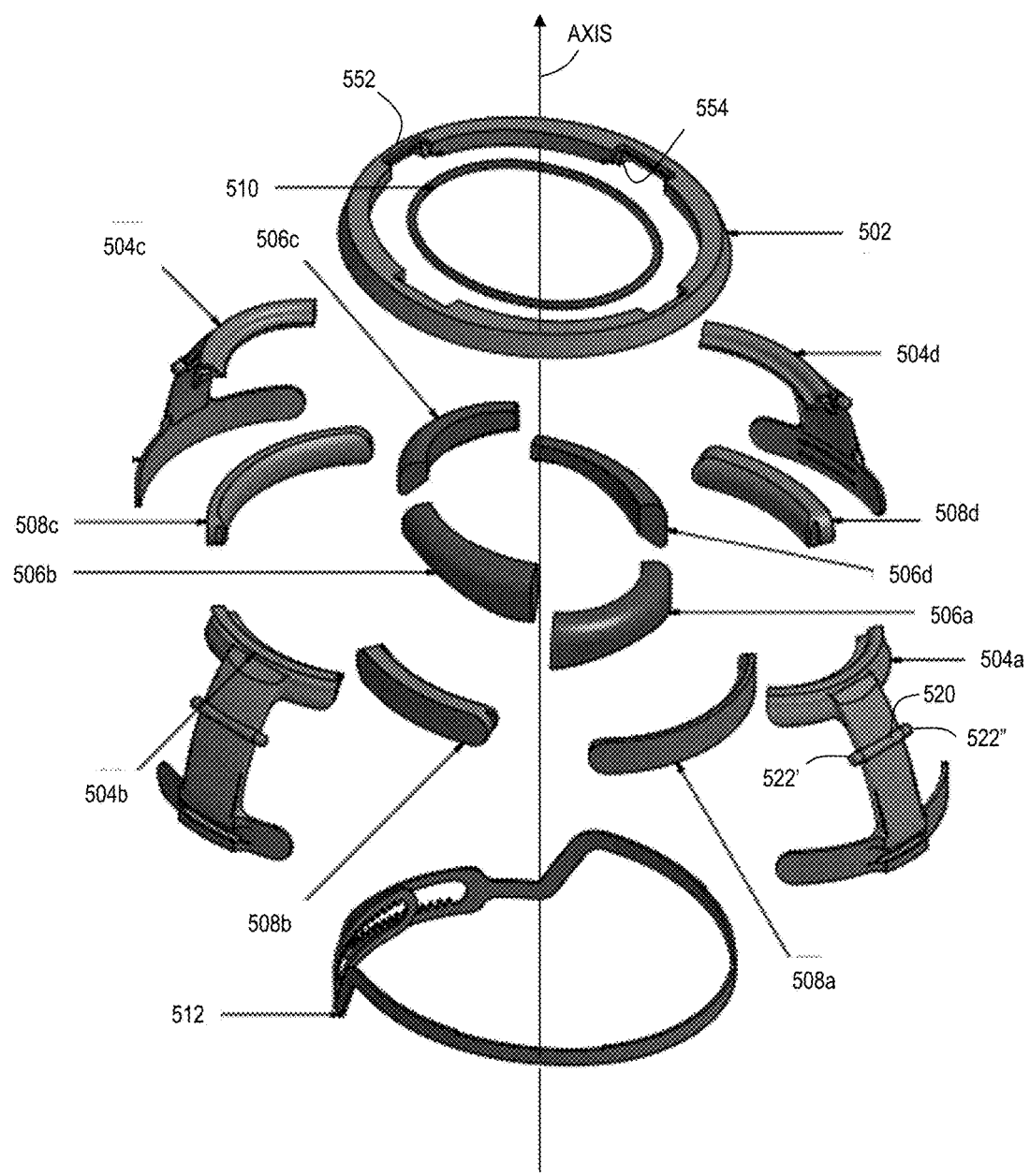
FIG. 5 depicts an exploded view of the helmet system depicted in FIGS. 4A-4D.

FIG. 5 depicts a top perspective, exploded view of an embodiment of a helmet shock abatement system 500, similar to the system 400 depicted in FIGS. 4A-4D. The example shock abatement system 500 includes a lever array 504. The lever array 504 includes four levers: a front lever 504a, a right side lever 504b, a rear lever 504c, and a left side lever 504d, generally 504. The levers 504 are elongated extending between a first end, e.g., a top end, and a second end, e.g., a bottom end. Each lever 504 also includes a respective pivot location 520 situated between the first and second ends that abuts a corresponding fulcrum. Each of the levers 504 rotates about its respective fulcrum. Although four levers are shown for illustration, it is understood that more or fewer levers can be employed. For example, a two lever application can include two levers that can be arranged in opposition, e.g., front and rear or left and right side. Other embodiments can include different numbers of levers, e.g., without limitation, three, five, six, nine, twelve.

In some embodiments, lever rotation can occur within a plane. Consider a hinge-type pivot in which rotation is substantially constrained to a plane substantially perpendicular to an axis of the pivot. Alternatively or in addition, rotation can occur more freely, e.g., within three dimensions. Consider a point fulcrum in which the lever 504 can rotate in three dimensions. By way of non-limiting arrangements, a pivot can include a ball-and-socket style joint or coupling. Such an engagement can include a partially spherical protrusion, e.g., a ball or a partially spherical cavity, e.g., a socket positioned at a pivot location along the lever 504 and a corresponding socket or ball positioned at an adjacent fulcrum. The ball-and-socket joint generally allows for multidirectional movement and rotation.

The example shock abatement system 500 also includes a mounting structure, e.g., a mounting frame 502 to which the levers of the lever array 504 are pivotally attached. The example mounting frame includes an enclosed ring 502, e.g., a circle or an oval, e.g., an ellipse or egg shape. The mounting frame 502 includes a fulcrum for each of the levers. The example fulcrum includes a recess 552 and an opposing pair of mounting points 554.

Each lever 504 of the lever assembly 500 includes a respective pivot location 520 including opposing pivot extensions 522', 522'', generally 522. In the illustrative embodiment, the pivot location 520 can include a pivot axle, e.g., defined at least in part by the pivot extensions 522 that can be integrally formed with each lever 504. It is understood that other embodiments can include separate parts, such as a pivot axle, and the like. The pivot extensions 522 are pivotally attached to respective mounting points 554, e.g., notches, channels, grooves or the like of the mounting frame 502. The mounting frame 502, e.g., by its mounting points 554, provides fulcra that support the levers 504. Accordingly, each lever of the lever array 504, when mounted to the mounting frame 502 by way of the pivot extensions 522, is rotatable about its respective fulcrum, e.g., about a pivot axis 520.

In the example system 500, each of the levers 504, includes a respective top deformable member 506a, 506b, 506c, 506d, generally 506, disposed at a respective top end of each of the levers 504. Likewise, each of the levers 504 also includes a respective bottom deformable member 508a, 508b, 508c, 508d, generally 508, disposed at a respective bottom end of each of the levers 504. One or more of the deformable members 506, 508 can include a spring, a compressible element, a resilient material, a compressible material, a compliant material, a conformable material, or any combination thereof. Deformable materials can include, without limitation, compressible materials, including, without limitation, spongy materials, foams, rubbers, polymers, gels, composites and the like. It is understood that one or more of the deformable members 506, 508 can be in contact with a portion of a body, such as a human head, face and/or neck. One or more of the deformable members 506, 508 can be configured to touch the body during normal wear, e.g., static use, during periods of reaction to external forces including impulsive or impact forces as might be experienced during a collision, and/or subsequent to any such collisions.

Each of the top deformable members 506, or more generally top attachments 506, can be attached to the first end, or top portion of each lever 504. The size, shape and or composition of each of the top attachments 506 can be sized, shaped and/or otherwise positioned to be in contact with an adjacent anatomical feature of the body. For the example helmet application, the top attachments 506 are sized and/or shaped to confirm to a top or crown portion of a user's head. For example, the top attachments 506 can form part of the helmet shock abatement mechanism to facilitate action of the levers 504 in response to a substantially vertical impact received on an external surface of the helmet, while also offering an added measure of protection to the user. Namely, the top attachments 506 can be formed from a deformable material that can change shape, at least temporarily, under an impact to absorb energy, without injuring an adjacent region of the user's scalp. For example, the top attachments 506 can be formed from a resilient material.

Alternatively or in addition, one or more of the bottom deformable members 508, or more generally bottom attachments 508, can be formed from a resilient material and/or a compressible material and attached to the lower portion of each lever 504. The size, shape and or composition of each of the bottom attachments 508 can be sized, shaped and/or otherwise positioned to be in contact with an adjacent anatomical feature of the body. For the example helmet application, the bottom attachments 508 are sized and/or shaped to conform to a side portion of a user's head, e.g., a frontal or forehead region, a side or temple region and/or a rear or occipital region. It is understood that one or more of the bottom attachments can be configured to conform to multiple regions of a bodily anatomy, such as forehead-temple and/or temple-occipital, and the like. In at least some embodiments, one or more of the bottom attachments 508 can form part of the shock abatement mechanism to facilitate action of the levers 504 in response to a side or vertical impact received on an external surface of the helmet, while also offering an added measure of protection to the user. Namely, the bottom attachments 508 can be formed from a compressible material that can deform, at least temporarily, under an impact to absorb energy, without injuring an adjacent region of the user's scalp.

The shock abatement system 500 can include one or more springs, such as a top spring member 510 that absorb and/or store energy in response to movement of the levers 504. In the example shock abatement system 500, the spring member 510 includes an enclosed loop disposed along an outer facing surface of a top portion of each of the levers 504. The top resilient member 510 can include a spring and/or an elastomeric material, such as an elastic band, a rubber band, or a resilient O-ring. Although the illustrative examples portray an enclosed elastomeric loop, it is understood that any deformable material and/or configuration can be used. For example, a top portion of one of the levers 504 can be attached to a top portion of one or more of the other levers 504 by one or more springs. For example, springs can be used between adjacent levers 504, and/or between non-adjacent levers 504, e.g., between opposing levers 504. According to any of the example configurations, an impact or collision force induces a rotation of one or more of the levers 504, which results in a deformation of the one or more spring members 510 to absorb, and/or store, and/or dissipate kinetic energy of the impact/collision. It is understood that deformations of any of the various devices and/or materials disclosed herein can include one of plastic deformations, elastic deformations, or any combination thereof.

In at least some embodiments, one or more deformable members, such as the example spring members 218 of FIG. 2, can be placed between the levers 504 and a protective shell 202 (FIG. 2). Accordingly, when the levers 504 move, energy may be absorbed by deformation of the springs. More generally, the deformable members, e.g., spring members, do not have to be limited to contact foams and/or o-rings. More generally, any other kinds of spring can be used. Such springs, in operation, can cooperate with action of the levers. It is understood that such spring members alone or in combination can facilitate a "threshold strategy" in which a type of mechanical response of the protective system can differ based on a magnitude and/or acceleration of a collision.

The spring member 510, without limitation, can include a tension spring having one or more of a coil spring or an elastomeric material, e.g., such as an elastic band. In the example embodiment the upper tension spring, 510, is an elastic or rubber O-ring, e.g., about 4 mm in diameter. Other embodiments can use any spring or rubber like material that can work under tension that can absorb energy by deformation in a different direction than that of the vector of the original impact. In this embodiment extrusion is used to create a cylindrical rubber band that is later cut, e.g., at a 45 degree angle in each of its ends, and glued together using an epoxy adhesive to form an enclosed ring of a predetermined size and shape.

The top resilient member 510 can remain in tension and/or slack with respect to any and/or all of the levers 504 during normal periods of usage. Periods of use can be described generally as a static storage mode, a static use mode, and a dynamic impact mode. The static storage mode can include periods during which the helmet and/or shock abatement system is not placed on a portion of a body, e.g., during periods of non-use or storage. The static use mode can include periods during which the helmet and/or shock abatement system is placed on a portion of a body, e.g., during periods of usage or wear. The dynamic use mode can include periods during which the helmet and/or shock abatement system is placed on a portion of a body and exposed to external forces, such as exposed to during periods of impacts or collisions of the helmet with another object.

By way of example, in response to a vertically applied force, e.g., to a top portion of the helmet or head, the top portions of the levers 504 generally rotate outward, away from the central axis. Such outward rotation of the top portions of the levers 504 generally deforms the top resilient member 510 by stretching it. The stretching absorbs and/or otherwise stores kinetic energy of the lever rotation as potential energy by the expansion and/or compression of the resilient material of the top resilient member 510. In at least some embodiments, upon a removal of the vertical force, the potential energy stored in the top resilient member 510 can be transferred back to the levers 504 to induce a rotation that returns the levers 504 to a pre-stressed configuration.

In at least some embodiments, the shock abatement system can be configured with clasps, locks, catches, ratchet mechanisms or the like, to retain the levers in a rotated configuration, thereby preventing a transfer of potential energy stored in the top resilient member 510 back to the levers. Although the illustrative examples include transformations of a kinetic energy associated with a collision into a potential energy, e.g., by deformation of a resilient material, such as a spring, it is understood that other energy absorbing and/or dissipating techniques can be used. For example, energy of a collision force can include transforming a kinetic energy to one of a potential energy, a mechanical energy, a thermal energy, an acoustic energy, an electrical energy, a magnetic energy, or any combination thereof.

In the example system, each of the levers is substantially aligned in a plane that contains the central axis. Rotation of each lever can be substantially confined to this plane in a manner that controls positions of the top and/or bottom attachments with respect to a user's head and/or neck. The pivot portions of the levers and/or the fulcra can be disposed in a plane perpendicular to the central axis. Accordingly, the example arcuate top portions 506, collectively, can form a first oval 420 (FIG. 4B) having a first size, e.g., small, during static modes of operation, and a second oval 422 (FIG. 4B) having a second size, e.g., large, during dynamic modes of operation. Likewise, the example arcuate bottom portions 508, collectively, can form a first oval having a first size, e.g., large, during static modes, and a second oval having a second size, e.g., small, during dynamic modes of operation. Sizes and/or shapes of the ovals can be controlled by one or more of the sizes of the levers 504, positions of the pivots 520, size, shape and/or orientation of the top attachments 506 and/or the bottom attachments 508, and/or characteristics, e.g., size, shape, resiliency of the top spring member 510.

The levers 504 of the example shock abatement system 500 are curved to provide a concave surface facing inward towards the central axis. For the example helmet application, the shock abatement system 500 includes an open-ended interior region that is sized and/or otherwise shaped to accommodate at least a top portion of a user's head.

In the illustrative embodiment, the shock abatement system 500 includes an adjustment band 512 that includes an occipital support with adjustment mechanism of the ratchet kind. However other embodiments can use any of the available adjustment mechanisms and/or occipital supports. Alternatively or in addition, the adjustment band can include one or more other components to facilitate fitting and/or securing the shock abatement system 500. Examples include, without limitation, a strap, belt or pad(s) that conforms to a portion of the object being protected, such as an adjustable strap that conforms to anatomical portion of the body, e.g., an adjustable nape or chin strap.

The adjustment band 512 in this example embodiment can be made of a flexible material with high tensile resistance like polymers, e.g., polypropylene. This material can be injected, casted, press-cut formed, or the like, using known manufacturing techniques to fully form all the details of the grooves needed for the adjustment mechanism. However, other embodiments that use other adjustment mechanisms can use different means of manufacturing, such as punching. Any flexible material with relatively high tensile strength can be used like other polymers, leather, metals, foils, etc.

The adjustment band 512 is illustrated along an outer bottom end of at least some of the levers 504. It is understood that other configurations can include one or more adjustment bands, with at least some of the adjustment bands being fitted or otherwise placed along an interior or inner portion of the lever, along an exterior or outer portion of the lever, or along a combination of interior and exterior portions of different levers. For example, the lever 504 can be formed with an opening, such as a loop, a slot, a channel, and the like, to accommodate at least a portion of the adjustment band 512, e.g., as in a belt threaded through a belt loop of a garment. In at least some embodiments, the adjustment band 512 does not inhibit movement of the levers. For example, the adjustment band can be placed along and/or at attached to an interior region of the protective shell, without inhibiting movement of the levers.

Figures 6A, 6B:
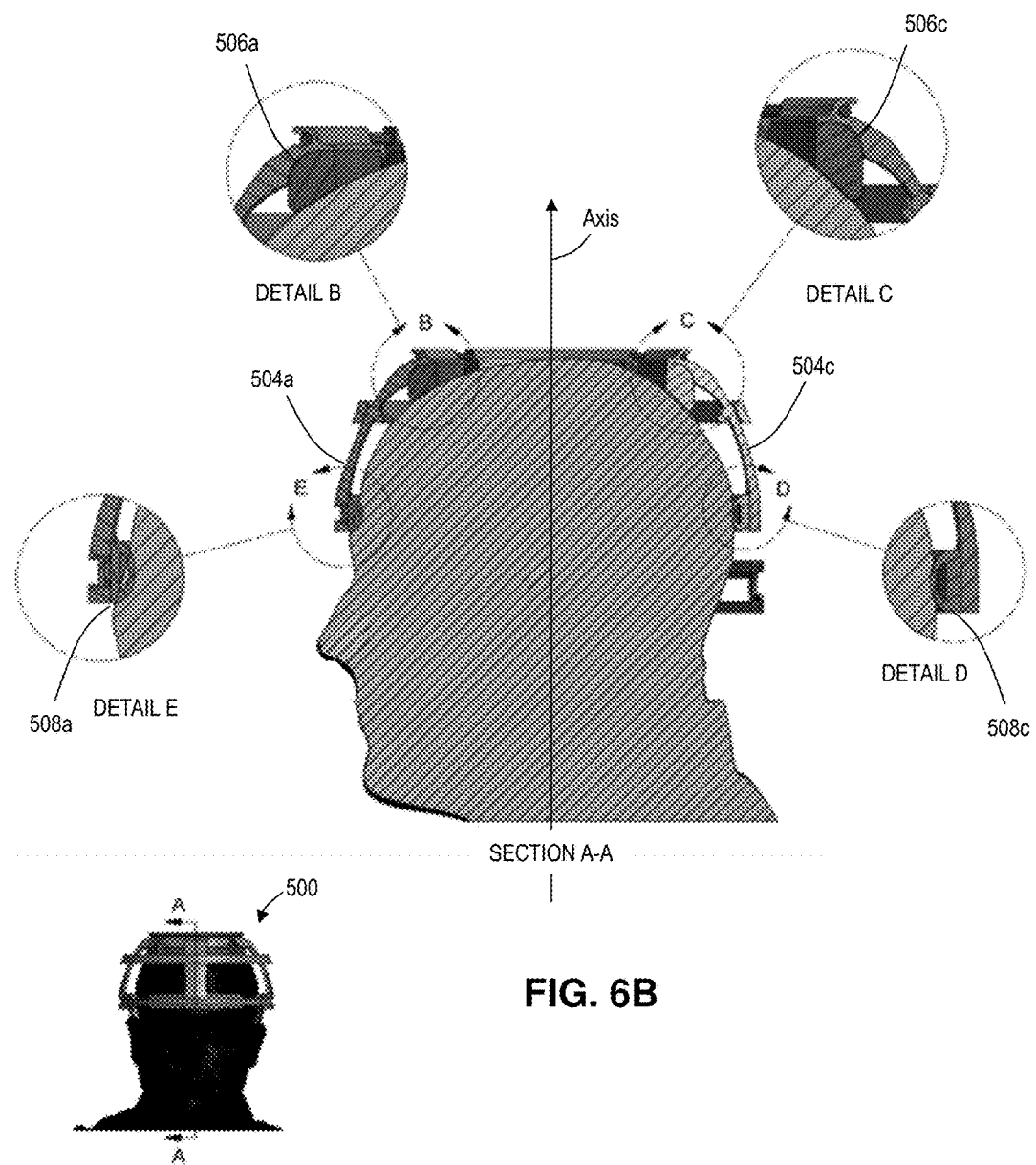
FIG. 6B depicts a sagittal plane cross-section of a human head bearing the helmet system depicted in FIGS. 4A-4D and 6A.

FIG. 6B depicts a sagittal plane cross-section of a human head bearing the example helmet shock abatement system 500 depicted in FIGS. 4A-4D, 5 and FIG. 6A. Although a protective shell is not shown for clarity it should be understood that the shock abatement system 500 can be positioned between a protective shell and the user's body. It is generally understood that a size and or shape of a protective helmet shell can be determined according to one or more of an application, e.g., sports, work, military, vehicular, a user preference, and the like. In particular, the cross-sectional view illustrates positioning of front and rear top attachments, e.g., resilient members 506a, 506c along a longitudinal plane at the crown of the user's head. Also shown, are positioning of the front and rear bottom attachments, e.g., compressible members 508a, 508c along a lower periphery of the user's head, e.g., in a longitudinal plane positioned slightly above the brow and or adjacent to an occipital region.

Figures 7A, 7B:
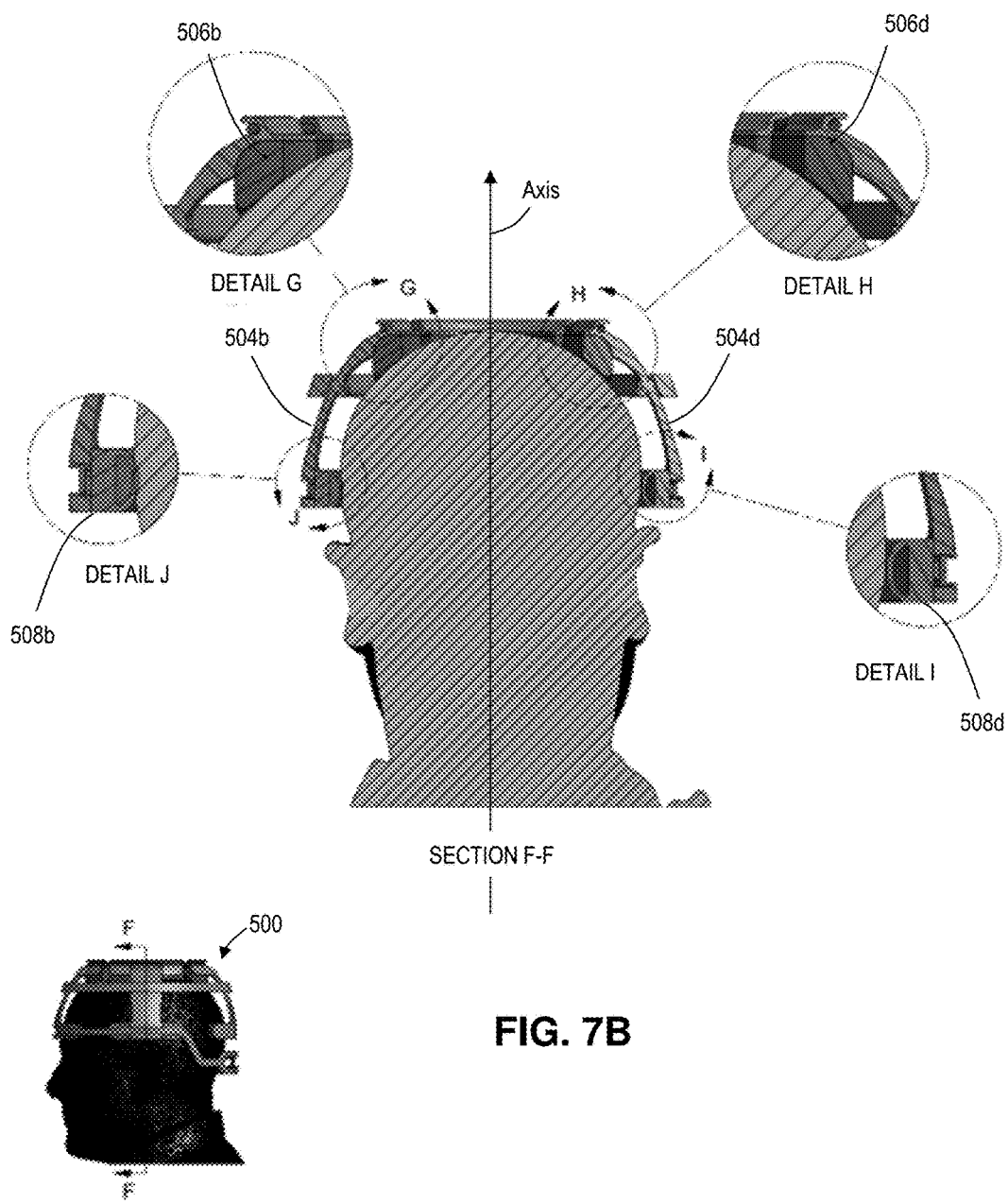
FIG. 7B depicts a frontal plane cross-section of a human head bearing the helmet system depicted in FIGS. 4A-4D and 7A.
Figure 11A:
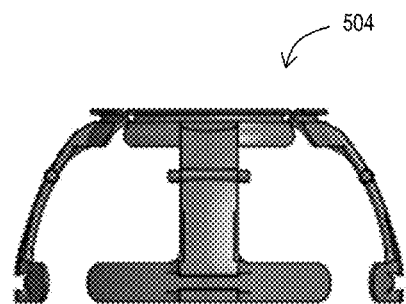
FIGS. 11A-11D depict front, side, bottom and top perspective views, respectively, of an example lever assembly of the helmet system depicted in FIGS. 4A-4D.
Figure 11B:
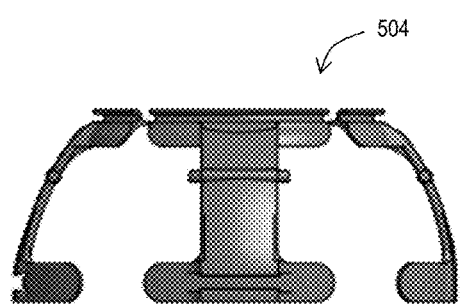
Figure 11C:
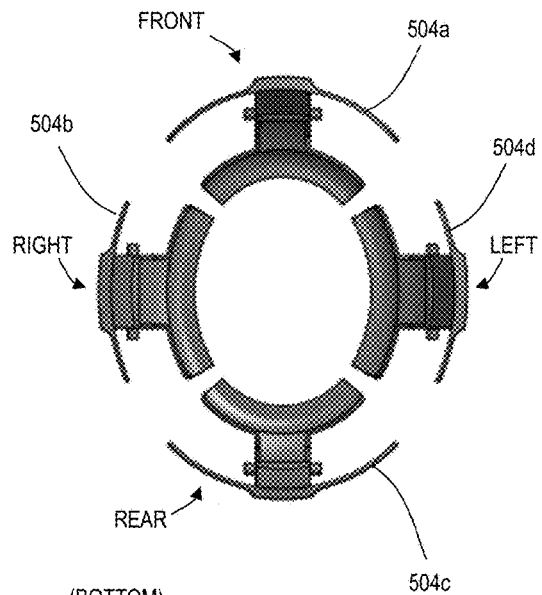
Figure 11D:
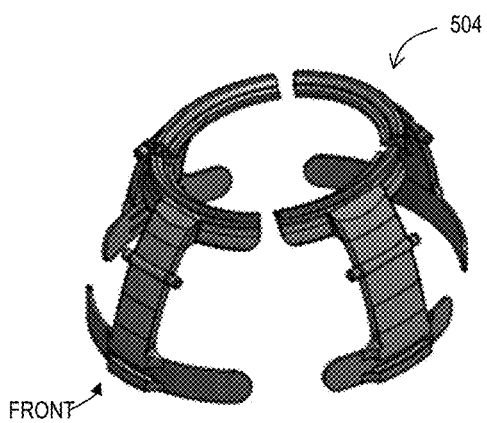
Figure 12A:
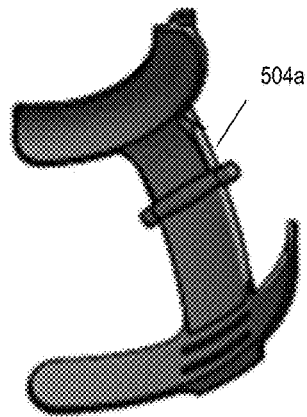
FIGS. 12A-12D depict bottom perspective, front, bottom and side cross-section views, respectively, of a lever of the example of the lever assembly depicted in FIGS. 11A-11D.
Figure 12B:
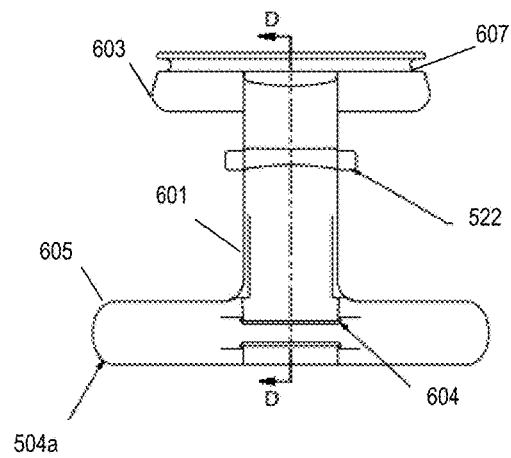
Figure 12C:
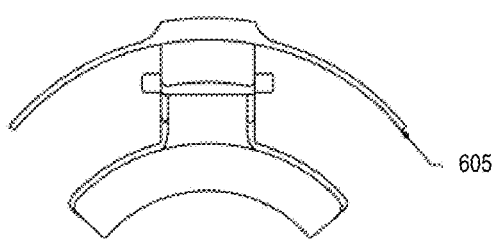
Figure 12D:
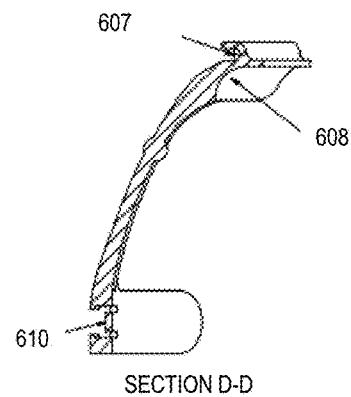
Figure 13A:
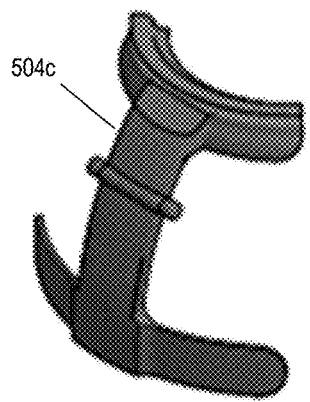
FIGS. 13A-13D depict top perspective, front, bottom and side cross-section views, respectively, of an alternative embodiment of a lever.
Figure 13B:
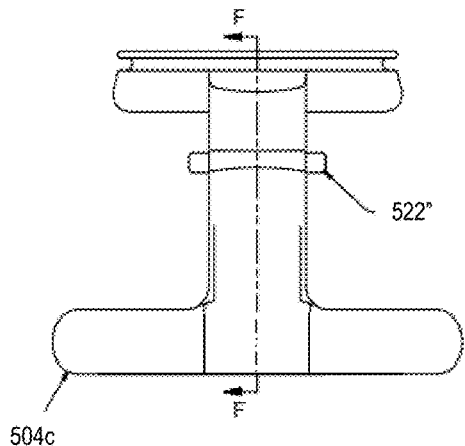
Figure 13C:
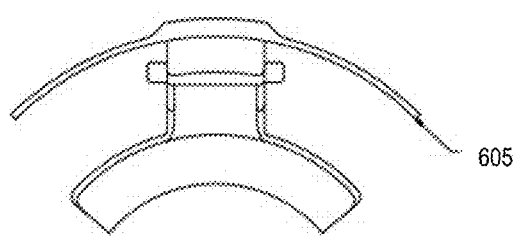
Figure 13D:
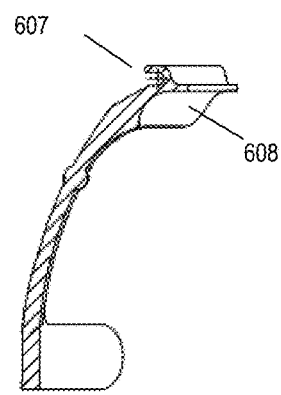
Figures 14A, 14B:
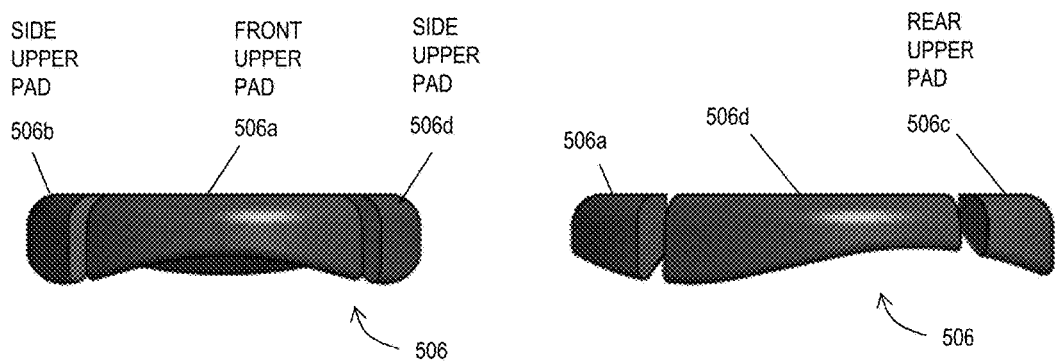
FIGS. 14A-14D depict front, side, bottom and bottom perspective views of an upper pad assembly of the helmet system depicted in FIGS. 4A-4D.
Figures 14C, 14D:
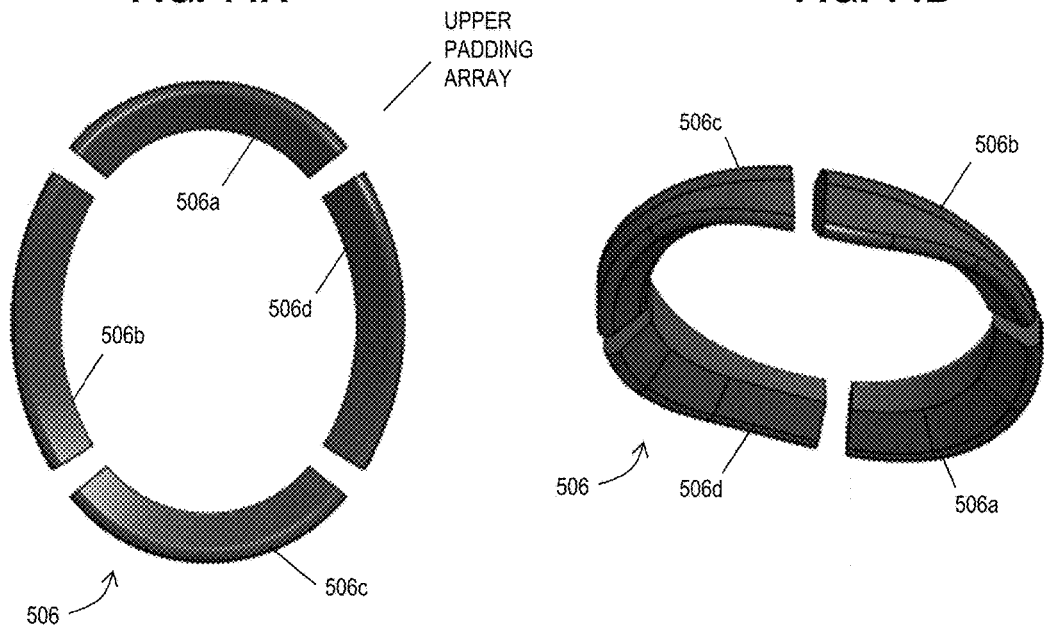
Figure 16A:
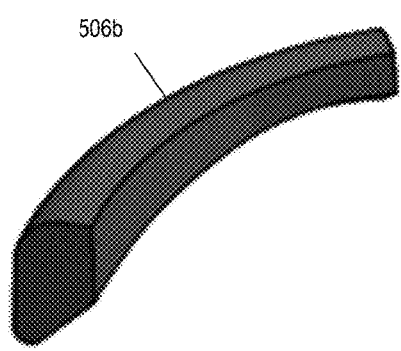
FIGS. 16A-16D depict top perspective, top, side and front views of a side pad of the upper pad assembly depicted in FIGS. 14A-14D.
Figure 16B:
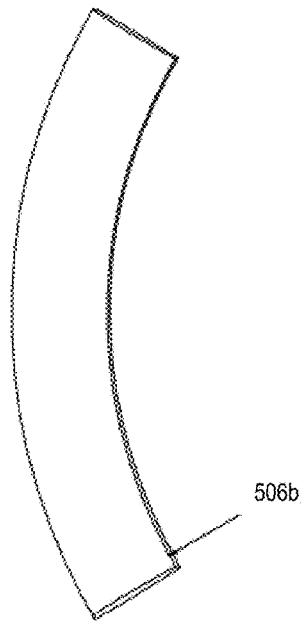
Figure 16C:
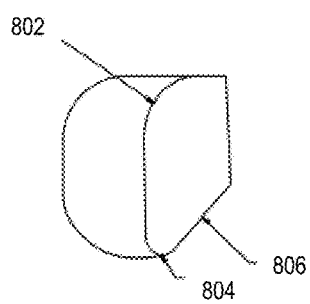
Figure 16D:
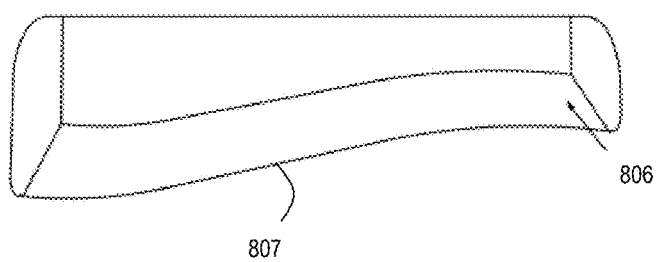
Figure 18A:
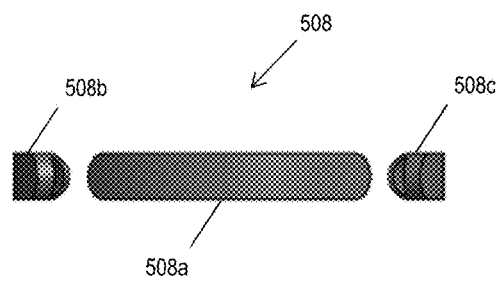
FIGS. 18A-18D depicts the front, side, a bottom and top perspective views of a lower pad assembly of the helmet system depicted in FIGS. 4A-4D.
Figure 18B:
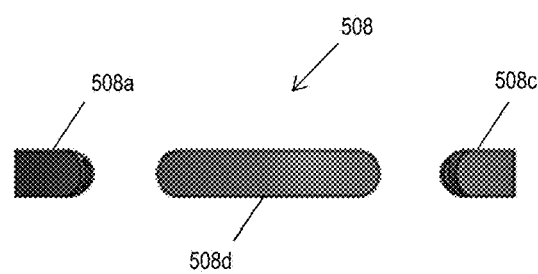
Figure 18C:
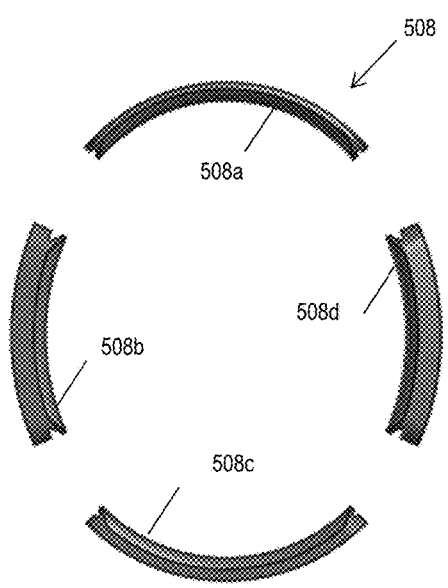
Figure 18D:
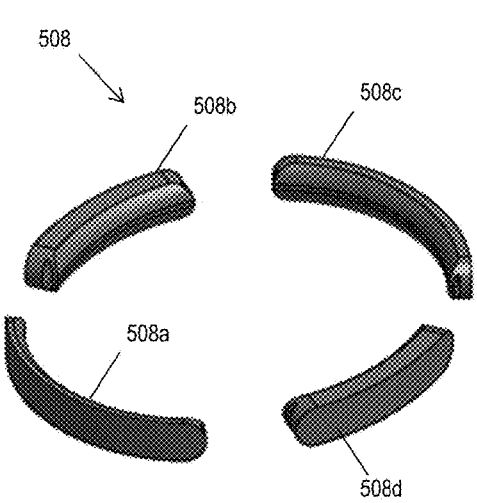

FIG. 7B depicts a frontal plane cross-section of a human head bearing the helmet shock abatement system depicted in FIGS. 4A-4D, 5 and FIG. 7A. In particular, the cross-sectional view illustrates positioning of left and right side top resilient members 506b, 506d along a transverse plane at the crown of the user's head. Also shown, are positioning of the left and right side bottom compressible members 508b, 508d along a lower periphery of the user's head, e.g., in the transverse plane positioned adjacent to a temple region of the user's head.

FIG. 8B depicts a sagittal plane cross-section of the shock abatement system 500 depicted in FIGS. 4A-4D, 5, 8A and 8C. In particular, an impact or collision force Fc is shown directed downward, along the central axis. It is generally understood that the example helmet shock abatement system 500 fits within a protective helmet shell. A region of engagement between the shock abatement system 500 and the helmet shell (not shown) can occur along an outer surface, e.g., an outer slanted surface, of the mounting assembly, or pivot ring 502. It is further understood that in at least some embodiments, an open space is provided between portions of the shock abatement system 500 and an interior surface of the protective helmet shell. The open space is generally sufficient to allow a mechanism of the shock abatement system 500, such as the levers 504, to operate, e.g., pivot, about their respective axes without interfering with or otherwise being hindered by the protective helmet shell. Beneficially, the open space allows for air circulation, cooling and/or mitigation of perspiration.

In more detail, the downward collision force Fc pushes the protective helmet shell in a downward direction along the central axis (this can be viewed from a frame of reference of the helmet, in which it would appear that the user's head is moving upward, towards the point of impact). The downward movement of the helmet shell (upward movement of the head) urges the pivot ring 502 in the same, downward direction. The collision force result in multiple collision force elements applied through each of the resilient top portions 506 to the crown portion of the user's head. The head, in turn, provides head reaction force components $F_{H1}$, $F_{H2}$, generally $F_H$, operating against respective ones of the resilient top portions 506. The head reaction force components $F_H$ cause the top portions of the levers 504 to rotate upward and outward, e.g., the front lever 504a rotates counterclockwise, whereas the rear lever 504c rotates clockwise.

The outward rotation of the top portions of the levers 504 is accompanied by an inward rotation of the bottom portions of the levers. The inward rotation of the lower lever portions moves the lower compressible portions 508 inward towards the user's head. Namely, the lower portions of the levers induce inward redistribution forces $F_{R1}$, $F_{R2}$, $F_{R3}$, $F_{R4}$, generally $F_R$. In the illustrative example, a vertical collision force upon a top portion of a helmet shell that would tend to compress portions of a user's neck and/or spine is transformed into a lesser first annular force applied to a crown portion of the top of the head, a second lateral force directed inward towards the central axis, and absorption and/or storage of at least some of the kinetic energy of the collision by one or more of the deformable components and/or dampening or dispersive components. Beneficially, the lateral or inward directed forces do not compress the spine or neck of the user. Accordingly, the shock abatement system 500 transforms a substantially unidirectional, e.g., vertical, force into multiple component forces, e.g., perpendicular, over a variety of different directions, including directions that are at least 90 degrees from an incident direction of the collision force.

The pivot location or axis 520 can be located at a predetermined position along a length of the lever 504a. For example, the pivot axis 520 can be located centrally, substantially equidistant from either end of the elongated lever 504a. Alternatively or in addition, the pivot axis 520 can be located closer to one end or the other. It is understood that in at least some applications, the pivot location can be at one of the top and/or bottom ends of the lever 504. In the illustrative example, the pivot axis 520 is located closer to a top portion than a bottom portion of the lever 504a. In operation, the lever 504 rotates about the pivot axis 520. It is generally understood, as with lever machines in general, that a mechanical advantage can be obtained according to the location of the pivot position. For analytical applications, a mechanical advantage of a lever 504 can be equated to a transformer of an electrical circuit in which a driving voltage can be stepped up or stepped down according to the number of turns of the transformer windings. That is, the mechanical advantage or transformer effect can be controlled to increase or decrease a redistribution of a driving force based on a positioning of the pivot along the lever 504. A ratio of turns corresponds to placement of the pivot position along the lever.

In addition to mechanical advantage, lengths of travel of respective ends of the lever 504a when rotated about the pivot axis 520 can be controlled, at least to some degree, by placement of the pivot position or axis 520 along the length of the lever 504a. According to the illustrative example in which the pivot axis 520 is closer to a top portion of the lever 504a, the top portion will travel less than the bottom portion. Lengths of travel of the respective ends can be determined according to a product of a length between the pivot axis 520 and the respective end and an angular displacement of the lever measured in radians.

In some embodiments the pivot axes 520 of every lever of the lever assembly are positioned at a common distance from one end, e.g., the top, of the lever 504. In the example embodiment, the levers are substantially the same length, and the pivot axes are located at a common distance with respect to all levers of the lever assembly 504. Alternatively or in addition, one or more of the levers can have different lengths from the pivot axes 520 to the other ends of the lever, e.g., the bottom. In some embodiments, placement of the pivot axes differ among the levers 504. Such lever length and/or pivot location can be used to tailor a desired redistribution of forces in response to a driving, e.g., collision or impact force.

FIGS. 9A-9D depict a lateral view of the helmet shock abatement system 500 depicted in FIGS. 4A-4D in various stages of deformation when exposed to a vertical impact or collision force. FIG. 9A illustrates a side view of the shock abatement system 500 in a static mode at rest and without deformation, e.g., not placed on a user's head. The top portions of opposing levers 504a, 504c in the sagittal plane are separated by a first distance $d_{L2}$. FIG. 9D illustrates a corresponding separation of the bottom portions of the same levers 504a, 504c in the sagittal plane, $d_{L1}$. FIG. 9B illustrates a side view of the shock abatement system 500 in a static use mode, e.g., at rest upon a user's head. In the example configuration, the static use mode results in a relatively small deformation. Namely, the top portions of opposing levers 504a, 504c in the sagittal plane are separated by a second distance $d_{U2}$. FIG. 9D illustrates a corresponding separation of the bottom portions of the same levers 504a, 504c in the sagittal plane, $d_{L2}$. Likewise, FIG. 9C illustrates a side view of the shock abatement system 500 during a dynamic impact mode, e.g., responding to a vertically downward collision force Fc applied to a top of the user's head, which results in a relatively large deformation. The top portions of opposing levers 504a, 504c in the sagittal plane are separated by a third distance $d_{U3}$. FIG. 9D illustrates a corresponding separation of the bottom portions of the same levers 504a, 504c in the sagittal plane, $d_{L3}$. According to the example shock abatement system:

$$d_{L1} > d_{L2} > d_{L3} \qquad \text{Eq. 1}$$

and $$d_{U1} < d_{U2} < d_{U3} \qquad \text{Eq. 2}$$

It is understood that in some embodiments configurations of the static at rest and static use modes can be substantially the same, e.g., $d_{L1}=d_{L2}$ and/or $d_{U1}=d_{U2}$.

FIGS. 10A-10C depict top perspective, top and section side views, respectively, of an illustrative embodiment of the mounting frame portion 502 of the helmet shock abatement system 500 depicted in FIGS. 4A-4D. By way of illustration, the pivot ring, 502, is used to hold each lever 504a, 504b, 504c, 504d (FIG. 5), in place and allows the levers to pivot freely. In the illustrative embodiment, the mounting frame 502 includes an enclosed curved structure, e.g., a circle or oval. Although the illustrative mounting structure includes an enclosed ring-like structure, it is understood that the mounting frame 502 can include an open structure, such as an open-ring, e.g., a split ring or "C" shape, a series of arcs and/or one or more substantially straight segments.

In the illustrative embodiment, an interior perimeter of the mounting structure, or pivot ring 502, includes a front lever cavity 552a, a right side lever cavity 552b, a rear lever cavity 552c, and a left side lever cavity 552d, generally 552. The lever cavities are formed as a cutout, notch or indent from an otherwise unbroken interior perimeter, allowing the levers 504 to be positioned in a low-profile manner, at least partially within the pivot ring 502.

In more detail, each of the lever cavities 552 includes a pair of opposing pivot cavities 554. The pivot cavities 554 are sized and positioned to accept the pivot extensions 522 (FIG. 5). The pivot cavities 554 provide a fulcrum that generally allows the pivot extensions 522 to rotate within the pivot cavities 554, to facilitate rotation of the levers 504 in response to collision forces.

In at least some embodiments, the pivot ring 502 includes an angled side perimeter 553, or a slanted surface, that facilitates a wedging of the pivot ring 502 within an interior region of a helmet. It is understood that other shapes can provide a desirable wedging action, including curved surfaces, e.g., convex as in a circular or parabolic arc. In some embodiments, the slanted surface 553 of the pivot ring 502 forms a frictional engagement with the interior surface of the protective shell, or helmet without requiring any other fasteners, such as glues and/or adhesives. In some embodiments, the interior surface of the helmet includes a feature, such as a retaining lip, ridge, groove, snap, or the like, that facilitates a snap fit and/or in interference fit between the pivot ring 502 and the helmet. Alternatively or in addition, an adhesive is applied to one or more of the pivot ring 502 and/or an interior surface of the helmet to hold a mechanism formed by the pivot ring 502 and the lever assembly 504 in place, inside the helmet.

In some embodiments, the pivot extensions 522 (FIG. 5) fasten to the interior portion of the protective shell, or helmet. For example, the interior surface of the helmet can include pivot supports (not shown) into which the pivot extensions 522 are placed. In some embodiments, the pivot extensions 522 attach to the pivot supports using a snap-fitting arrangement. Alternatively or in addition, a separate pivot mounting structure can be provided for each of the levers 504 (FIG. 5) to secure the levers 504 in a rotatable engagement about their respective pivot axes 522.

The slanted or wedging outer surface of the example pivot ring 502 responds to a downward vertical blow, by forcing the wedging surface further into an interior surface of the helmet, e.g., towards a top of the helmet. Beneficially, the pivot ring 502, when engaged, can move together with the helmet shell, allowing the levers to react to external forces, such as the impact force, promoting a relative displacement of the user's head and the helmet shell. The displacement together with rotations of one or more of the levers 504 can facilitate a redirection and/or redistribution of a reaction forces to the impact force of the collision.

One or more of the general shape of the pivot ring and the wedging surface facilitate a secure fit for a variety of different helmets. Namely, the pivot ring 502 can provide a universal frame that mounts to multiple helmets. For example, the pivot ring 502 fits into a dome by including a wedge that wedges the pivot ring 502 into an anchored position, and maintains the pivot ring 502 in the anchored position when exposed to a hit from a top of the head. An impact from the top results in the whole anchored ring moving with helmet. The size and/or shape of the ring can allow for a universal fit, allowing the levers to work in any shell as long as elliptical, semi-elliptical, or egg-shaped.

FIGS. 11A-11D depict front, side, bottom and top perspective views, respectively, of an example lever assembly 504 of the helmet shock abatement system 500 depicted in FIGS. 4A-4D. In some embodiments, one or more of the levers 504a, 504b, 504c, 504d are formed from a substantially rigid material, such as a rigid polymer, a rigid composite, a metal, an alloy, a ceramic, or any combination thereof. Alternatively or in addition, one or more of the levers 504a, 504b, 504c, 504d are formed from a flexible material, such as a polymer, a composite, a metal, an alloy or any combination thereof. The levers 504 can be formed by injection molding, casting, machining, mechanical assembly, or any combination thereof.

It is understood that in at least some embodiments, one or more of the levers 504 can provide different material properties. For example, front and rear levers 504a, 504c can be substantially rigid, whereas, side levers 504b, 504c can be flexible. Alternatively or in addition, one or more of the levers 504 can provide different material properties within the same lever 504. For example, an elongated central portion of the lever 504 extending between the first and second ends can be substantially rigid, whereas, top and/or bottom portions extending outward and away from the elongated central portion can be substantially flexible. In at least some embodiments, the elongated central portion and the top and bottom extensions can provide different material properties, e.g., having different stiffness profiles.

It is further understood that one or more of the levers can be formed as a unitary member, e.g., according to one or more of molding, casting and/or machining processes. Alternatively or in addition, one or more of the levers can be formed as an assembly, in which one or more elements of the lever, e.g., the elongated central portion, the top extensions, the bottom extensions, the pivot extensions, and the like can be formed as an assembly. Assembly can include the use of one or more mechanical fasteners, chemical fasteners, thermal or welding techniques, and combinations thereof. Mechanical fasteners can include, without limitation, screws, nails, staples, snap fit engagements, and the like.

FIGS. 12A-12D depict bottom perspective, front, bottom and side cross-section views, respectively, of the front lever 504a of the example lever assembly 504 depicted in FIGS. 11A-11D. The lever 504a includes an elongated central member 601 extending at least partially in a longitudinal direction, e.g., along a central axis. The elongated member 601 can be substantially straight, at least partially curved, piecewise linear, curvilinear. In the illustrative example, the elongated member 601 is curved along a lateral plane cross-section to provide structural support, while allowing a controlled flexing or bending under lateral stresses, and curved along a longitudinal plane cross section, e.g., section D-D. The example lever 504a extends from a first or top end to a second or bottom end, having a top extension 603 and a bottom extension 605.

The example lever 504a is curved in cross-section. Such curved cross section can enhance strength of the elongated member of a given thickness. It is understood that lever cross sections can include one or more of convex curves, concave curves, linear segments, e.g., forming obtuse and/or acute angles, or any combination thereof. Such non-linear configurations can hinder and/or otherwise prevent leaf-spring action of the lever 504a as disclosed herein.

In this embodiment all of the levers 504a, 504b, 504c, 504d, have common elements that follow a predefined design logic. The top extension member 603 extends laterally from an axis of the elongated central member 601. In more detail, the example embodiment of the top extension member is curved about the axis. The top extension member at least partially defines a shaped surface, e.g., a scoop 608. In some embodiments, the shaped surface 608 can be planar, e.g., slanted. Alternatively or in addition the shaped surface can be curved, e.g., in a convex or concave manner, as shown. It is understood that shapes can be combined, e.g., having one or more straight segments and/or one or more curved segments.

The example scooped surface 608 defines an arc, e.g., a quarter circle arc. An upper deformable material, e.g., spring, 506a, 506b, 506c, or 506d can be attached to at least a portion of the scooped surface 608, e.g., using an adhesive. More generally, any suitable fastening means can be employed, such as adhesives, tapes, glues and the like, mechanical fasteners, such as staples, rivets, pins, screws, nails, snap-fit arrangements, over-molding, and the like. The example geometry promotes a snug fit between the top extensions 603 of the levers 504 and the upper springs 506a, 506b, 506c, 506d. In general, any of the deformable materials disclosed herein can be formed by one or more techniques, such as, molding, over-molding, casting, extruding, machining, assembling, or any combination thereof.

It is understood that in some embodiments, the upper side of the levers and the deformable material can be fashioned as a single unit, e.g., from the same material. It is understood further that densities and/or shapes/configurations of the deformable material can differ from the levers to provide different resiliencies, e.g., allowing the lever to be stiffer than the deformable material.

In the illustrative example, the upper surface of the scoop 608 defines an arc. It is understood that other shapes can be used, such as an inclined plane, or combination of inclined planes at different angles. The arc and/or other shapes promote action of the levers 504 to transfer an upward reaction force, e.g., of a user's head, against the upper extension 603 to promote a rotation about a pivot that distorts, e.g., expands, the upper resilient member, e.g., O-ring 510 (FIG. 5). Namely, the configuration of the upper surface of the lever 504a can facilitate transitions between vertical and horizontal forces. Alternatively or in addition, the configuration facilitates operation of the levers 504 themselves against a reaction of the deformable members, e.g., foams, towards the scoops.

Each lever 504 in the example embodiment includes pivoting elements 522 made of the same material as the levers 504, e.g., being casted or injected at the same time as the levers 504 themselves. Each pivoting element 522 can include a generally cylindrical shape. In at least some embodiments, each cylinder provides a generally smooth surface that allows the cylinder of the pivoting element 522 to rotate easily and freely inside the pivot cavity 554 (FIG. 10C).

Each lever 504 has a lower surface or scoop 605 providing a geometry similar to the inside of the pivot ring 502 that can mimic a shape of an adjacent or facing portion of a user's head. Without limitation, the lower scoop 605 in each lever can be casted, injected and/or machined at the same time as the rest of the lever 504 and forms an integral part of the lever 504. Each lower scoop 605 in its inside surface area can use an adhesive over-molding, and/or a mechanical fastener, such as a snap fitting, to hold the lower springs, 508a, 508b, 508c or 508d respectively. The lower scoops 605 of the front lever 504a, lateral levers 504b and 504d and back lever 504c have an injection molding mold split 604 that pierces completely from side to side of the scoop 605.

This slit 604 is placed there so that the adjustment band groove 610 can be formed during the process of injection or casting without the need of a special mechanized mold, this allows the mold to be made using a more economical process. It is understood that other embodiments of the levers can be formed without necessarily requiring the use of a slit 604.

In the illustrative embodiment, the back or exterior facing surface of the lower scoops 605 of the front lever 504a and lateral levers 504b, 504d have an adjustment band groove 604 that is used to guide the adjustment band 512 (FIG. 5) and secure it to the levers. It is understood that other embodiments of the levers can be formed without necessarily requiring the use of a groove.

Likewise, the lever 504a includes an extended bottom member 605 disposed at a bottom end of the central member 601 and extending away from the elongated central member 601. In the example embodiments, the extended bottom member 605 extends along a curved perimeter in a bottom lateral plane. A perimeter or lateral width, or extent of each of the top member 603 and/or the bottom member 605 can be varied. In the illustrative embodiment the lateral widths are substantially greater than a width of the central member 601 to form an "I" shaped structure when viewed in frontal profile. Resilient and/or compressible elements, e.g., pads can be attached to interior surfaces of one or more of the top member 603 and/or bottom member 605.

In the illustrative embodiment, an external surface of the top member 603 includes a channel, groove or slot 607. The slot 607 can be sized or otherwise shaped to retain at least a portion of the deformable member 510. In at least some embodiments, one or more of the levers 504 can include a similar slot along the upper and/or lower portions 603, 605. Lower slots (not shown) can be sized or otherwise shaped to retain at least a portion of another deformable member, when present. To the extent other embodiments use other spring arrangements that do not require an enclosed loop, e.g., O-ring, the lever 504a can include other features, such as anchors to facilitate attachment of springs, and the like. It is understood that the levers can include more than one of the upper slots 607, the lower slots or both, e.g., to accommodate more than one resilient members. For example, multiple elastic bands or O-rings can be flexibly retained within respective slots to control or otherwise vary an amount of energy absorbed, stored and/or dissipated in response to an impact force.

FIGS. 13A-13D depict top perspective, front, bottom and side cross-section views, respectively, of an alternative embodiment of a rear lever 504c. The example does not include a lower slot, e.g., to regain an adjustment ring, because the example adjustment ring 605 extends below the lever to provide occipital support to the user's head.

FIGS. 14A-14D depict front, side, bottom and bottom perspective views of an upper pad assembly 506 of the helmet shock abatement system 500 depicted in FIGS. 4A-4D. In more detail, the upper pad assembly 506 includes four individual deformable members 506a, 506b, 506c, 506d, respectively disposed at a top end of each of the levers 504. The individual deformable members 506 can be shaped, e.g., collectively, to conform to a portion of the body, such as a crown portion of a head. Alternatively or in addition, the individual deformable members 506 can be further shaped, e.g., to conform to a mounting surface of a top portion of each lever 504.

The example set of upper deformable members or springs 506a, 506b, 506c, 506d, are configured to fit an upper portion of a human head, e.g., using a dome shape of the head in conjunction with angled surfaces, e.g., in the geometry of the springs to help enact the levers 504 in a presence of an impact force applied to an exterior surface of the helmet. In the illustrative embodiment, the set of upper springs 506 can be visualized as a single large spring, e.g., an oval, cut to size to fit each respective upper lever extension or scoop 608. For example, a particular number of upper springs 506 can be determined by a corresponding number of levers, e.g., four levers requires four springs, six levers requires six springs, and so on. This set of upper springs 506 have a geometry that follows the contour of the upper dome of a human head. The example shape provides a comfortable, non-irritating fit to the user's head by providing a surface that conforms to an adjacent portion of the user's head, e.g., providing a slanted and/or curved surface.

FIGS. 15A-15D depict top perspective, front, bottom and cross-sectional views of a front pad 506a of the upper pad assembly depicted in FIGS. 14A-14D. The cross sectional view of the frontal upper spring 506a shows an approximate quarter circular section 702 that matches up with a corresponding exposed surface of the upper scoop 608. The approximate quarter circular section 702 is configured to promote the upper spring's 506a, 506b, 506c or 506d transfer of forces in substantially any vector from vertical to horizontal from the head back to the upper scoop 608.

Also the upper spring 506a shows an inner surface having a curve, e.g., a radius 707 that allows the upper part of the head to slide and wedge itself easily and comfortably into the inside contour of the upper spring 506a, 506b, 506c, 506d. The cross section also shows the contact angled surface 706 of the deformable member, e.g., foam, that promotes a fit with the dome of the head, and also works as a wedge that forces the spring to react against the upper scoop 608 of the lever 504 forcing it to act and transfer a portion of the force to the lower scoop 605. It is understood that a distance or displacement of an upper end of the lever 504, e.g., in reaction to a collision promotes a displacement of the shock abatement system 500 in relation to a top portion of the user's head. Namely, as the top ends of the levers 504 move away from a central axis, resulting in a separation or opening of adjacent annular spring 506 to allow the user's head to translate along the central axis, e.g., upward into the opening provided by the springs 506. A distance of translation of the head along the vertical axis can be controlled, at least to some extent, according to the angles of rotation of the levers, sizes of the levers, size and/or shape of the annular spring 506, and so on.

The upper springs 506a, 506b, 506c, and 506d can be made of a deformable members, for example, including a highly resilient material that is injected into a mold or casted. In this embodiment, example resilient materials can include one of a polyurethane or platinum silicone foam, or silicone or urethane rubber. Other embodiments can use other materials, e.g., foams, providing similar characteristics. At least one purpose of this material is to be highly resilient so as to have a deformation and a maximum reaction to the force being applied so as to enact operation of the levers.

FIGS. 16A-16D depict top perspective, top, side and front views of a side pad 506b of the upper pad assembly depicted in FIGS. 14A-14D. The end view of the side pad 506b shows an approximate quarter circular section 802 that matches up with a corresponding exposed surface of the upper scoop 608b. Also the upper spring 506b shows an inner surface having a contour or curve 807 that allows the upper part of the head to slide and wedge itself easily and comfortably into the inside contour of the upper spring 506b. The end view also shows a contact angled surface 806 of the foam that promotes a fit with the dome of the head, and also works as a wedge that forces the spring to react against the upper scoop 608b of the lever 504b forcing it to act and transfer a portion of the force to the lower scoop 605b.

FIGS. 17A-17D depict top perspective, top, front, and side cross-sectional views of a rear pad 506c of the upper pad assembly depicted in FIGS. 14A-14D. The cross-sectional view of the side pad 506c shows an approximate quarter circular section 902 that matches up with a corresponding exposed surface of the upper scoop 608c. Also the upper spring 506c shows an inner surface having a contour or curve 907 that allows the upper part of the head to slide and wedge itself easily and comfortably into the inside contour of the upper spring 506c. The cross-sectional view also shows a contact angled surface 906 of the foam that promotes a fit with the dome of the head, and also works as a wedge that forces the spring to react against the upper scoop 608c of the lever 504c forcing it to act and transfer a portion of the force to the lower scoop 605c.

FIGS. 18A-18D depicts the front, side, a bottom and top perspective views of a lower pad assembly 508 of the helmet shock abatement system depicted in FIGS. 4A-4D. The lower spring set 508a, 508b, 508c, 508d can be made of a deformable and resilient material to absorb energy by deformation in response to an impact or collision force. In some embodiments, the lower springs 508a, 508b, 508c, 508d in the spring set 508 have different sizes, shapes and/or thicknesses, e.g., to better adjust the foams to the shape of the human head. More generally, the individual deformable members 508 can be shaped, e.g., collectively, to conform to a portion of the body, such as a lower perimeter portion of a head. Alternatively or in addition, the individual deformable members 508 can be further shaped, e.g., to conform to a mounting surface of a bottom portion of each lever 504.

By way of illustrative example, two different embodiments are presented as options for one embodiment of the shock abatement system 500. The first embodiment shown in FIGS. 19A-19D includes an embodiment of the lower front pad 508a that includes a hollow foam construction. For example a relatively firm resilient foam can be used to form the totality of this pad or spring 508a, allowing for a base of deformable padding, e.g., along the exterior surface 1002b covered by a hollow padding, e.g., including the open channel 1006 along the interior surface 1002a. The hollow portion serves a purpose of deforming easily. Such configurations provide a dual function, e.g., a first deformation response that responds to placement on the user's head to assure comfort and/or fit, while also providing a second deformation response that responds to an impact to absorb energy, effectively slowing down an impact. Such multi-deformation response, e.g., dual resilient, materials can be used for any of the deformable members or springs disclosed herein, including the upper and lower resilient members 506, 508. This embodiment can be manufactured by injection or by extrusion and are made of a polyurethane foam. Other embodiments can use other materials and foams, and can be casted.

The first resilient response for fit can be accommodated to at least some degree by a comparatively thin wall of the relatively firm resilient foam that yields to a relatively low force, e.g., associated with static operation of the helmet placed upon a user's head. The second resilient response for shock absorption can be accommodated to at least some degree by a comparatively thick wall of the relatively firm resilient foam that yields to a relatively greater force, e.g., associated with dynamic operation of the helmet placed upon the user's head. In at least some embodiments, the relatively thick wall includes an interior surface 1002a collapsed against an exterior surface, such that there is little or no open channel 1106.

FIGS. 20A-20D depict top perspective, bottom, side and cross-sectional views of another embodiment of a lower front pad or spring 1108a of the lower pad or spring assembly 508 that can be substituted for one or more pads of the lower pad assembly 508 depicted in FIGS. 18A-18D. A lower front pad 1108a includes an interior surface 1102a that faces the body, when worn. The lower front pad 1108a also includes an exterior surface 1102b that abuts an interior surface of the bottom member 605. In some embodiments, the lower front pad 1108a includes a deformable material. The deformable material can include a resilient material that absorbs energy when compressed. The front pad 1108a is made up of two or more deformable elements, e.g., deformable materials. Such materials can be made of a foam, such as a polyurethane material that can be adhered together in layers. The layers range from least firm or softest foam in contact with the head to firmest or hardest foam closer to the lower scoop 605. In this embodiment the softest foam provides a comfort padding 1102c that lies in contact with the human head, whereby the deformable padding 1102d is adhered or otherwise attached to the lower scoop 605.

In the illustrative embodiment, the lower front pad 1108a includes multiple layers of material having different properties, e.g., different resiliencies. For example, the lower front pad 1108a includes a deformable safety padding 1102d along an exterior portion, and a comfort padding 1102c along an interior portion. In some embodiments, the comfort padding 1102c can be relatively soft, deforming under a relatively gentle pressure. The softness can facilitate a secure fit and comfort when worn. Conversely, the deformable safety padding 1102d can be relatively stiff, e.g., deforming only under a relatively high pressure. Accordingly, the safety padding 1102d may deform, compress or the like under collision forces or impacts, while remaining substantially non-compressed during normal periods of usage. It is understood that in at least some embodiments, one or more of the pads, e.g., the front lower pad 508a, can include additional layers of other materials, such liquid absorbing materials to prevent sweat from interfering with a user's vision.

Performance properties of the various components, systems and materials disclosed herein can include one or more of deformability, elasticity, resilience, compliance, density, compressibility, stiffness, rigidity, flexibility or pliability. Choices of components, systems, materials, component configurations and/or material configurations can be made according to one or more of the performance properties. For example, any of the deformable members disclosed herein can include a compressible element. The compressible element can include one of an elastic property, an inelastic property, or a combination of elastic and inelastic properties. For example choices can be made to ensure that levers do not fail under anticipated collision forces, that compressive members maintain their compressibility under anticipated forces, and the like.

It is understood that compressibility of a deformable element can result from one of a bulk material property, a geometry or shape, or a combination thereof. The compressible element can include any form of springs and/or shapes, such as corrugated shapes. In at least some embodiments, the compressible element can include a compressible material. Examples of compressible materials include, without limitation, one of a gas, a liquid, a solid, a gel, a foam, and combinations thereof, resilient materials, compliant materials. Alternatively or in addition, the deformable member can include a deformable system or assembly. Examples of deformable systems and/or assemblies can include airbag systems, and the like.

Figure 21A:
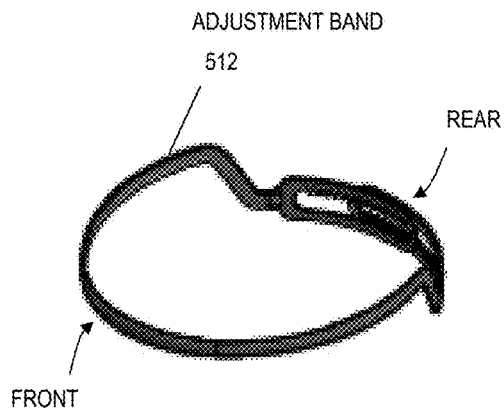
FIGS. 21A-21C depict top perspective, top and front, and expanded views of an example of an adjustment band of the helmet system depicted in FIGS. 4A-4D.
Figure 21B:
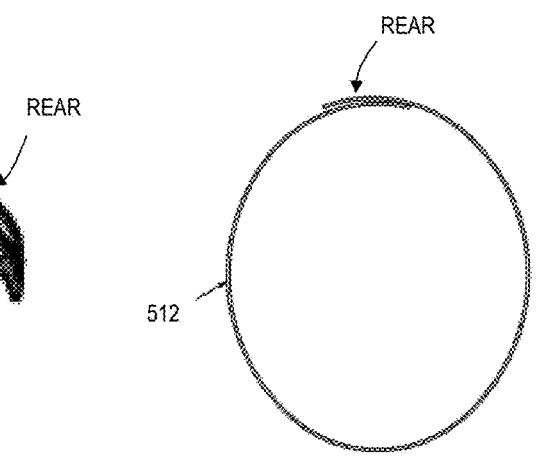
Figure 21C:
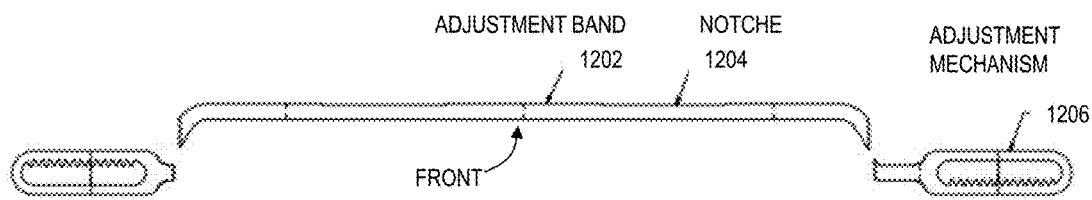

FIGS. 21A-21C depict top perspective, top and rear, and expanded views of an example of an adjustment band 512 of the helmet shock abatement system 500 depicted in FIGS. 4A-4D. When the adjustment band 512 is tightened the lower spring set 508*a*, 508*b*, 508*c*, 508*d* (FIG. 18A-18D) is slightly deformed against the head of the user securing the machine, and the helmet on to the head, while allowing the levers to rotate in response to an impact. When an impact is received the deformable padding will deform to absorb energy. The example adjustment band, 512, is placed inside adjustable band guide grooves 610 along the outer surface of the lower scoops 605 of the front and lateral levers 504*a*, 504*b*, 504*d*, where it can slide and aid in the adjustment of the machine to the head. The adjustment band 512 can include one or more notches 1204 that ease the process of inserting the band 512 inside the adjustment band groove guide 610 and a regular adjustment band width 1202 that will fit securely inside said adjustment band groove guide 610.

It is understood that in at least some embodiments, the adjustment band 512 can be positioned inside of one or more of the levers 508, e.g., to prevent any possibility of interference with rotation of one or more of the levers 508 that might otherwise result from an overtightening of the adjustment band 512. For example, the adjustment band 512 can be attached to a helmet shell and positioned so that the adjustment band does not interfere with rotation of the levers 508 and/or performance of the shock abatement system.

In the illustrative embodiment, the adjustment band also has an occipital support with adjustment mechanism 1206 of the ratchet kind. However other embodiments can use any of the available adjustment mechanisms and/or occipital supports.

The adjustment band 512 in this embodiment can be made of a flexible material with high tensile resistance like polymers, e.g., polypropylene. This material can be injected, casted, press-cut formed, or the like, using known manufacturing techniques to fully form all the details of the grooves needed for the adjustment mechanism. However, other embodiments that use other adjustment mechanisms can use different means of manufacturing, such as punching. Any flexible material with relatively high tensile strength can be used like other polymers, leather, metals, foils, etc.

Figures 22A, 22B:
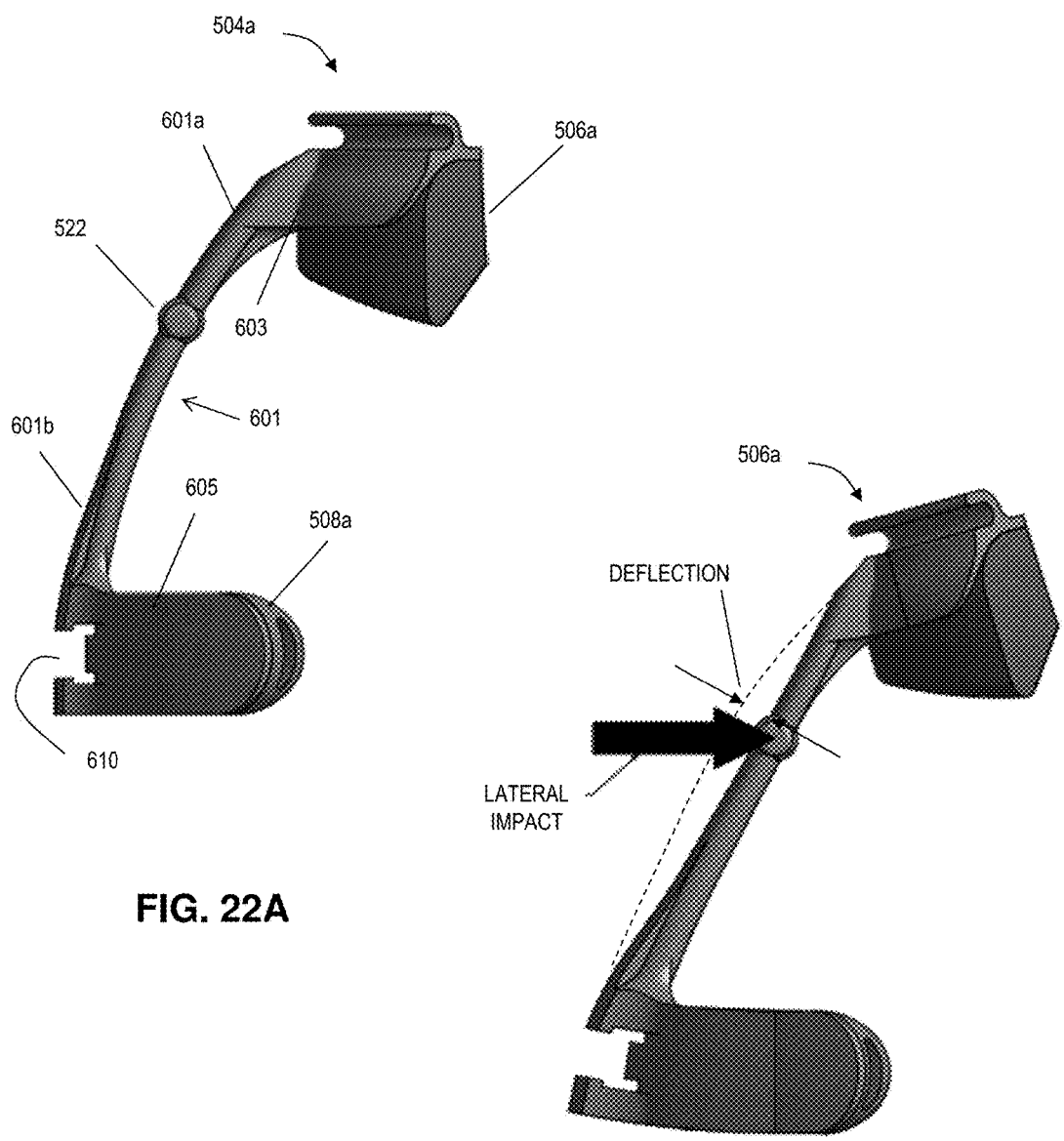
FIG. 22A depicts a side view of an example of a lever assembly of the helmet system depicted in FIGS. 4A-4D.
FIG. 22B, depicts a side view of the lever assembly of FIG. 22A subjected to a lateral force.

FIG. 22A depicts a side view of an example of a lever assembly 504*a* of the helmet shock abatement system 500 depicted in FIGS. 4A-4D. In particular, the lever assembly 504*a* is in a normal, e.g., non-stressed configuration, providing a slight bow with an open concave portion facing the user's head when worn. FIG. 22B, depicts a side view of the lever assembly 504*a* of FIG. 22A subjected to a force acting upon the pivot 522. Such a force can be induced by a downward and/or side collision or impact to a helmet containing the shock abatement system 500 that includes a force component directed towards and/or away from the pivot 522. Forces applied above and/or below the pivot tend to cause a rotation of the lever assembly 504*a*, whereas forces directed towards/away from the pivot 522 tend to cause a leaf spring response of the lever assembly 504*a*. A rotational response, a leaf-spring response or a combination of both is an example of a controlled movement offered by the lever assembly 504*a*.

In the illustrative example, the elongated member 601 includes a lever shaft having a first, e.g., upper, portion 601*a* and a second, e.g., lower, portion 601*b* distinguishable by reference to a location of the pivot 522. The bowed length of the lever shaft 601 flexes, bends or otherwise yields in response to the lateral force, providing a leaf-spring response. Namely, the bending of the elongated member 601 results in a momentary displacement of a central portion or pivot 522 of the lever 504*a*, inward, towards the user's head. The inward distortion can transfer at least a portion of kinetic energy resulting from an impact into an absorbed, stored and/or otherwise dissipated energy. In at least some embodiments, more than one of the levers 504*a*, 504*b*, 504*c*, 504*d* provide similar leaf spring function. Namely, in response to a vertical force, the lever pivots about its pivot axis. Alternatively or in addition, in response to a vertical and/or lateral force, the lever deforms, e.g., bends, providing a momentary displacement of the upper and lower spring members with respect to the pivot axes.

Figure 23A:
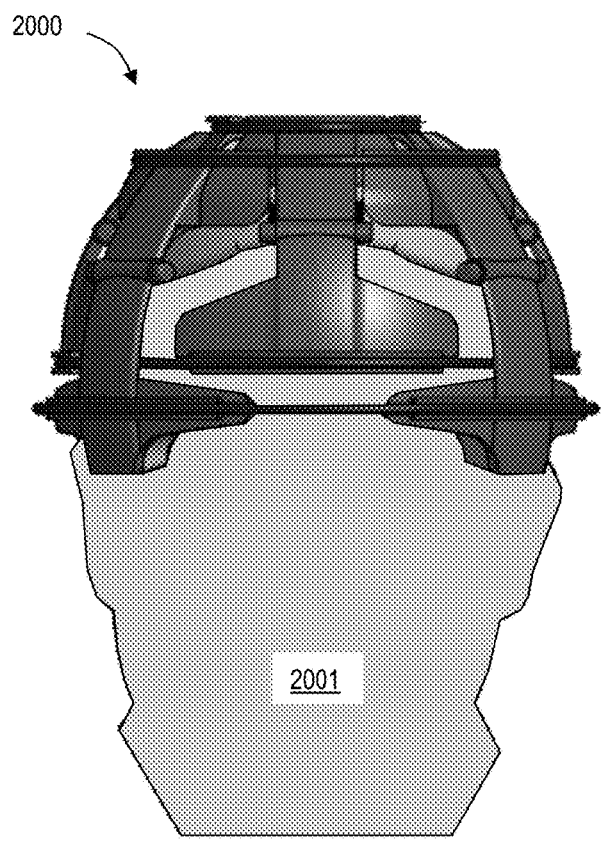
FIG. 23A depicts a front view of an alternative helmet system placed on a human head.
Figure 23B:
FIG. 23B depicts an illustrative view of an example football helmet.
Figure 23C:
FIG. 23C depicts an illustrative view of an example military helmet.

FIG. 23A depicts a front view of an alternative helmet shock abatement system 2000 placed on a human head 2001. The alternative shock abatement system 2000 can be used with safety helmets, e.g., construction helmets, sports equipment, such as the football helmet 2010 depicted in FIG. 23B, and/or the military helmet 2020 depicted in FIG. 23C.

FIGS. 24A-24D depicts front, side, bottom, and top perspective views of the alternative helmet shock abatement systems depicted in FIG. 23A. Generally, the shock abatement system 2000 includes at least two sets of levers, or arrays. A first lever assembly 2006 and a second lever assembly 2016 are interspersed about the user's head 2001 when worn. The example first lever assembly 2006 includes four levers 2004 rotatable about respective pivots 2002. The first lever assembly 2006 includes a top spring 2005 in communication with a top end of each of the levers 2004 of the first lever assembly 2006, and a bottom spring 2007 in communication with a bottom end of each of the levers 2004. Likewise, the example second assembly 2016 includes four levers 2014 rotatable about respective pivots 2012. The second lever assembly 2016 includes a top spring 2015 in communication with a top end of each of the levers 2014 of the second lever assembly 2016, and a bottom spring 2017 in communication with a bottom end of each of the second levers 2014. Each of the levers 2004, 2014 can be similar to the levers disclosed hereinabove, e.g., having an elongated lever arm extending between first and second ends, a pivot at a position along the lever arm between the first and second ends, one or more pivot extensions, upper and/or lower extensions to which resilient pads or springs can be attached, and the like.

Figure 25:
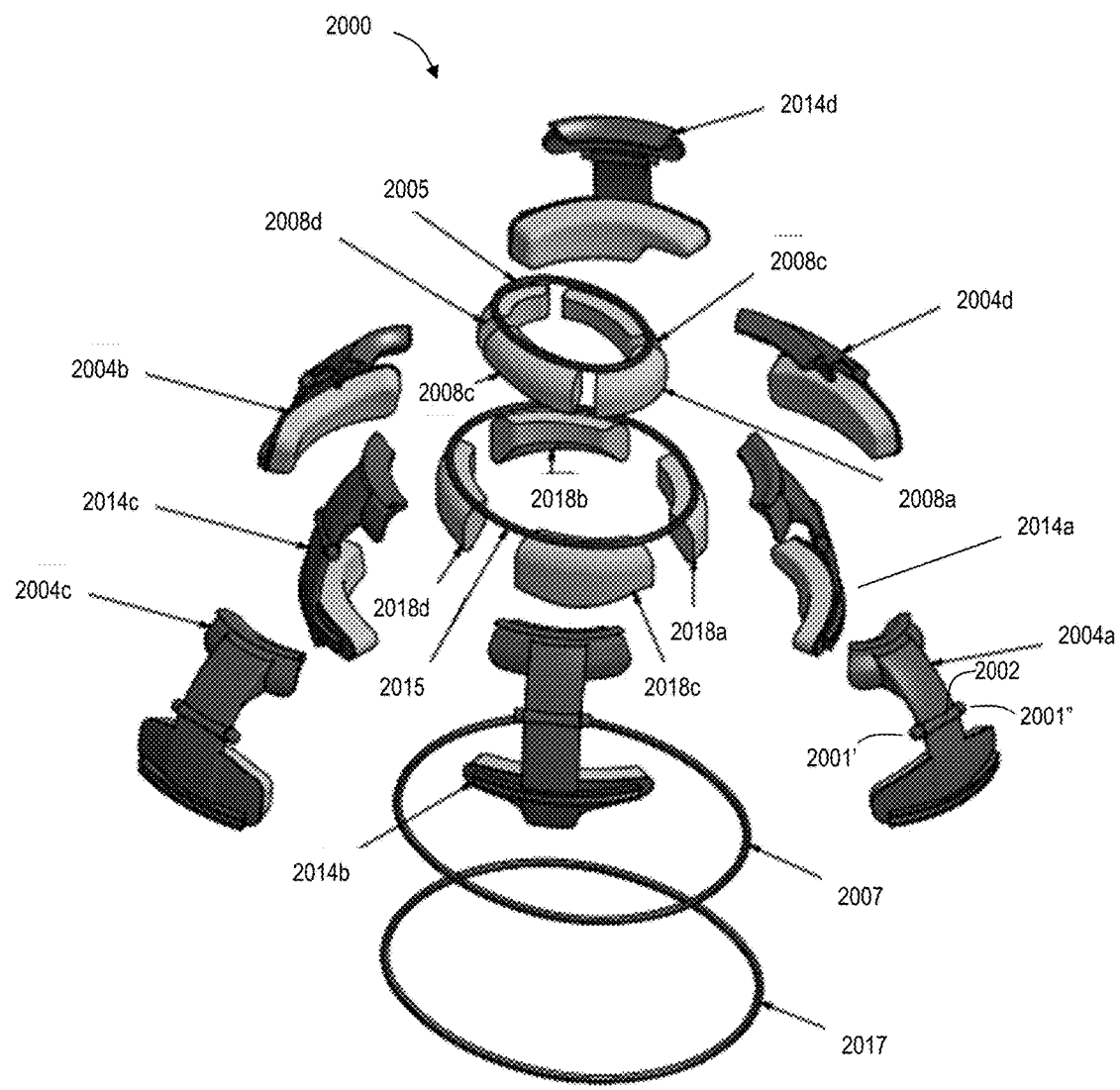
FIG. 25 depicts an exploded view of the alternative helmet system depicted in FIG. 23A.

FIG. 25 depicts an exploded view of the alternative helmet shock abatement system depicted in FIG. 23A. A first lever assembly or array 2006 includes a front lever 2004*a*, a right side lever 2004*c*, a rear lever 2004*b* and a left side lever 2004*d*, generally 2004. Each of the first levers 2004 rotates about a respective pivot axis 2002 aligned within a common first plane substantially orthogonal to a central axis. Each of the first levers 2004 can rotate in a respective plane that includes the central axis.

Likewise, in the illustrative example, the levers 2014 of the second lever assembly 2016 is offset, rotationally about a central axis, e.g., at about 45 degrees from the levers 2004 of the first lever assembly 2006. The second lever array 2016 includes a front-right side lever 2014*b*, a rear-right side lever 2014*c*, a rear-left side lever 2014*d* and a front-left side lever 2014*a*, generally 2014. Each of the second levers 2014 rotates about a respective pivot axis aligned within a common second plane substantially orthogonal to the central axis. The first and second planes can be separated along the central axis, as shown, or located at the same location. In the illustrative example the pivot axes 2002 of the first lever assembly 2006 lies within the first plane located above the second plane containing pivot axes 2012 of the second lever assembly 2016.

Figure 26A:
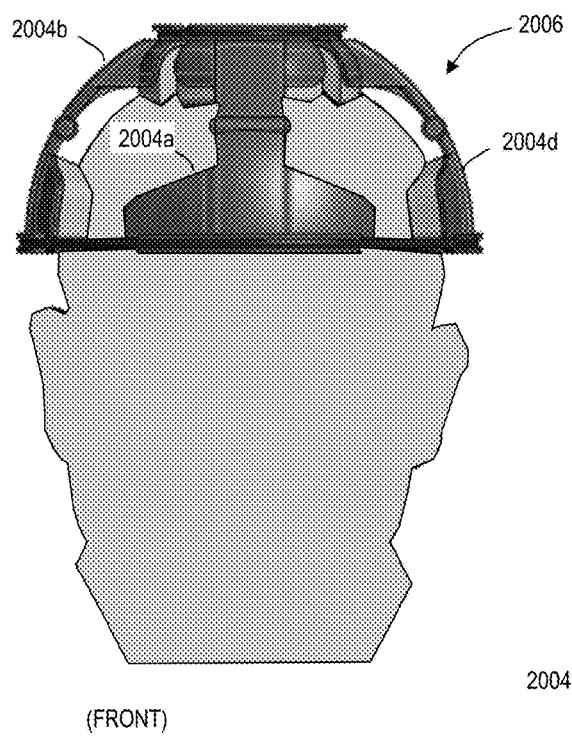
FIGS. 26A-26B depicts front and side views of a first lever assembly of the alternative helmet system depicted in FIG. 23A.
Figure 26B:
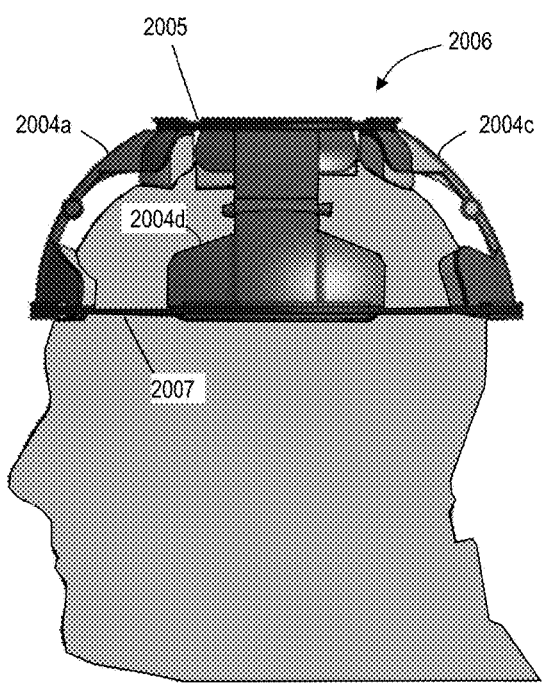

FIGS. 26A-26B depicts front and side views of the first lever assembly 2006 of the alternative helmet shock abatement system depicted in FIG. 23A. The first lever assembly 2006 includes at least one top spring 2005 and at least one bottom spring 2007. The top and bottom springs 2005, 2007 react against pivotal rotations of the first levers 2004. Namely, one or more of the top and/or bottom springs 2005, 2007 distort, e.g., stretch, in response to in impact force that causes a rotation of one or more of the first levers 2004.

Figure 27A:
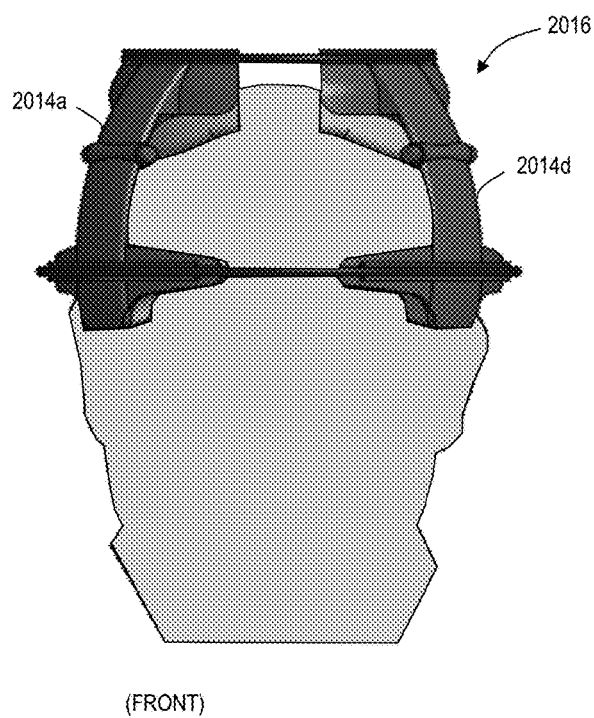
FIGS. 27A-27B depicts front and side views of a second lever assembly of the alternative helmet system depicted in FIG. 23A.
Figure 27B:
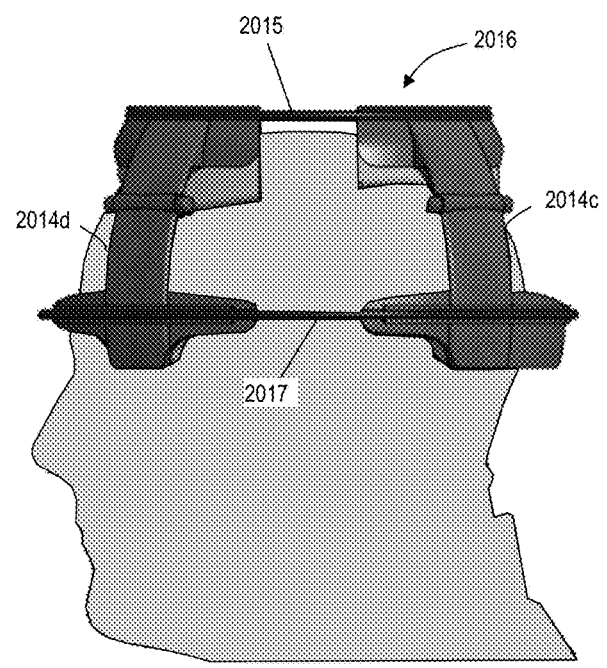

FIGS. 27A-27B depicts front and side views of a second, e.g., lower, lever assembly 2016 of the alternative helmet shock abatement system depicted in FIG. 23A. The lower lever assembly 2016 includes a top spring 2015 and a bottom spring 2017. The top and bottom springs 2015, 2017 react against pivotal rotations of the lower levers 2014. Namely, one or more of the top and/or bottom springs 2015, 2017 distort, e.g., stretch, in response to in impact force that causes a rotation of one or more of the lower levers 2014.

Figure 28A:
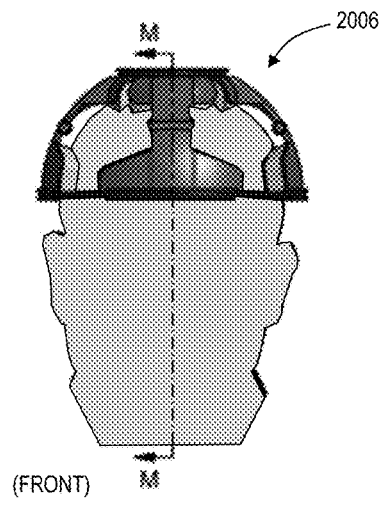
FIGS. 28A-28B depict front and side views, respectively, of the first lever assembly of the alternative helmet system of FIG. 23A placed on a human head.
Figure 28B:
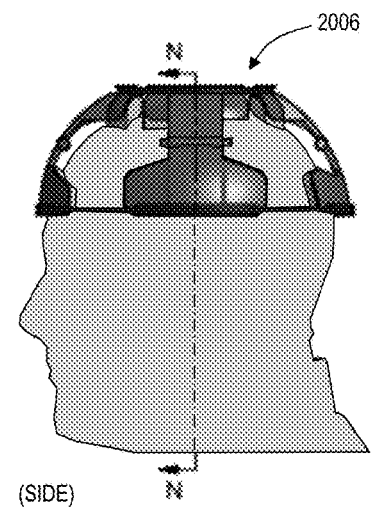

FIGS. 28A-28B depict front and side views, respectively, of the first lever assembly 2006 of the alternative helmet shock abatement system of FIG. 23A placed on the human head 2001.

Figure 28C:
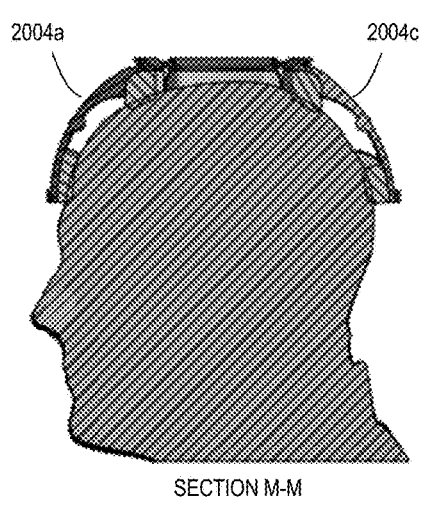
FIGS. 28C-28D depict sagittal and frontal cross-sectional views, respectively, of the first level assembly of FIGS. 28A-28B.
Figure 28D:
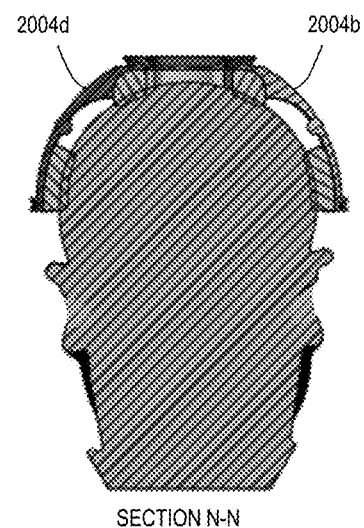

FIGS. 28C-28D depict sagittal and frontal cross-sectional views, respectively, of the first level assembly 2006 of FIGS. 28A-28B.

Figure 29A:
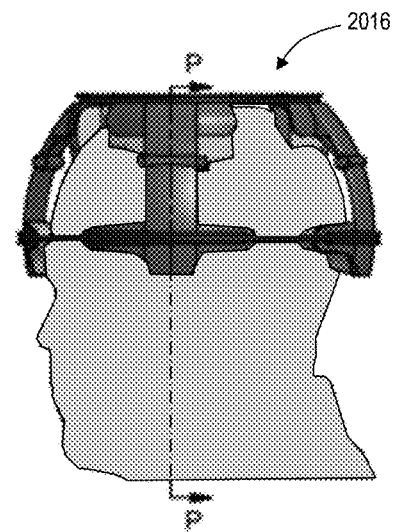
FIGS. 29A-29B depict front and side views, respectively, of the second lever assembly of the alternative helmet system of FIG. 23A placed on a human head.
Figure 29B:
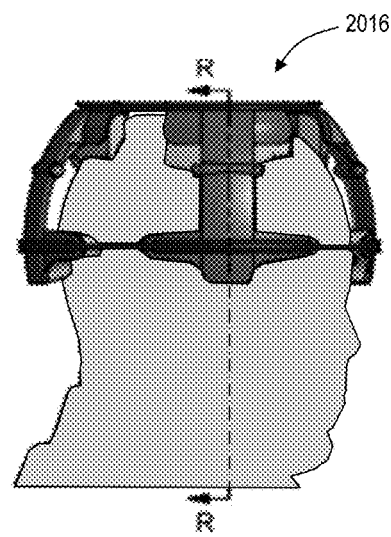

FIGS. 29A-29B depict front and side views, respectively, of the second lever assembly 2016 of the alternative helmet shock abatement system of FIG. 23A placed on a human head.

Figure 29C:
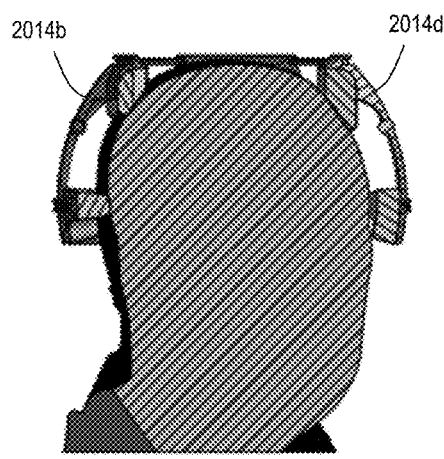
FIGS. 29C-29D depict sagittal and frontal cross-sectional views, respectively, of the second level assembly of FIGS. 29A-29B.
Figure 29D:
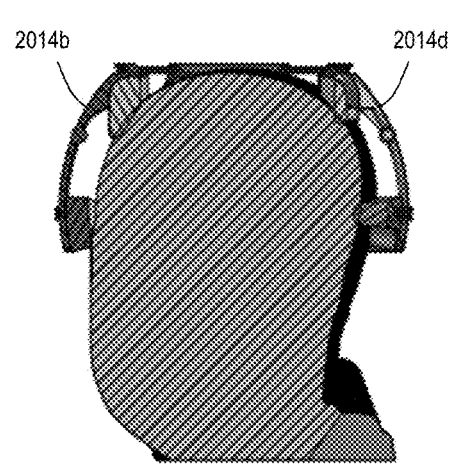

FIGS. 29C-29D depict front and rear-facing frontal cross-sectional views, respectively, of the second lever assembly 2016 of FIGS. 29A-29B.

Figures 30A, 30B:
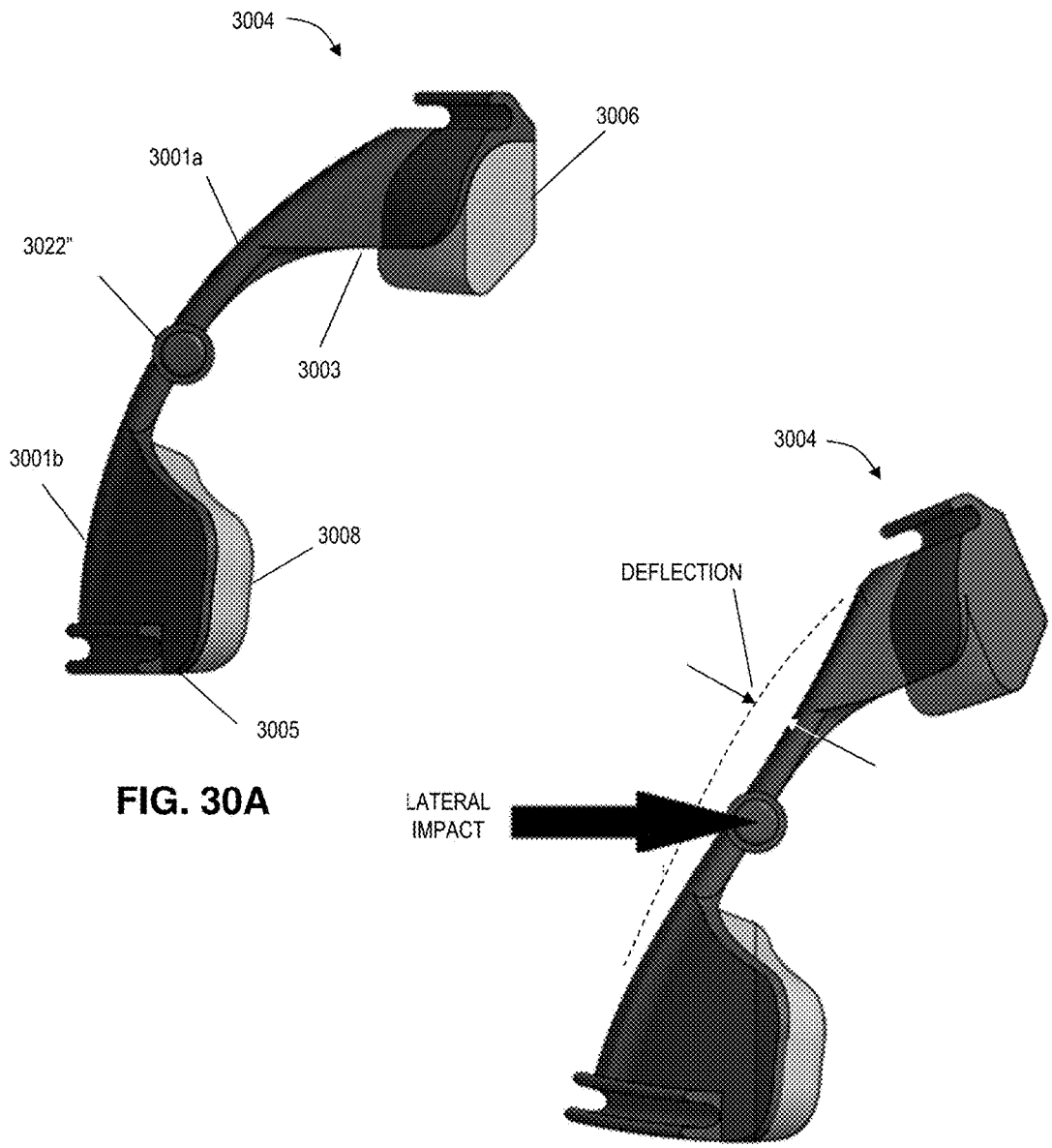
FIG. 30A depicts a side view of an example of a lever assembly of the alternative helmet system depicted in FIG. 23A.
FIG. 30B, depicts a side view of the lever assembly of FIG. 32A subjected to a lateral force.
Figure 31A:
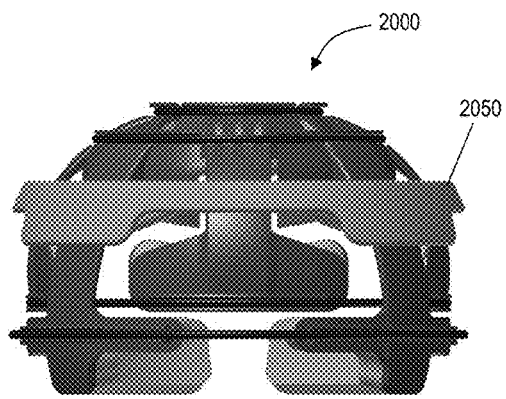
FIGS. 31A-31D depict front, side, bottom and top perspective views of another embodiment of the alternative helmet system depicted in FIG. 23A.
Figure 31B:
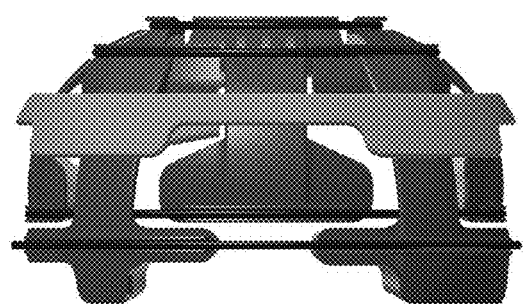
Figure 31C:
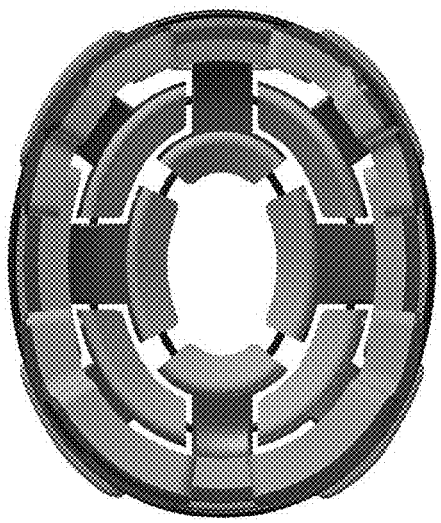
Figure 31D:
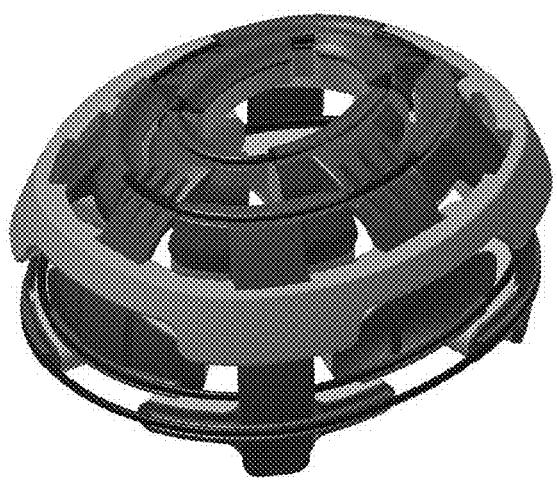

FIG. 30A depicts a side view of an example of a lever 3004 of the first lever assembly 2006 of the alternative helmet shock abatement system depicted in FIG. 23A. In the illustrative example, the second lever assembly 2016 extends below a bottom extremity of the first lever assembly 2006. Accordingly, the lever assemblies can be distinguished according to a top lever assembly 2006 and a bottom lever assembly 2016. In particular, the top lever 3004 is depicted in its normal, e.g., non-stressed configuration. FIG. 30B, depicts a side view of the top lever 3004 of the top lever assembly 2006 of FIG. 23A subjected to a lateral force. Such a lateral force can be induced by a side collision or impact to a helmet containing the shock abatement system 2000. In particular, a length along the lever shaft, e.g., an upper shaft segment 3001a, a lower shaft segment 3001b, or a combination of the upper and lower shaft segments 3001a, 3001b, flexes, bends or otherwise yields in response to the lateral force. The bending can result in a momentary displacement of a central portion of the lever in a direction of the collision force. In at least some embodiments, the one or more of the levers 2004a, 2004b, 2004c, 2004d also provide a leaf spring function. Namely, in response to a vertical force, the lever pivots about its pivot axis. Alternatively or in addition, in response to a lateral force, the lever 3004 bends providing a momentary displacement of the upper and lower spring members with respect to the pivot axes. The levers 2014 of the lower lever assembly 2016 can provide a similar leaf spring response to non-axial forces. Each of the pivotal and leaf spring responses can occur alone or in combination for one or more of the levers 2004, 2014 of one or more of the lever assemblies 2006, 2016. A particular response of any single lever can be determined by a direction of the collision, e.g., along the line of impact, and/or a response of one or more levers of the same lever assembly or a different lever assembly.

The first and second lever assemblies 2006, 2016 can offer different responses based on their respective configurations. For example, levers of the first lever assembly 2006 can include a first pivot axis located at a first distance along the levers to provide a first mechanical advantage. Likewise, levers of the second lever assembly 2016 can include a second pivot axis located at a second distance along the levers to provide a second mechanical advantage. The first and second mechanical advantages can be the same or different. Alternatively or in addition, other features can be varied among and/or between levers of the different lever assemblies 2006, 2016. Such features include, without limitation, lever lengths, lever shapes, lever materials, lever spring constants, lever pad sizes, and so on. In some embodiments, the levers are stacked and/or interlinked such that, in an event of an impact, at least some of the levers provide a leaf-spring response, while, at least some of the levers rotate about respective pivot axes. Such configurations provide a dual protection. For example, an impact may result in levers of an upper lever array rotating about their respective pivots. The same impact may result in levers of a lower lever array providing a leaf spring response. It is understood that one or more levers of one or more of the lever arrays can provide one or both of the rotational and bending responses in response to the same impact.

In some embodiments, a padding size, e.g., thickness, can be varied. Dimensions, shape and/or placement of the various pads used with the levers can be arranged to facilitate movement of the levers. Movement of the levers can include a first rotation in reaction to a downward force, and a second rotation in reaction to a side force. Accordingly, one or more of the lever arrays respond to impact forces from one or more directions.

In some instances the levers rotate "down" from the crown of the head toward the sides of the head. Alternatively or in addition the levers can rotate "up" from the side of the head to the crown of the head. The particular rotation, including a combination of down and up rotations, generally depends upon a direction and/or a location of the impact force or forces. By allowing the levers to rotate in more than one direction, the shock abatement system is able to react to one or more forces applied along one or more various directions.

It is understood that the shock abatement system 2000 can be placed within a protective shell, such as a helmet shell. Alternatively or in addition, the shock abatement system 2000 can be used without a separate protective shell. In the latter configuration, a collision force would be received directly upon an exterior facing surface of one or more of the levers 2004, 2014. In either configuration, one or more of the levers respond to the collision according to the various response disclosed herein. For example, one or more of the levers 2004, 2014 can pivot and/or flex in response to the collision force.

In operation, a first rotation of at least one lever 2004 of the first, or upper, lever assembly 2006 results in a top end of the lever(s) 2004 rotating inward, towards the central axis. The first rotation also results in a bottom end of the lever(s) 2004 rotating outward, away from the central axis. The outward rotation of the bottom end of the lever(s) 2004 results in an expansive deformation of the bottom spring 2007. A second rotation of at least one lever 2004 of the first lever assembly 2006 results in a top end of the lever(s) 2004 rotating outward, away from the central axis. The second rotation also results in a bottom end of the lever(S) 2004 rotating inward, toward the central axis. The outward rotation of the top end of the lever(s) 2004 results in an expansive deformation of the top spring 2005.

Similarly, a first rotation of at least one lever 2014 of the second, or lower, lever assembly 2016 results in a top end of the lever(s) 2014 rotating inward, towards the central axis. The first rotation also results in a bottom end of the lever(s) 2014 rotating outward, away from the central axis. The outward rotation of the bottom end of the lever(s) 2014 results in an expansive deformation of the bottom spring 2017. A second rotation of at least one lever 2014 of the second lever assembly 2016 results in a top end of the lever(s) 2014 rotating outward, away from the central axis. The second rotation also results in a bottom end of the lever(s) 2014 rotating inward, toward the central axis. The outward rotation of the top end of the lever(s) 2014 results in an expansive deformation of the top spring 2015 Protection systems including multiple lever assemblies are adapted to process forces coming from different directions, to absorb and/or dissipate energy in a direction different from direction of collision force FIGS. 31A-31D depict front, side, bottom and top perspective views of another embodiment of the alternative helmet shock abatement system depicted in FIG. 23A. The assembly includes a mounting structure, e.g., a mounting ring 2050. The mounting ring 2050 can be similar to the mounting ring 502 described hereinabove, except that the mounting ring 2050 can include two sets of lever cavities, e.g., one for the top lever assembly 2006 and another for the bottom lever assembly 2016. Each of the lever cavities can include respective pivot cavities to accept and/or retain pivots of respective levers, allowing the levers to rotate about their respective pivot axes. In at least some embodiments, the pivot cavities are offset, such that levers of the top lever assembly 2006 rotate about pivot axes in a first transverse plane, whereas levers of the lower lever assembly 2016 rotate about pivot axes in a second transverse plane. It is understood that some embodiments can include multiple mounting rings, e.g., one for each of the respective lever assemblies 2006, 2016. Alternatively or in addition, one or more levers of one or more lever assemblies 2006, 2016 can be pivotally mounted to a mounting ring, a helmet, or any combination thereof. For example, a protective shell or helmet can include pivot mounts, e.g., cavities that are casted or otherwise integrally formed with the helmet.

Figure 32A:
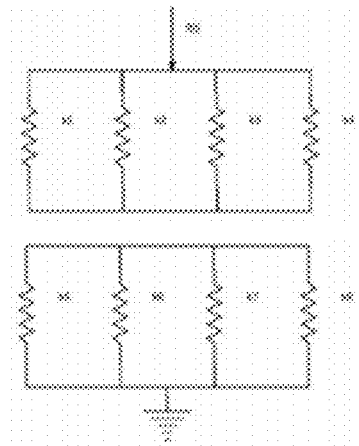
FIGS. 32A and 33A depict schematic diagrams of a mechanical and electrical analog of the helmet system depicted in FIGS. 4A-4D and FIG. 32D.
Figure 32D:
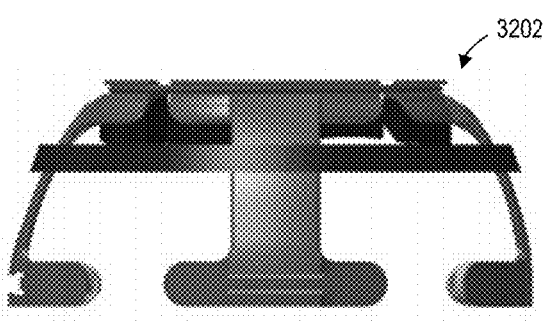
FIGS. 32B, 32C and 33B depict schematic diagrams of mechanical and electrical analogs of other example helmet systems.
Figure 33A:
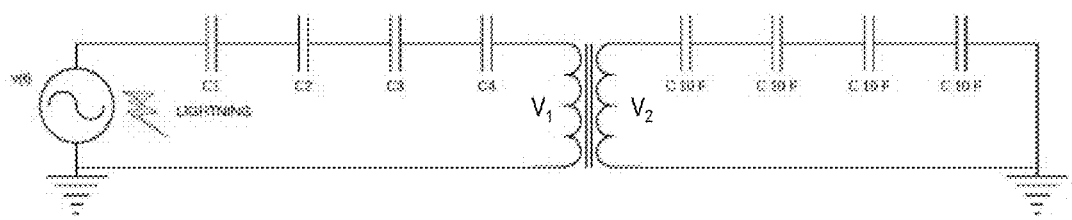

FIGS. 32A and 33A depict schematic diagrams of a mechanical and electrical analog of the helmet shock abatement system depicted in FIGS. 4A-4D and FIG. 32D. The example shock abatement system 500 (FIGS. 4A-4D) includes four levers, each rotatable about a respective pivot axis. The levers include top and bottom resilient pads or springs that interact with a head of the user. A mechanical system 3200 includes a first parallel arrangement of four springs corresponding to the spring members of the top portion of the levers, e.g., between a pivot position and a top attachment. Likewise, the mechanical system 3200 includes a second parallel arrangement of four springs corresponding to the spring members of the bottom portion of the levers, e.g., between the pivot portion and the bottom attachment. An interaction of forces between the top and bottom portions of the levers can be controlled by the mechanical advantage of the levers, e.g., where the pivot axis is located along the lever.

An electrical schematic diagram 3300 represents an electrical circuit corresponding to the mechanical schematic 3200 and the physical configuration of the shock abatement system 500. Each of the four spring members of the top portion of the lever array 3202 is represented by a first group of series connected capacitors C1, C2, C3, C4. The capacitors store energy as do the mechanical springs. Likewise, each of the four spring members of the bottom portion of the lever array 3202 is represented by a second group of series connected capacitors. Once again, the second group of capacitors store energy as do the corresponding mechanical springs. Interactions between a left portion of the circuit and a right portion of the circuit is based on a central transformer.

Depending upon a particular configuration of the transformer, a first voltage $V_1$ applied to a left side of the transformer induces a second voltage $V_2$ at the right side of the transformer. A relationship between the first and second voltages can be controlled by the transformer to provide a step up in voltage, such that $V_2 > V_1$, or a step down, in which $V_2 < V_1$. Thus, positioning of the pivot point provides a transformation to the redistribution of forces resulting from a collision. The transformation leverages a mechanical advantage of the lever.

The levers of the foregoing embodiment can be described as being vertical levers. Namely, rotations of the levers about their fulcra occur within a vertical plane. It is understood that other embodiments can include one or more non-vertical levers, e.g., for which rotation occurs in a non-vertical plane. For example, a helmet application can include one or more levers that pivot in a horizontal plane, e.g., rotated about 90 degrees from the example levers disclosed herein. Other levers can be aligned in virtually any direction. Moreover, it is understood that levers of more than one orientation can be applied to a single application. For example, a helmet application can include one or more vertical levers, one or more horizontal levers, and/or one or more slanted levers that rotate in planes that are neither vertical nor horizontal.

Figure 32B:
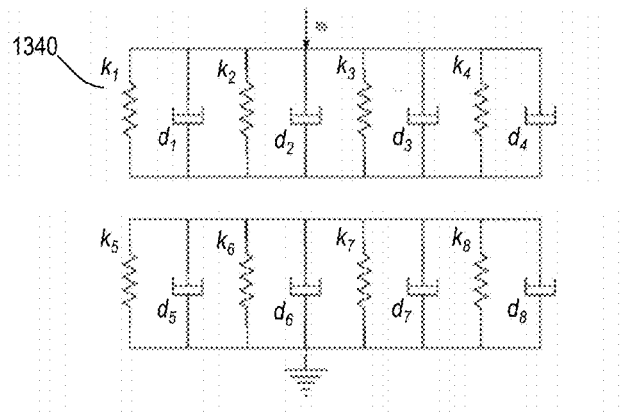
Figure 33B:
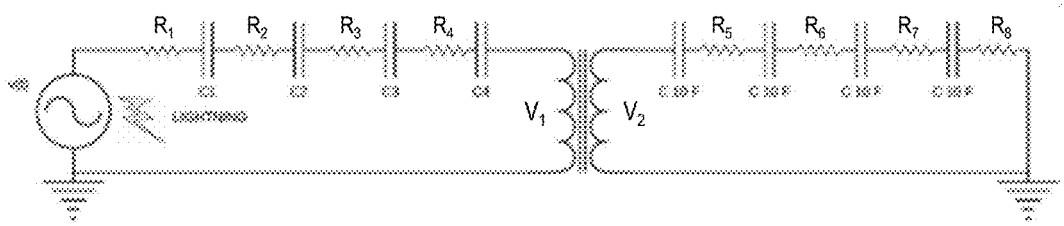
Figure 32C:
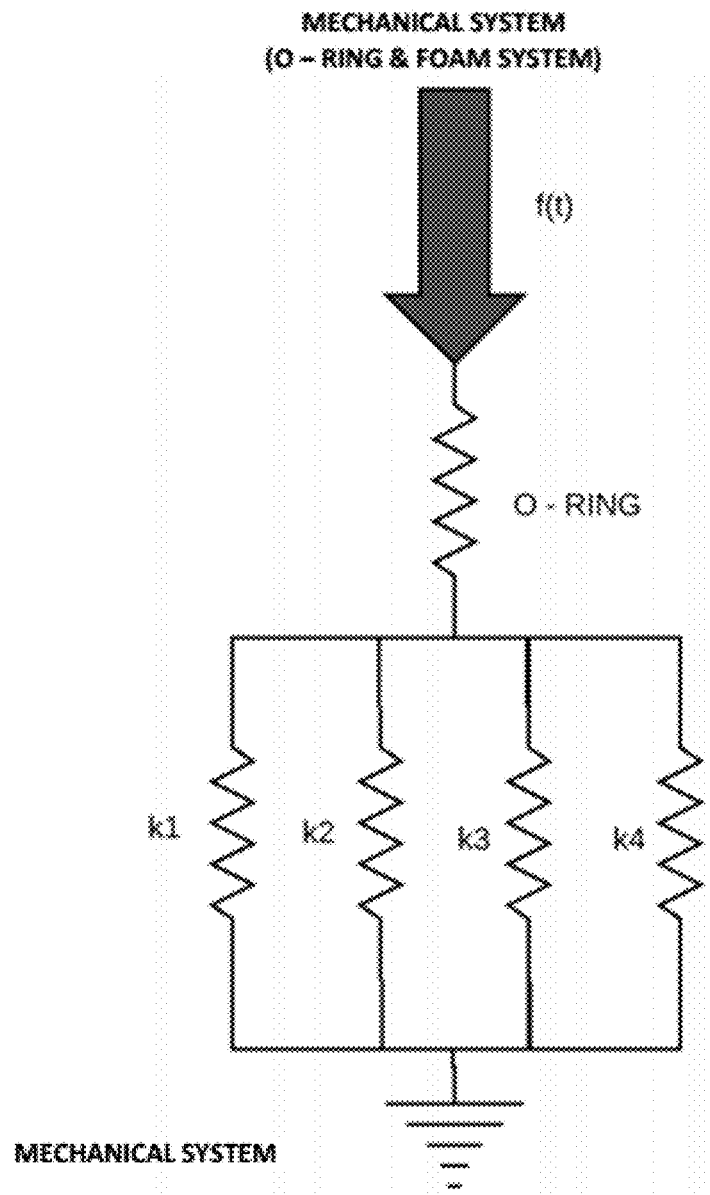

FIGS. 32B, 32C and 33B depict schematic diagrams of a mechanical and electrical analog 3240, 3340 of other embodiments of a helmet shock abatement system. This illustrative example, the shock abatement system includes dampers, such as dashpots d1, d2, d3, d4, d5, d6, d7, d8 associated with each of upper levers and lower levers of a lever assembly, e.g., similar to the helmet shock abatement system 2000 depicted in FIGS. 24A-24D, with the addition of dampers. The dampers can dissipate a non-trivial portion of energy of a collision force. Energy dissipation provided by the dampers can include transforming a portion of a kinetic energy of a collision into thermal energy.

FIG. 33C illustrates a schematic diagram of another mechanical analog of another embodiment of a helmet shock abatement system. In particular, the illustrative mechanical analog 3360 includes provisions for an o-ring, such as the example o-ring in communication with upper levers of an example lever assembly. Other analogs are possible to accommodate any of the various example embodiments disclosed herein using well established techniques.

It is understood that one or more of the electrical schematic 3300 and the mechanical schematic 3200 can be used to evaluate any of the example systems disclosed herein, including various combinations of one or more of the individual features. In some embodiments, configurations or circuits, such as the example electrical 3300 and/or mechanical 3200 schematic diagrams can be used to synthesize particular system configurations, including one or more of system configurations and system component values, e.g., spring constants.

Figure 34:
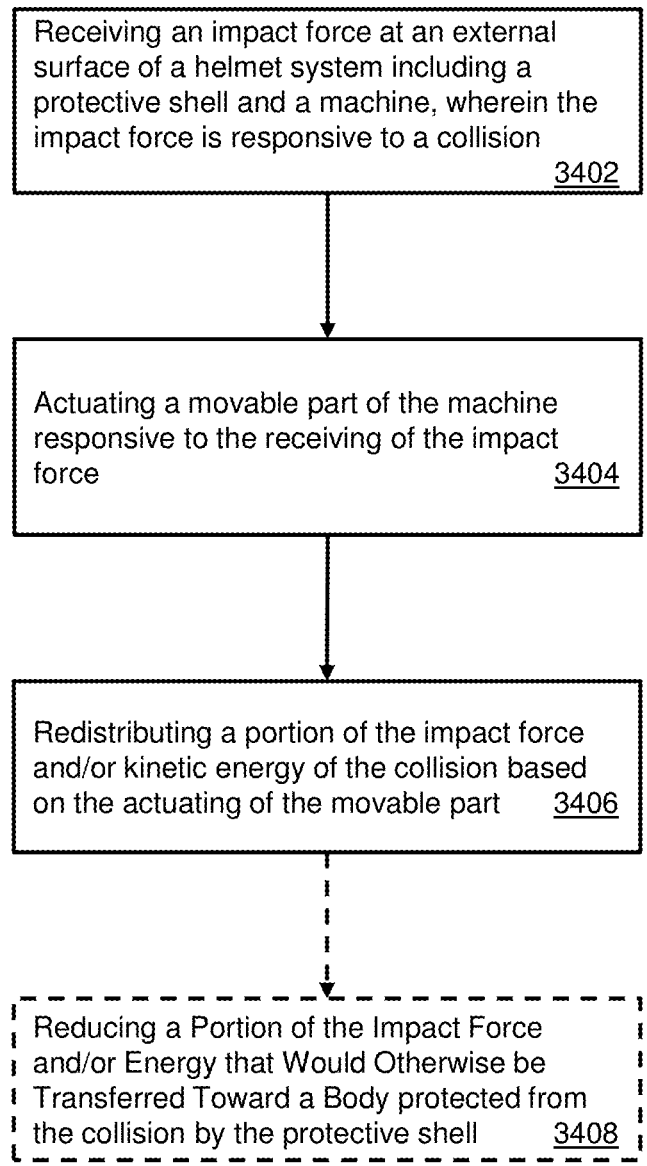
FIG. 34 depicts a process for abating shock resulting from a collision.

FIG. 34 depicts a process 3400 for abating shock resulting from a collision. An applied force is received at an external surface of a protective shell worn upon a body at 3402. The protective shell can include any of the devices disclosed herein, including, without limitation, a helmet system including a protective shell and a machine. The applied force can be responsive to a collision, e.g., between the protective shell and another object. The other object can be mobile, e.g., as in a projectile and/or another movable object. Alternatively, the other object can be immobile, e.g., a wall or the ground. It is understood that a collision can be a simple collision occurring substantially along a single line of action, e.g., a direction of the applied force.

Alternatively, the collision can be complex. For example, the collision can include multiple forces applied along multiple directions. Consider an example of a helmet being driven into an interior 90 degree corner, such that both walls exert respective forces upon the helmet. Complexity can include a sequence of collisions that can be applied in a rapid and possibly overlapping manner According, an initial state of any single collision can be a resting state, e.g., static worn state, or a distorted state as may have resulted from an immediately preceding collision.

A movable part of the machine disposed between the protective shell and the body is activated, responsive to the receiving of the applied, or impact, force at 3404. The machine can include movable parts can include any of the example mechanisms and components disclosed herein. For example and without limitation, machines can include one or more of levers, screws, gears, pulleys, inclined planes, hinges, wedges, and the like.

A portion of the applied force transferred toward the body is redistributed based on the actuating of the movable part at 3406. Redistribution of the forces can include redirecting of the force, e.g., by an angular displacement. Example angular displacements can include, without limitation, greater than about 15 degrees, about 90 degrees and/or greater than 90 degrees. For example, a collision force applied vertically to a helmet worn upon a head can result in one or more horizontal forces directed inward on one or more side portions of the head. In at least some embodiments, such inward forces can be opposing, e.g., being directed inward along radii toward a central vertical axis.

In at least some embodiments, the process 3400 includes providing and/or assembling a helmet system that includes a protective shell that receives or otherwise experiences an impact force in response to a collision between the protective shell and another external object at 3402. The shell can include any of the various protective shells disclosed herein, such as unitary shells, sections and/or segmented shells. The providing of the helmet system, including any of the example helmet systems disclosed herein, can include providing only an operative portion of the helmet system, such as a machine, e.g., lever system, that when combined with a protective shell, operates as described herein. Alternatively or in addition, the providing of the helmet system can include providing an assembled helmet system and/or assembling the entire system and/or at least an operative part of the helmet system, such as the machine and/or mechanisms that are actuated responsive to a collision to redirect the received collision force, and/or to absorb at least a portion of the kinetic energy of the collision.

In at least some embodiments, the process 3400, includes reducing a portion of the impact force and/or energy that would otherwise be transferred toward the protected body at 3408 (shown in phantom). This reduction can include one or more of absorbing and/or dissipating energy associated with the collision. The absorbing and/or dissipating energy can occur, at least in part, along a direction other than the line of action. Alternatively or in addition, a reduction of at least a portion of the impact force can include an elastic and/or plastic behavior of materials to transform at least a portion of impact kinetic energy. Namely, impact energy can be absorbed by a break or fracture, a dent, a deformation or other temporary and/or permanent alteration of a protective system component. For example, some protection systems, such as motorcycle and/or bicycle helmets that are designed to break, fracture and/or otherwise deform in response to a collision. In at least some embodiments, energy absorption can be accomplished by distortion of a resilient and/or compliant member. Examples include, without limitation, storing kinetic energy of the collision in mechanical energy, e.g., potential energy of a distorted spring, a compressed resilient pad, and the like.

Figure 35A:
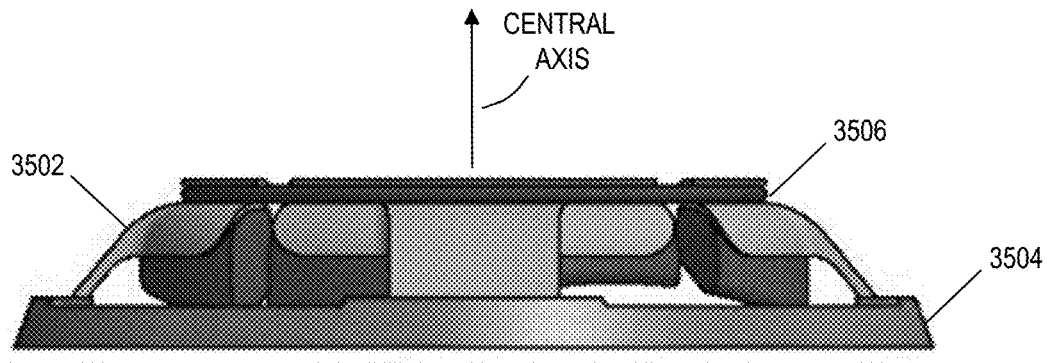
FIGS. 35A and 35B depict side and bottom perspective views, respectively, of a portion of an example lever assembly.
Figure 35B:
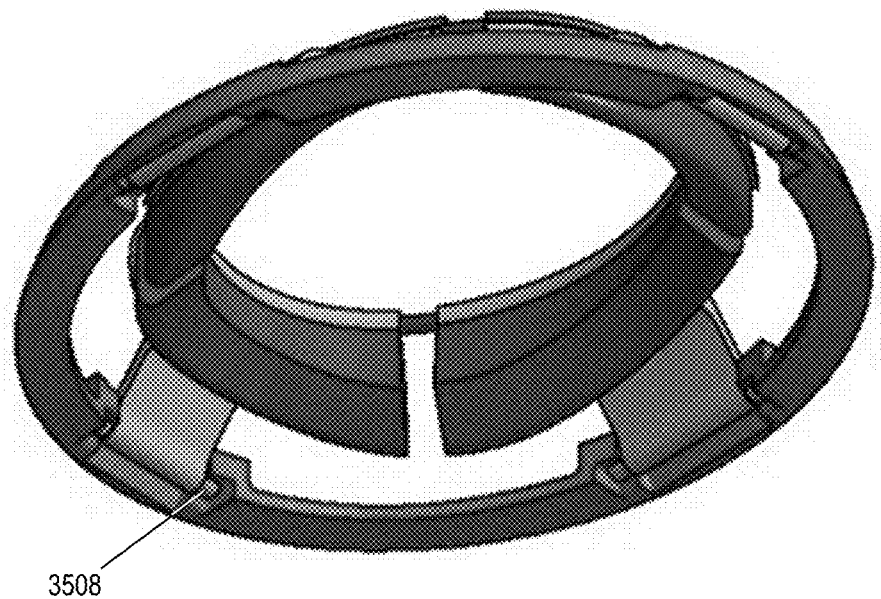

FIGS. 35A and 35B depict side and bottom perspective views, respectively, of a portion of an example lever assembly 3500. The lever assembly 3500 includes four levers 3502 disposed about a central axis. Each of the levers 3502 is pivotable about a respective pivot axis 3508. The levers 3502, in contrast to levers of the preceding examples, e.g., of FIGS. 4A and 23A, include a fulcrum positioned at one end of the lever, instead of being located between opposing ends of the lever. Namely, the example levers 3502 extend from the pivot point in one direction, and are referred to herein as "half" levers. In particular, the example levers 3502 can be considered as upper levers. It is understood that other configurations can include half levers extending from a pivot in another direction, e.g., downward, to form lower levers. It is also understood that some other assemblies can include combinations of one or more upper levers and one or more lower levers.

In the illustrative example, the pivot axes 3508 lie within a common plane that is perpendicular to the central axis. It is understood that other configurations are possible, for example, including pivot axes that lie within different planes orthogonal to the central axis and positioned at different locations along the central axis. Alternatively or in addition, at least some of the axes can have an orientation that lies outside of a plane orthogonal to the central axis. For example, some of the axes can have an orientation forming a non-zero angle, e.g., 10°, 30°, 45°, 60°, with one of a plane orthogonal to the central axis, the central axis, or both.

In the illustrative example, all four levers 3502 are similar in design. Namely, each lever 3502 includes a first end at or near a pivot axis and a second end including a deformable member, e.g., a resilient pad. In more detail, each of the levers 3502 includes pivot extensions 3508 that snap fit within recess pivot cavities of a pivot mounting ring 3504. The pivot mounting ring 3504 can include any of the example lever mounting assemblies disclosed herein.

The example lever system 3500 also includes a common resilient member 3506 positioned adjacent to a second end of each of the levers 3502. The common resilient member includes a spring, e.g., an elastomer, in the shape of an enclosed loop. The elastomeric loop 3506 is positioned along an outer facing surface of the upper end of each of the levers. In response to a collision force, one or more of the levers 3502 rotates about its respective pivot. Rotation of the one or more levers 3502 can deform the elastomeric loop

3506. For example, an outward rotation of an upper portion of the levers 3502 deforms the elastomeric loop 3506 by expanding the loop. It is understood that expansion of the elastomeric loop 3506 and/or compression of the resilient pads, can expend and/or otherwise absorb at least a portion of a kinetic energy resulting from a collision.

Figure 36A:
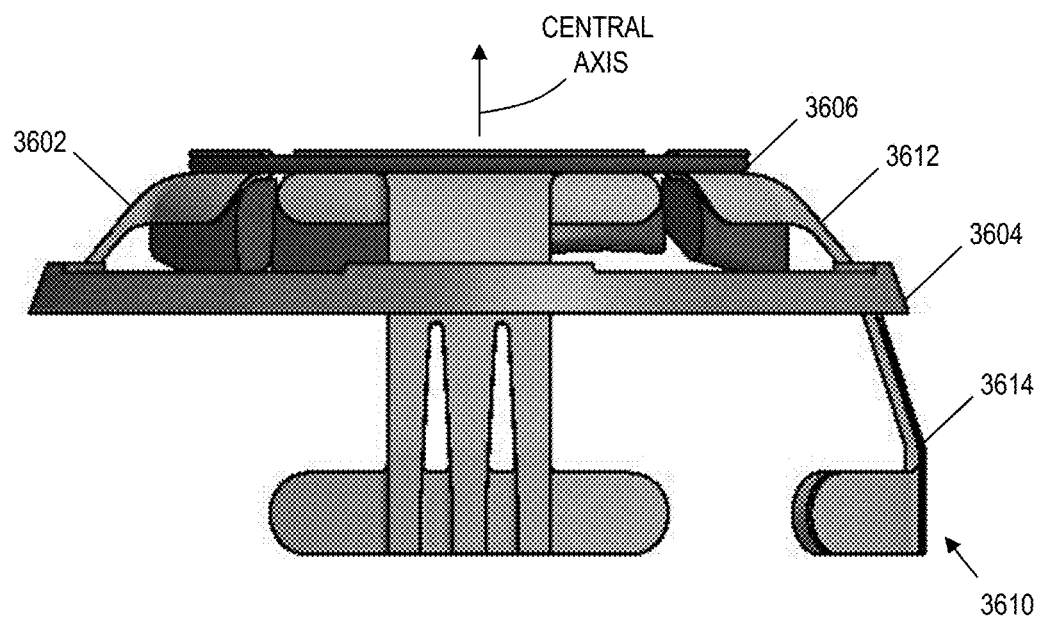
FIGS. 36A and 36B depict side and bottom perspective views of a portion of another example of a lever assembly.
Figure 36B:
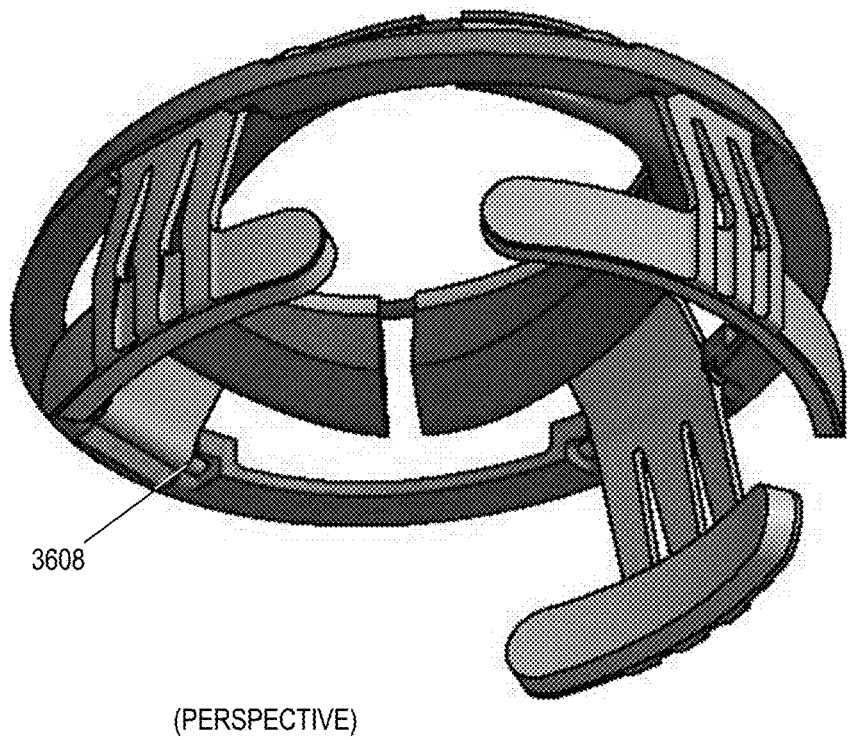

FIGS. 36A and 36B depict side and bottom perspective views, respectively, of a portion of an example of another lever assembly 3600. The lever assembly 3600 includes one upper lever 3602 and three "full" levers 3610 disposed about a common central axis. Each of the levers 3602, 3610 is pivotable about a respective pivot axis, e.g., pivot axis 3608. Other configurations can include varying numbers and/or types of levers, including combinations of one or more of upper levers, lower levers and/or full levers pivotally attached to one or more pivot anchors, such as the illustrative pivot mounting ring 3604.

In more detail, each of the illustrative full lever 3610 includes an upper portion 3612 extending upward from the pivot axis 3608 and a lower portion 3614 extending downward from the pivot axis 3608. The upper and lower portions 3612, 3614 can be similar or different. In the illustrative example, the upper portion 3612 has a solid profile of a first thickness with a concave surface facing inward, towards the central axis. In contrast, the lower portion 3614 includes an open profile, i.e., including slots, of a second thickness with a substantially planer surface facing inward towards the central axis. Other configurations are possible, and applicable to any of the various types of levers disclosed herein.

It is understood that virtually any material has an elastic region depending upon a magnitude of an applied force. Namely, an elastic deformation is a change in shape and/or size of a material induced by a relatively low stress that is recoverable after the stress is removed. A plastic region of deformation can be achieved in least some materials, by applying a relatively high stress, e.g., above or beyond the elastic region. It should be understood that such terms as used herein presume that the elastic regions of the materials fall within force ranges that allow the materials to be used for their elastic properties without causing damage or injury to a protected item, such as a human head.

Any of the deformable members disclosed herein can include a compressible element. The compressible element can include one of an elastic property, an inelastic property, or a combination of elastic and inelastic properties. It is understood that compressibility of the deformable member can result from one of a bulk material property, a geometry or shape, or a combination thereof. The compressible element can include any form of springs and/or shapes, such as corrugated shapes. In at least some embodiments, the compressible element can include a compressible material. Examples of compressible materials include, without limitation, one of a gas, a liquid, a solid, a gel, a foam, and combinations thereof, resilient materials, compliant materials. Alternatively or in addition, the deformable member can include a deformable system or assembly. Examples of deformable systems and/or assemblies can include airbag systems, and the like.

Beneficially, the various shock abatement systems disclosed herein facilitate mitigation of impact forces by one or more of deceleration, increasing a reaction distance and/or a extending a reaction time based on an impact force. In at least some embodiments, one or more of the deformable components, the mechanically actuated components contribute to a deceleration of a protective system in reaction to an impact, e.g., a collision force. Reaction distances can include one or more of relative distances between a protected item, e.g., a head, and a protective shell, e.g., a helmet. Alternatively or in addition, reaction distances can include one or more of distances traversed by one or more components of the shock abatement systems. For example, these distances can include displacements based on activation of mechanisms, such as the levers, the pulleys, the screws, the inclined planes, and the like. It is further understood that in at least some embodiments, any of the various configurations of the shock abatement systems disclosed herein can be contained entirely within and/or shielded entirely by the protective shell. Namely, the various shock abatement systems can be entirely housed within a helmet.

In at least some embodiments, no portion of a shock abatement system of a protective helmet system extends below a head portion and/or a neck portion of a body when the protective helmet system is work upon the head portion and/or the neck portion of the body. For example, none of the levers, the deformable members of the like, extend below the head and/or neck. It is understood that a lever assembly can be positioned entirely within an interior region of a protective shell. Alternatively or in addition, a portion of the lever assembly can be positioned within the interior region of the protective shell, while another portion of the lever assembly is not positioned within the interior region. In some embodiments, the entire lever assembly can be positioned external to a protective shell. Alternatively or in addition, the lever assembly can serve as a protective shell or cage, without necessarily requiring a separate shell.

The helmet system includes a machine that responds to a collision between an external surface of the helmet system and a foreign object, by providing a controlled movement that redistributes energy of the collision. The redistribution of the collision energy results in an absorption and/or dissipation of a non-trivial portion of the collision energy in one or more directions that differ from a direction of the collision, sometimes referred to as a line of impact. The machines can include, without restriction, any of the example arrangements of levers disclosed herein. In some embodiments, the helmet system includes an assembly of a protective shell and a lever system, arranged such that the protective shell forms at least a portion of the external surface of the helmet system exposed to the collision. Alternatively or in addition, the assembly of the protective shell and the lever system can be arranged such that the lever system forms at least a portion of the external surface of the helmet system exposed to the collision. In other embodiments, the helmet system includes a lever system that provides the entire exterior surface exposed to the collision. It is understood that in at least some embodiments, at least a portion of the lever system can serve as at least a portion of a protective shell.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A device, comprising:
a helmet defining an open ended cavity adapted to receive a portion of a human body; and
a shock abatement assembly disposed at least partially within the open ended cavity, wherein the shock abatement assembly comprises:
a plurality of lever machines, wherein a first lever machine of the plurality of lever machines comprises an elongated member extending along a length between a first end and a second end;
a plurality of fulcra fixedly positioned with respect to the helmet, wherein the plurality of fulcra pivotally engage the plurality of lever machines, wherein a first fulcrum of the plurality of fulcra engages the first lever machine of the plurality of lever machines along the length of the elongated member, wherein the first lever machine of the plurality of lever machines rotates freely about the first fulcrum of the plurality of fulcra according to a controlled movement in response to an application of an impact force based on a collision between the helmet and a foreign object to obtain a lever machine response, wherein the application of the impact force occurs along a first direction to an exterior surface of the helmet;
a first end portion at a first end of the first lever machine of the plurality of lever machines, wherein the first end portion defines a surface having a non-parallel orientation to a line joining the first and second ends, and in response to the application of the impact force, facilitates a reaction force comprising a directed force determined in part by the first direction and in part by the non-parallel orientation of the surface; and
a deformable member engaging the first lever machine of the plurality of lever machines at a first position spaced apart from the first fulcrum of the plurality of fulcra, wherein the deformable member is deformed to obtain a deformation responsive to the lever machine response, wherein the deformation occurs in a second direction different from the first direction, and wherein the deformation absorbs a non-trivial portion of a kinetic energy of the collision.

2. The device of claim 1, wherein the deformable member comprises a spring that stores the non-trivial portion of the kinetic energy in response to a rotation of the first lever machine of the plurality of lever machines about the first fulcrum of the plurality of fulcra, wherein the spring stores the non-trivial portion of the kinetic energy in response to an expansion of the spring, and wherein the surface comprises a curved surface.

3. The device of claim 2, wherein the spring is in communication between the first lever machine and a second lever machine of the plurality of lever machines, and wherein rotation of the first and second lever machines in response to the impact force of the collision deforms the spring to store the non-trivial portion of the kinetic energy,
wherein the curved surface defines a curve extending away from the elongated member, and
wherein the first lever machine of the plurality of lever machines experiences a rotation about the first fulcrum of the plurality of fulcra in response to the application of the impact force along the first direction.

4. The device of claim 3, wherein the plurality of fulcra are disposed within a first plane, wherein the spring comprises an enclosed loop in communication with the first and second lever machines of the plurality of lever machines, wherein the enclosed loop is deformed in a second plane substantially parallel to the first plane, wherein rotations of the first and the second lever machines of the plurality of lever machines stretches the enclosed loop, and wherein the first and the second lever machines of the plurality of lever machines, in response to the rotations, are adapted to provide opposing forces upon the portion of the human body.

5. The device of claim 1, wherein the elongated member of the first lever machine of the plurality of lever machines comprises a leaf spring extending between the first end and the second end that absorbs another non-trivial portion of the kinetic energy, by way of the first fulcrum of the plurality of fulcra, associated with the impact force of the collision by bending along the length of the elongated member to allow for a displacement of the first fulcrum of the plurality of fulcra with respect to the first end and the second end, and wherein one of the elongated member, the first end, the second end, or a combination thereof, comprises a curved portion adapted to conform to an abutting region of the portion of the human body.

6. The device of claim 1, wherein a first end of each lever machine of the plurality of lever machines is positioned proximal to a top of the helmet, and wherein each lever machine of the plurality of lever machines extends away from the top of the helmet, such that a second end of each lever machine of the plurality of lever machines is positioned distal to the top of the helmet, wherein the first lever machine of the plurality of lever machines is rotatably attached to the helmet, and wherein the first fulcrum of the plurality of fulcra is fixedly positioned with respect to the helmet in response to the impact force of the collision, allowing the first lever machine of the plurality of lever machines to rotate about the first fulcrum of the plurality of fulcra.

7. The device of claim 6, wherein the shock abatement assembly further comprises a lever-mounting frame,
wherein the lever-mounting frame comprises an enclosed loop positioned along an interior surface of the helmet and frictionally engaging the interior surface of the helmet along a perimeter,
wherein the plurality of lever machines are removably attached to the lever-mounting frame, and
wherein the plurality of lever machines are rotatably attached to the lever-mounting frame.

8. The device of claim 1, wherein the surface comprises a concave surface, wherein the deformable member comprises a compressible element, and a rotation of the first lever machine of the plurality of lever machines about the first fulcrum of the plurality of fulcra provides a mechanical advantage based on a position of the first fulcrum of the plurality of fulcra along the length between the first end and the second end.

9. A helmet system, comprising
a lever assembly configured to be worn upon a head portion, a neck portion, or both of a human body, wherein the lever assembly comprises:
a lever machine comprising:
an elongated member extending along a length between a first end and a second end and having a pivot location, wherein the first end is positioned proximal to a top portion of the helmet system and wherein the second end is positioned distal to the top portion of the helmet system;
a fulcrum that pivotally engages the elongated member at the pivot location, wherein the fulcrum is securely positioned with respect to the helmet system, wherein the elongated member rotates about the fulcrum, to obtain a lever machine response in response to an impact force applied along a first direction to an exterior surface of the helmet system, wherein the impact force is based on a collision between the helmet system and another object; and
a first end portion comprising a surface fixedly positioned at the first end of the elongated member, wherein the surface comprises a non-parallel orientation to a line joining the first and second ends, and in response to the impact force applied along the first direction, facilitates a reaction force determined in part by the first direction and in part by the non-parallel orientation of the surface; and
a tension spring engaging the lever machine, wherein an elongation of the tension spring based on the lever machine response, absorbs a non-trivial portion of a kinetic energy of the collision, wherein the elongation of the spring occurs in a second direction different from the first direction, and wherein the lever machine response redirects a portion of the impact force applied to the portion of the human body along a second direction different from the first direction.

10. The helmet system of claim 9, wherein the lever assembly comprises a first plurality of lever machines disposed about a central axis, wherein each lever machine of the first plurality of lever machines is rotatable about a respective axis of rotation of a first plurality of axes of rotation, wherein the first plurality of axes of rotation lie within a first plane orthogonal to the central axis at a first location along the central axis, and wherein the surface comprises a curved surface extending along a curve away from the length of the lever machine.

11. The helmet system of claim 10, wherein the lever assembly comprises a second plurality of lever machines disposed about the central axis, wherein each lever machine of the second plurality of lever machines is rotatable about a respective axis of a second plurality of axes of rotation, and wherein the second plurality of axes of rotation lie within a second plane orthogonal to the central axis at a second location separated from the first location along the central axis.

12. The helmet system of claim 9, wherein the lever machine response comprises a mechanical advantage based on a ratio of a first length between the pivot location and the first and a second length between the pivot location and the second end, and wherein the lever machine response comprises a controlled movement that allow movement of the elongated member in one direction while preventing movement of the elongated member in another direction.

13. The helmet system of claim 9, further comprising a shell, wherein the lever machine comprising a first compressible member at the first end defining the surface and a second compressible member at the second end, wherein one of the first compressible member, the second compressible member, or both, comprises a polymer compressible between the lever machine and one of the portion of the human body, the shell, or both in response to the impact force.

14. The helmet system of claim 9, wherein the lever assembly comprises a plurality of lever machines disposed about a central axis, wherein each lever machine of the plurality of lever machines is rotatable about a respective axis of rotation of a plurality of axes of rotation, and wherein at least one axis of rotation of the plurality of axes of rotation is one of orthogonal to the central axis, parallel to the central axis, or at a non parallel angle to the central axis.

15. The helmet system of claim 9, wherein the lever machine comprises a leaf spring defined along the length between the first end and the second end, wherein the leaf spring is bendable along the length in response to the impact force transferred to the leaf spring by way of the fulcrum to facilitate a displacement of the pivot location to the first end and the second end.

16. A method comprising:
providing, a helmet system comprising a plurality of lever machines rotatable about a plurality of fulcra, wherein top portions of the plurality of lever machines are proximal to a top portion of the helmet system, wherein bottom portions of the plurality of lever machines are distal to the top portion of the helmet system, and wherein the plurality of fulcra are fixedly positioned with respect to the helmet system, wherein at least one lever machine of the plurality of lever machines rotates about a respective fulcrum of the plurality of fulcra according to a predetermined machine response in response to an impact force received along a first direction at an external surface of the helmet system, the impact force resulting from a collision between the external surface of the helmet system and another object, wherein a first deformable member of the helmet system, engaging at least one lever machine of the plurality of lever machines, experiences an expansion in response to a rotating of the at least one lever machine of the plurality of lever machines according to the predetermined machine response, wherein a second deformable member of the helmet system, disposed at one end of the at least one lever machine of the plurality of lever machines, experiences a compression based on a reaction to a movement of the at least one lever machine in a second direction different from the first direction, wherein the expansion of the first deformable member and the compression of the second deformable member occur along different directions from the first direction, and wherein the expansion of the first deformable member, the compression of the second deformable member, or both absorbs a non-trivial portion of a kinetic energy of the collision.

17. The method of claim 16, further comprising redirecting a portion of the impact force, wherein the expansion of the first deformable member further comprises transforming the non-trivial portion of the kinetic energy of the collision into a potential energy comprising a strain energy based on the impact force.

18. The method of claim 16, wherein the expansion of the first deformable member further comprises changing the non-trivial portion of the kinetic energy of the collision into one of a potential energy, a mechanical energy, a thermal energy, an acoustic energy, an electrical energy, a magnetic energy, or any combination thereof.

19. The method of claim 16, wherein the rotating of the at least one lever machine of the plurality of lever machines is based on a non-planar surface of the second deformable member, the method further comprising deforming, by the helmet system, a lever machine of the plurality of lever machines in response to the impact force, wherein the deforming of the lever machine absorbs another non-trivial portion of the kinetic energy of the collision.

20. The method of claim 16, wherein the predetermined machine response facilitates a redirecting of the impact force received along a first direction, and wherein the redirecting of the impact force comprises a transfer force adapted to act upon a human head along at least one other direction different from the first direction.

* * * * *